United States Patent
Nuno et al.

(10) Patent No.: US 7,725,353 B2
(45) Date of Patent: May 25, 2010

(54) ELECTRONIC SERVICE MANUAL DISPLAY CONTROL DEVICE

(75) Inventors: Ikuo Nuno, Yokohama (JP); Hatsuo Okubo, Yokohama (JP)

(73) Assignee: Victor Company of Japan, Ltd., Yokohama (JP)

( * ) Notice: Subject to any disclaimer, the term of this patent is extended or adjusted under 35 U.S.C. 154(b) by 1240 days.

(21) Appl. No.: 10/555,171

(22) PCT Filed: May 20, 2004

(86) PCT No.: PCT/JP2004/006833

§ 371 (c)(1),
(2), (4) Date: Nov. 1, 2005

(87) PCT Pub. No.: WO2004/104863

PCT Pub. Date: Dec. 2, 2004

(65) Prior Publication Data

US 2006/0212826 A1 Sep. 21, 2006

(30) Foreign Application Priority Data

May 20, 2003 (JP) ............................. 2003-142645

(51) Int. Cl.
*G06Q 30/00* (2006.01)

(52) U.S. Cl. ....................................................... 705/26

(58) Field of Classification Search .................. 705/26, 705/27

See application file for complete search history.

(56) References Cited

U.S. PATENT DOCUMENTS

| 2003/0035425 | A1 | 2/2003 | Abdollahi et al. |
| 2008/0103937 | A1 * | 5/2008 | Murray ........................ 705/27 |

FOREIGN PATENT DOCUMENTS

| JP | 08-016640 | 1/1996 |
| JP | 09-006194 | 1/1997 |
| JP | 10-111863 | 4/1998 |
| JP | 11-149494 | 6/1999 |
| JP | 2002-099550 | 4/2002 |

* cited by examiner

*Primary Examiner*—Mila Airapetian
(74) *Attorney, Agent, or Firm*—Louis Woo

(57) ABSTRACT

Disclosed is an electronic service manual display program whereby an order for a part can be easily and correctly issued across a network to a predetermined parts order receiving server, and in accordance with to this technique, a board diagram or a circuit diagram is displayed in a drawing display area. Furthermore, network connection destination information, which includes the URL information for a predetermined parts order receiving server, the information type to be transmitted to the server and a predetermined transmission method, is read, for example, from a local hard disk such as the one in a PC (personal computer). When a predetermined manipulation, such as right clicking, is performed for a graphics primitive in the board diagram or the circuit diagram, the network connection destination information is examined, and menu information that enables the selection of a predetermined parts order receiving server is generated and displayed. Further, when a parts order receiving server is selected in the menu information, a part corresponding to the selected graphics primitive is searched for and information for the part is obtained. Further, the quantity of the part is designated, and an order for the part is submitted to the predetermined parts order receiving server.

6 Claims, 33 Drawing Sheets

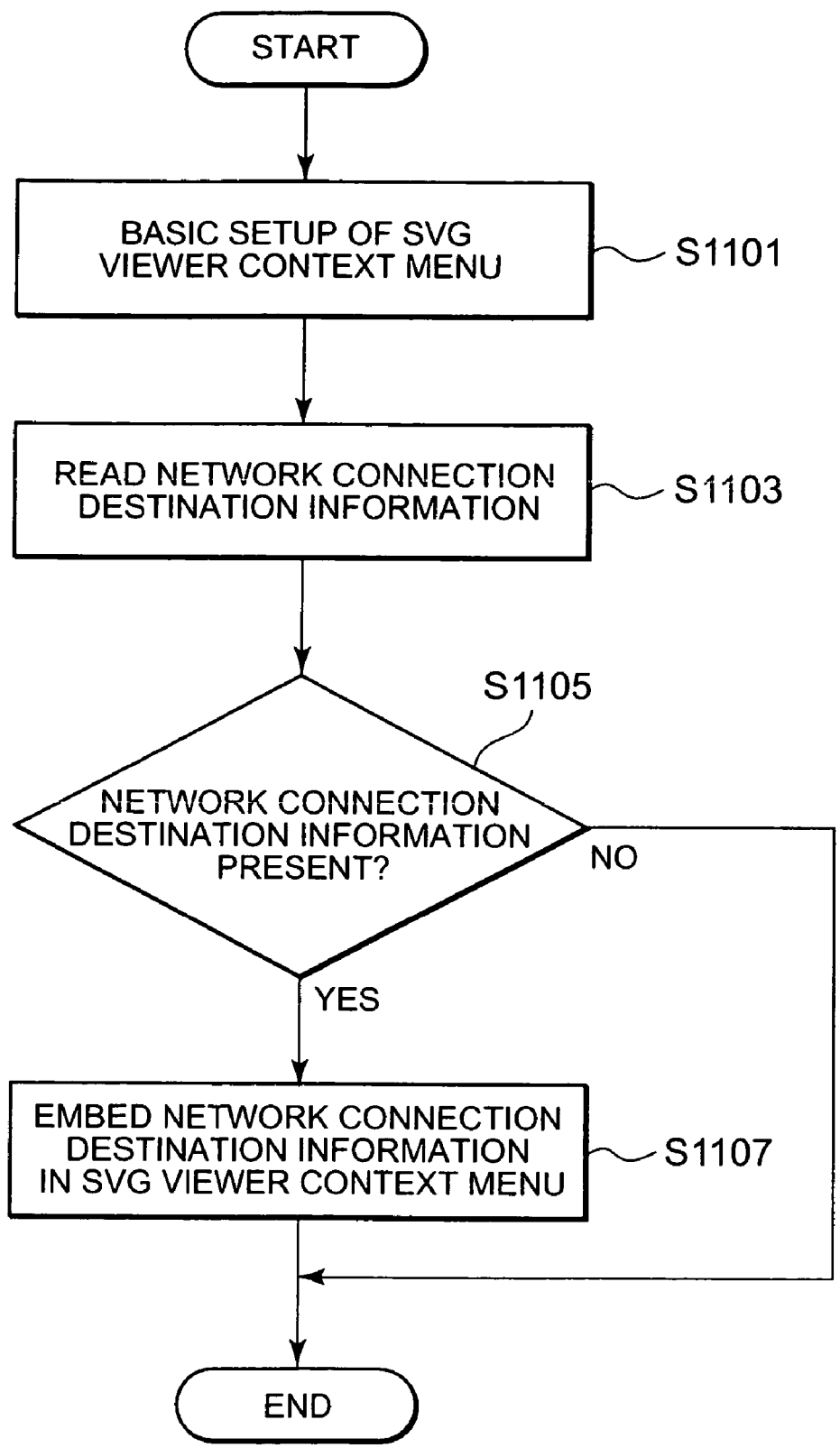

FIG. 20

NETWORK CONNECTION DESTINATION INFORMATION

| | | |
|---|---|---|
| 1 | TITLE NAME | PARTS ORDER RECEIVING SERVER ABC |
| | URL INFORMATION | http://www.XXXXX |
| | TRANSMISSION INFORMATION | PARTS NUMBER, QUANTITIES OF PARTS |
| | TRANSMISSION METHOD | POST |
| | USER ID | ○○○○○ |
| | USER PASSWORD | △△△△△ |
| 2 | TITLE NAME | PARTS ORDER RECEIVING SERVER DEF |
| | URL INFORMATION | http://www.XXXXX |
| | TRANSMISSION INFORMATION | SYMBOL NUMBER, QUANTITIES OF PARTS |
| | TRANSMISSION METHOD | GET |
| | USER ID | ○○○○○ |
| | USER PASSWORD | △△△△△ |
| 3 | TITLE NAME | PARTS ORDER RECEIVING SERVER GHI |
| | URL INFORMATION | http://www.XXXXX |
| | TRANSMISSION INFORMATION | PARTS NAME, QUANTITIES OF PARTS |
| | TRANSMISSION METHOD | GET |
| | USER ID | ○○○○○ |
| | USER PASSWORD | △△△△△ |
| ⁝ | ⁝ | ⁝ |

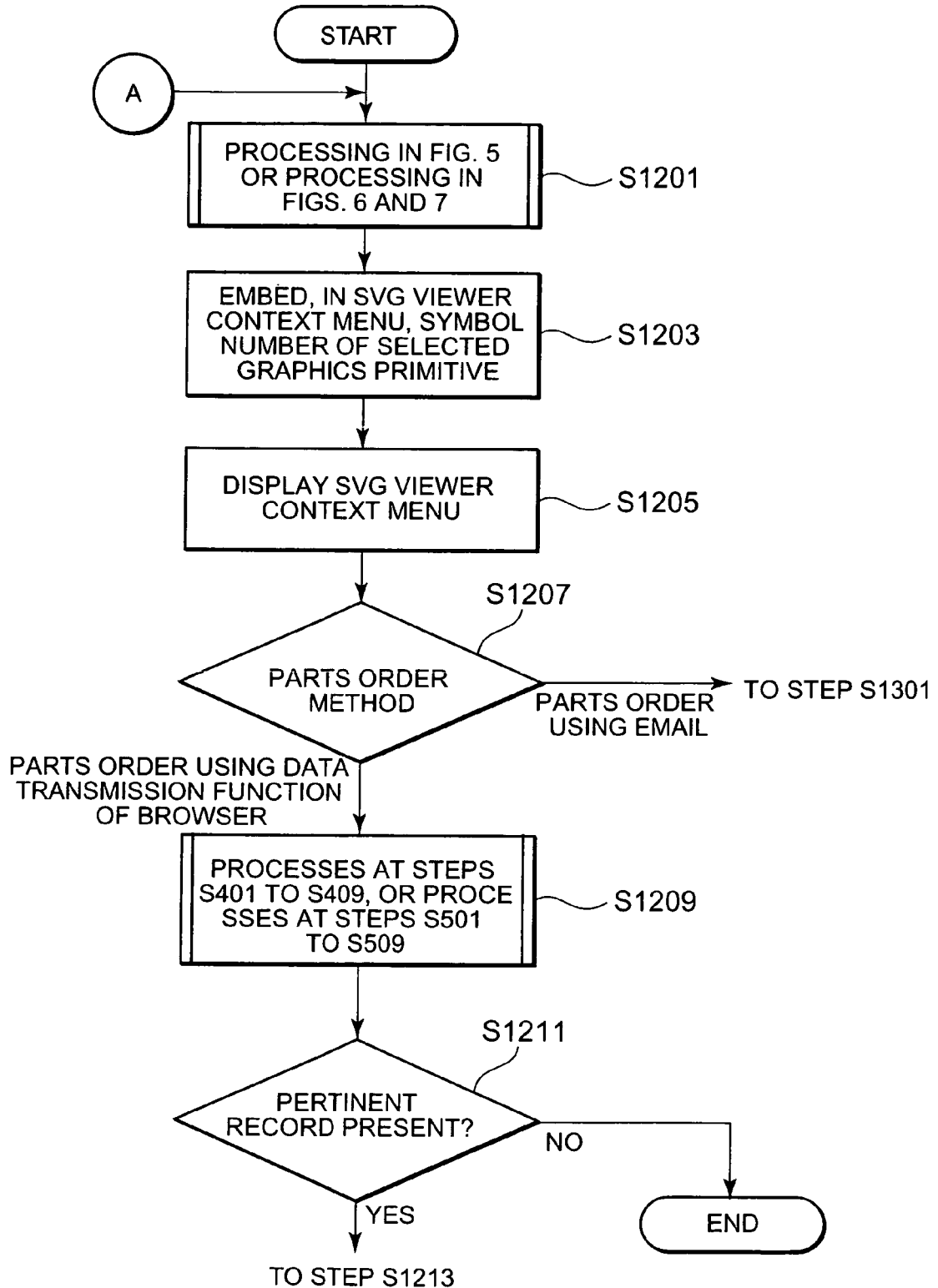

FIG. 26

PARTS ORDER SITE ABC

| PART NUMBER | QUANTITY | |
|---|---|---|
| QRL01DJ-683X | 2 | DELETE |
| MN35505-X | 5 | DELETE |
| GP1UD271XK | 6 | DELETE |

SEND

FIG. 27

ORDER STYLE SETUP INFORMATION

| STYLE | SERVER NAME | SELECTED | EMAIL ADDRESS | ADDITIONAL INFORMATION 1 | ADDITIONAL INFORMATION 2 | ADDITIONAL INFORMATION 3 |
|---|---|---|---|---|---|---|
| 1 | ABC | YES | +++@++.++ | ○○○ | △△△ | ×××|
| 2 | DEF | NO | **@**** | ○△× | △×○ | — |
| 3 | GHI | NO | --@--.-- | ×× | ○△× | — |
| ～ | ～ | ～ | ～ | ～ | ～ | ～ |

FIG. 28

MODEL NAME A1234

ORDERED PARTS LIST

| SYMBOL NUMBER | PART NUMBER | PART NAME | BLOCK NUMBER | QUANTITY | |
|---|---|---|---|---|---|
| R901 | QRDJ01 | RESISTOR | 2 | 5 | DELETE |
| C1 | NCS31 | CAPACITOR | 2 | 1 | DELETE |
| IC301 | MN103 | IC | 3 | 2 | DELETE |

SEND EMAIL | PRINT | CLEAR | CANCEL

RECOVERING DATA

ELECTRONIC SERVICE MANUAL DISPLAY CONTROL DEVICE

TECHNICAL FIELD

The present invention relates to an electronic service manual display program, for displaying on a computer display device a service manual that provides detailed information for use as a reference when performing an inspection or when providing maintenance and repair servicing for products that include an electric circuit or an electronic circuit; a recording medium on which the display program is recorded; an electronic service manual display control method and an electronic service manual display control apparatus; a program transmission method and a program transmission apparatus; and a program reception method and a program reception apparatus.

BACKGROUND ART

Conventionally, many manufacturers, including electric appliance and automobile makers, produce a variety of products in which electric systems, such as electric or electronic circuits, are used. Further, provided in correlation with these products are service manuals that furnish detailed information for use as a reference for the inspection or the maintenance and repair of the products. Ordinarily, such service manuals are supplied as printed matter, but recently, digitized service manuals (electronic service manuals), which can be browsed using PCs (Personal computers), are increasingly being provided.

Multiple technical drawings, such as circuit diagrams and board diagrams, are inserted in the service manuals. Required for the technical drawings, which include circuit diagrams and board diagrams, are means for arbitrarily enlarging, reducing or moving them during browsing. Therefore, for the electronic service manuals, the use of a vector graphics data format is desired, and for this, the most common vector graphics data format, PDF (Portable Document Format), is employed.

While most electronic service manuals are those obtained by directly digitizing the printed matter for the service manuals, there are also electronic service manuals for which a hyperlink, for coupling data, is embedded at a predetermined location so that the display of a circuit diagram, for example, can be quickly changed to display the caption for the circuit diagram.

Furthermore, in patent document 1, disclosed below, is a parts search system wherein a server and a user terminal are connected across a network, and wherein when the server receives a product or parts search request issued by the user terminal, the server transmits to the user terminal information that is related to a requested product or part.

Patent Document 1: Japanese Patent Application Publication No. 2002-99550

However, for an electronic service manual wherein a hyperlink is embedded for coupling data, an electronic service manual producer must designate in advance data to be coupled, and moreover, must embed a hyperlink for coupling the data. At present, where there are service manuals for a large variety of products and an extensive number of parts are included in the service manuals, an enormous amount of labor is required to embed hyperlinks in these parts, and the embedding process is very difficult.

When, for example, the exchange of parts is required after a product has been repaired by referring to an electronic service manual, an order for parts must be issued to a dealer who sells the parts. Various modes are available for issuing the parts order to the dealer; e.g., by email, through facsimile, or by mail. Using any of these modes, an order issuing user must employ operation input means, such as a mouse or a keyboard, to enter the part name and the part number for a desired part in the text input areas of an email, or must employ writing equipment, such as a pen, to copy the part name and the part number of a desired part to paper. However, since the part name and the part number is represented, for example, merely by an alphabet or a numerical string, input errors or entry errors tend to occur, and further, when ordering multiple kinds of parts, a recurring problem is that a huge amount of labor and much time are required to prepare an order sheet.

A part search system disclosed in patent document 1 is a system whereby images, based on a parts list or a service manual, are browsed by using a user terminal, and the location of a search requested part is narrowed down in accordance with an instruction issued using a mouse, and whereby an enlarged image of a location designated by a user, using the mouse, and detailed information therefor are provided by a server, so as to support the user's search operation. Therefore, in patent document 1, the idea is not disclosed whereby information included in an electronic service manual is employed to permit the issue of an order for parts across a network.

DISCLOSURE OF THE INVENTION

To resolve these problems, it is one objective of the present invention to provide an electronic service manual display program whereby an order for parts can be easily and accurately issued to a predetermined parts order receiving server; a recording medium on which a program is recorded; an electronic service manual display control method and an electronic service manual display control apparatus; a program transmission method and a program transmission apparatus; and a program reception method and a program reception apparatus.

To achieve this objective, according to the present invention, provided is an electronic service manual display program, which permits a computer to provide a function for displaying, on a display device, information that is related to parts and that is used for a predetermined product constituted by an electric circuit or an electronic circuit employing the parts as components, and at the least either a board diagram that represents not only a board used for the predetermined product but also the parts mounted on the board, or a circuit diagram that represents a circuit provided on the board, and which permits the computer to perform the steps of:

displaying, in a designated index page display area, an index page showing a list of names for, at the least, either the board or the circuit;

displaying, in a designated parts table page display area, a parts table page showing a list of the parts;

establishing in advance, for each of the names published on the index page, index page information, which is drawing identification information for a drawing, at the least either a board diagram for the board or a circuit diagram for the circuit, that corresponds to the name, and when one of the names displayed on the index page display area is selected, obtaining from the index page information the drawing identification information that is designated in correlation with the selected name;

searching for the drawing designated by the thus obtained drawing identification information, and displaying the drawing in a designated drawing display area;

reading network connection destination information, including parts ordering setup information wherein are entered URL information for a predetermined order receiving server that accepts orders for the parts, information indicating an information type to be transmitted to the parts order receiving server, and a method for the transmission of orders to the parts order receiving server;

establishing in advance, for graphics primitives that are constituents of the drawing, graphics primitive information, which is parts identification information corresponding to the parts, and when a predetermined operation is performed for one of the graphics primitives that constitute the board diagram or the circuit diagram displayed in the drawing display area, examining the network connection destination information to generate and display menu information that includes choices for the issue of an order for parts to the parts order receiving server;

generating a parts order page when in the menu information a choice is selected for issuing an order for parts to the parts order receiving order, and based on the parts identification information included in the graphics primitive information for the selected graphics primitive, obtaining for the part, from parts table database information wherein detailed information for each of the parts is stored together with the parts identification information, an information type to be transmitted to the parts order receiving server, and embedding, in the parts order page, the information type that is to be transmitted to the parts order receiving server and that is related to each of the parts;

displaying the parts order page;

accepting, at a predetermined location in the parts order page, an entry for the quantity of each of the parts to be ordered;

employing the method for the transmission to the parts order receiving server to transmit, to the parts order receiving server designated by the URL information, the information type that is to be transmitted to the parts order receiving server and is related to each of the parts, and the quantity of each of the parts to be ordered;

receiving from the parts order receiving server order acceptance results related to the parts; and displaying the order acceptance results that have been received.

To achieve this objective, according to the present invention, also provided is an electronic service manual display program, which permits a computer to provide a function for displaying, on a display device, information that is related to parts and that is used for a predetermined product constituted by an electric circuit or an electronic circuit employing the parts as components, and at the least either a board diagram that represents not only a board used for the predetermined product but also the parts mounted on the board, or a circuit diagram that represents a circuit provided on the board, and which permits the computer to perform the steps of:

displaying an index page display area for displaying an index page on which a list of names for, at the least, either the board or the circuit is published;

displaying a parts table page display area for displaying a parts table page on which a list of the parts is published;

displaying a drawing display area to display a drawing, at the least, either a board diagram for the board or a circuit diagram for the circuit;

displaying the index page in the index page display area;

displaying the parts table page in the parts table page display area;

establishing in advance, for each of the names published on the index page, index page information, which is drawing identification information for the drawing corresponding to the names, and when one of the names displayed in the index page display area is selected, obtaining from the index page information the drawing identification information that is designated for the selected name;

when the thus obtained drawing identification information is information for a designation of the board diagram or the circuit diagram, searching for and displaying, in the drawing display area, the board diagram or the circuit diagram that corresponds to the drawing identification information;

when the drawing identification information thus obtained is information for a designation of both the board diagram and the circuit diagram, dividing the drawing display area into first and second display areas and searching for and displaying, in the first and second display areas, the board diagram and the circuit diagram that correspond to the drawing identification information;

reading network connection destination information, including parts ordering setup information wherein are entered URL information for a predetermined order receiving server that receives orders for the parts, information indicating an information type to be transmitted to the parts order receiving server, and a method for the transmission of orders to the parts order receiving server;

establishing in advance, for graphics primitives that are constituents of the drawing, graphics primitive information, which is parts identification information corresponding to the parts, and when a predetermined operation is performed for one of the graphics primitives that constitute the board diagram or the circuit diagram displayed in the drawing display area, examining the network connection destination information to generate and display menu information that includes choices for the issue of an order for parts to the parts order receiving server;

generating a parts order page when in the menu information a choice is selected for issuing an order for parts to the parts order receiving order, and based on the parts identification information included in the graphics primitive information for the selected graphics primitive, obtaining for the part, from parts table database information wherein detailed information for each of the parts is stored together with the parts identification information, an information type to be transmitted to the parts order receiving server, and embedding, in the parts order page, the information type that is to be transmitted to the parts order receiving server and that is related to each of the parts;

displaying the parts order page;

accepting, at a predetermined location in the parts order page, an entry for the quantity of each of the parts to be ordered;

employing the method for the transmission to the parts order receiving server to transmit, to the parts order receiving server designated by the URL information, the information type that is to be transmitted to the parts order receiving server and is related to each of the parts, and the quantity of each of the parts to be ordered;

receiving from the parts order receiving server order acceptance results related to the parts; and displaying the order acceptance results that have been received.

Further, to achieve this objective, according to the present invention, provided is an electronic service manual display program, which permits a computer to provide a function for displaying, on a display device, information that is related to parts and that is used for a predetermined product constituted by an electric circuit or an electronic circuit employing the parts as components, and at the least either a board diagram that represents not only a board used for the predetermined product but also the parts mounted on the board, or a circuit diagram that represents a circuit provided on the board, and which permits the computer to perform the steps of:

displaying, in a designated index page display area, an index page showing a list of names for, at the least, either the board or the circuit;

displaying, in a designated parts table page display area, a parts table page showing a list of the parts;

establishing in advance, for each of the names published on the index page, index page information, which is drawing identification information for a drawing, at the least either a board diagram for the board or a circuit diagram for the circuit, that corresponds to the name, and when one of the names displayed on the index page display area is selected, obtaining from the index page information the drawing identification information that is designated in correlation with the selected name;

searching for the drawing designated by the thus obtained drawing identification information, and displaying the drawing in a designated drawing display area;

establishing in advance, for graphics primitives that are constituents of the drawing, graphics primitive information that is parts identification information corresponding to the parts, and when a predetermined operation is performed for one of the graphics primitives that constitute the board diagram or the circuit diagram displayed in the drawing display area, generating and displaying menu information that includes a choice for issuing an order for parts using email;

generating a parts order page when the choice for issuing an order for parts using email is selected in the menu information, and based on the parts identification information included in the graphics primitive information for the selected graphics primitive, extracting for the part, from parts table database information wherein detailed information related to each of the parts is stored together with parts identification information for parts, detailed information that includes parts identification information provided in the graphics primitive information for the selected graphics primitive;

reading email setup information wherein are entered email address information for a predetermined parts order receiving server that receives an order for the parts, information showing an information type to be transmitted to the parts order receiving server, and a method for writing information in an email to be transmitted to the parts order receiving server;

employing the email setup information to selectively embed, in the thus generated parts order page, the extracted, detailed information related to the parts and the information indicating the information type to be transmitted to the parts order receiving server;

displaying the parts order page;

accepting, at a predetermined location on the parts order page, the quantity to be ordered for each of the parts; and employing the method, included in the email setup information, for writing information for an email to be transmitted to the parts order receiving server, and for generating an email in order to transmit, to an email address, information for the parts order receiving server, the type of information, which is embedded in the parts order page to be transmitted to the parts order receiving server and that is related to the parts, and the quantity of each of the parts to be ordered.

Further, to achieve this objective, according to the present invention, provided is an electronic service manual display program, which permits a computer to provide a function for displaying, on a display device, information that is related to parts and that is used for a predetermined product constituted by an electric circuit or an electronic circuit employing the parts as components, and at the least either a board diagram that represents not only a board used for the predetermined product but also the parts mounted on the board, or a circuit diagram that represents a circuit provided on the board, and which permits the computer to perform the steps of:

displaying an index page display area for displaying an index page on which a list of names for, at the least, either the board or the circuit is published;

displaying a parts table page display area for displaying a parts table page on which a list of the parts is published;

displaying a drawing display area to display a drawing, at the least, either a board diagram for the board or a circuit diagram for the circuit;

displaying the index page in the index page display area;

displaying the parts table page in the parts table page display area;

establishing in advance, for each of the names published on the index page, index page information, which is drawing identification information for the drawing corresponding to the names, and when one of the names displayed in the index page display area is selected, obtaining from the index page information the drawing identification information that is designated for the selected name;

when the thus obtained drawing identification information is information for a designation of the board diagram or the circuit diagram, searching for and displaying, in the drawing display area, the board diagram or the circuit diagram that corresponds to the drawing identification information;

when the drawing identification information thus obtained is information for a designation of both the board diagram and the circuit diagram, dividing the drawing display area into first and second display areas and searching for and displaying, in the first and second display areas, the board diagram and the circuit diagram that correspond to the drawing identification information;

establishing in advance, for graphics primitives that are constituents of the drawing, graphics primitive information that is parts identification information corresponding to the parts, and when a predetermined operation is performed for one of the graphics primitives that constitute the board diagram or the circuit diagram displayed in the drawing display area, generating and displaying menu information that includes a choice for issuing an order for parts using email;

generating a parts order page when the choice for issuing an order for parts using email is selected in the menu information, and based on the parts identification information included in the graphics primitive information for the selected graphics primitive, extracting for the part, from parts table database information wherein detailed information related to each of the parts is stored together with parts identification information for parts, detailed information that includes parts identification information provided in the graphics primitive information for the selected graphics primitive;

reading email setup information wherein are entered email address information for a predetermined parts order receiving server that receives an order for the parts, information showing an information type to be transmitted to the parts order receiving server, and a method for writing information in an email to be transmitted to the parts order receiving server;

employing the email setup information to selectively embed, in the thus generated parts order page, the extracted, detailed information related to the parts and the information indicating the information type to be transmitted to the parts order receiving server;

displaying the parts order page;

accepting, at a predetermined location on the parts order page, the quantity to be ordered for each of the parts; and employing the method, included in the email setup information, for writing information for an email to be transmitted to the parts order receiving server, and for generating an email in order to transmit, to an email address, information for the parts order receiving server, the type of information, which is embedded in the parts order page to be transmitted to the parts order receiving server and that is related to the parts, and the quantity of each of the parts to be ordered.

In addition, to achieve this objective, according to the present invention, provided is a recording medium, on which is recorded an electronic service manual display program that permits a computer to provide a function for displaying, on a display device, information that is related to parts and that is used for a predetermined product constituted by an electric circuit or an electronic circuit employing the parts as components, and at the least either a board diagram that represents not only a board used for the predetermined product but also the parts mounted on the board, or a circuit diagram that represents a circuit provided on the board, and that permits the computer to perform the steps of:

displaying, in a designated index page display area, an index page showing a list of names for, at the least, either the board or the circuit;

displaying, in a designated parts table page display area, a parts table page showing a list of the parts;

establishing in advance, for each of the names published on the index page, index page information, which is drawing identification information for a drawing, at the least either a board diagram for the board or a circuit diagram for the circuit, that corresponds to the name, and when one of the names displayed on the index page display area is selected, obtaining from the index page information the drawing identification information that is designated in correlation with the selected name;

searching for the drawing designated by the thus obtained drawing identification information, and displaying the drawing in a designated drawing display area;

reading network connection destination information, including parts ordering setup information wherein are entered URL information for a predetermined order receiving server that receives orders for the parts, information indicating an information type to be transmitted to the parts order receiving server, and a method for the transmission of orders to the parts order receiving server;

establishing in advance, for graphics primitives that are constituents of the drawing, graphics primitive information, which is parts identification information corresponding to the parts, and when a predetermined operation is performed for one of the graphics primitives that constitute the board diagram or the circuit diagram displayed in the drawing display area, examining the network connection destination information to generate and display menu information that includes choices for the issue of an order for parts to the parts order receiving server;

generating a parts order page when in the menu information a choice is selected for issuing an order for parts to the parts order receiving order, and based on the parts identification information included in the graphics primitive information for the selected graphics primitive, obtaining for the part, from parts table database information wherein detailed information for each of the parts is stored together with the parts identification information, an information type to be transmitted to the parts order receiving server, and embedding, in the parts order page, the information type that is to be transmitted to the parts order receiving server and that is related to each of the parts;

displaying the parts order page;

accepting, at a predetermined location in the parts order page, an entry for the quantity of each of the parts to be ordered;

employing the method for the transmission to the parts order receiving server to transmit, to the parts order receiving server designated by the URL information, the information type that is to be transmitted to the parts order receiving server and is related to each of the parts, and the quantity of each of the parts to be ordered;

receiving from the parts order receiving server order acceptance results related to the parts; and displaying the order acceptance results that have been received.

To achieve this objective, according to the present invention, also provided is a recording medium, on which recorded is an electronic service manual display program that permits a computer to provide a function for displaying, on a display device, information that is related to parts and that is used for a predetermined product constituted by an electric circuit or an electronic circuit employing the parts as components, and at the least either a board diagram that represents not only a board used for the predetermined product but also the parts mounted on the board, or a circuit diagram that represents a circuit provided on the board, and that permits the computer to perform the steps of:

displaying an index page display area for displaying an index page on which a list of names for, at the least, either the board or the circuit is published;

displaying a parts table page display area for displaying a parts table page on which a list of the parts is published;

displaying a drawing display area to display a drawing, at the least, either a board diagram for the board or a circuit diagram for the circuit;

displaying the index page in the index page display area;

displaying the parts table page in the parts table page display area;

establishing in advance, for each of the names published on the index page, index page information, which is drawing identification information for the drawing corresponding to the names, and when one of the names displayed in the index page display area is selected, obtaining from the index page information the drawing identification information that is designated for the selected name;

when the thus obtained drawing identification information is information for a designation of the board diagram or the circuit diagram, searching for and displaying, in the drawing display area, the board diagram or the circuit diagram that corresponds to the drawing identification information;

when the drawing identification information thus obtained is information for a designation of both the board diagram and the circuit diagram, dividing the drawing display area into first and second display areas and searching for and displaying, in the first and second display areas, the board diagram and the circuit diagram that correspond to the drawing identification information;

reading network connection destination information, including parts ordering setup information wherein are entered URL information for a predetermined order receiving server that receives orders for the parts, information indicating an information type to be transmitted to the parts order receiving server, and a method for the transmission of orders to the parts order receiving server;

establishing in advance, for graphics primitives that are constituents of the drawing, graphics primitive information, which is parts identification information corresponding to the parts, and when a predetermined operation is performed for one of the graphics primitives that constitute the board diagram or the circuit diagram displayed in the drawing display area, examining the network connection destination information to generate and display menu information that includes choices for the issue of an order for parts to the parts order receiving server;

generating a parts order page when in the menu information a choice is selected for issuing an order for parts to the parts order receiving order, and based on the parts identification information included in the graphics primitive information for the selected graphics primitive, obtaining for the part, from parts table database information wherein detailed information for each of the parts is stored together with the parts identification information, an information type to be transmitted to the parts order receiving server, and embedding, in the parts order page, the information type that is to be transmitted to the parts order receiving server and that is related to each of the parts;

displaying the parts order page;

accepting, at a predetermined location in the parts order page, an entry for the quantity of each of the parts to be ordered;

employing the method for the transmission to the parts order receiving server to transmit, to the parts order receiving server designated by the URL information, the information type that is to be transmitted to the parts order receiving server and is related to each of the parts, and the quantity of each of the parts to be ordered;

receiving from the parts order receiving server order acceptance results related to the parts; and displaying the order acceptance results that have been received.

Further, to achieve this objective, according to the present invention, provided is a recording medium, on which recorded is an electronic service manual display program that permits a computer to provide a function for displaying, on a display device, information that is related to parts and that is used for a predetermined product constituted by an electric circuit or an electronic circuit employing the parts as components, and at the least either a board diagram that represents not only a board used for the predetermined product but also the parts mounted on the board, or a circuit diagram that represents a circuit provided on the board, and that permits the computer to perform the steps of:

displaying, in a designated index page display area, an index page showing a list of names for, at the least, either the board or the circuit;

displaying, in a designated parts table page display area, a parts table page showing a list of the parts;

establishing in advance, for each of the names published on the index page, index page information, which is drawing identification information for a drawing, at the least either a board diagram for the board or a circuit diagram for the circuit, that corresponds to the name, and when one of the names displayed on the index page display area is selected, obtaining from the index page information the drawing identification information that is designated in correlation with the selected name;

searching for the drawing designated by the thus obtained drawing identification information, and displaying the drawing in a designated drawing display area;

establishing in advance, for graphics primitives that are constituents of the drawing, graphics primitive information that is parts identification information corresponding to the parts, and when a predetermined operation is performed for one of the graphics primitives that constitute the board diagram or the circuit diagram displayed in the drawing display area, generating and displaying menu information that includes a choice for issuing an order for parts using email;

generating a parts order page when the choice for issuing an order for parts using email is selected in the menu information, and based on the parts identification information included in the graphics primitive information for the selected graphics primitive, extracting for the part, from parts table database information wherein detailed information related to each of the parts is stored together with parts identification information for parts, detailed information that includes parts identification information provided in the graphics primitive information for the selected graphics primitive;

reading email setup information wherein are entered email address information for a predetermined parts order receiving server that receives an order for the parts, information showing an information type to be transmitted to the parts order receiving server, and a method for writing information in an email to be transmitted to the parts order receiving server;

employing the email setup information to selectively embed, in the thus generated parts order page, the extracted, detailed information related to the parts and the information indicating the information type to be transmitted to the parts order receiving server;

displaying the parts order page;

accepting, at a predetermined location on the parts order page, the quantity to be ordered for each of the parts; and employing the method, included in the email setup information, for writing information for an email to be transmitted to the parts order receiving server, and for generating an email in order to transmit, to an email address, information for the parts order receiving server, the type of information, which is embedded in the parts order page to be transmitted to the parts order receiving server and that is related to the parts, and the quantity of each of the parts to be ordered.

Furthermore, to achieve this objective, according to the present invention, provided is a recording medium, on which recorded is an electronic service manual display program that permits a computer to provide a function for displaying, on a display device, information that is related to parts and that is used for a predetermined product constituted by an electric circuit or an electronic circuit employing the parts as components, and at the least either a board diagram that represents not only a board used for the predetermined product but also the parts mounted on the board, or a circuit diagram that represents a circuit provided on the board, and that permits the computer to perform the steps of:

displaying an index page display area for displaying an index page on which a list of names for, at the least, either the board or the circuit is published;

displaying a parts table page display area for displaying a parts table page on which a list of the parts is published;

displaying a drawing display area to display a drawing, at the least, either a board diagram for the board or a circuit diagram for the circuit;

displaying the index page in the index page display area;

displaying the parts table page in the parts table page display area;

establishing in advance, for each of the names published on the index page, index page information, which is drawing identification information for the drawing corresponding to the names, and when one of the names displayed in the index page display area is selected, obtaining from the index page information the drawing identification information that is designated for the selected name;

when the thus obtained drawing identification information is information for a designation of the board diagram or the circuit diagram, searching for and displaying, in the drawing display area, the board diagram or the circuit diagram that corresponds to the drawing identification information;

when the drawing identification information thus obtained is information for a designation of both the board diagram and the circuit diagram, dividing the drawing display area into first and second display areas and searching for and displaying, in the first and second display areas, the board diagram and the circuit diagram that correspond to the drawing identification information;

establishing in advance, for graphics primitives that are constituents of the drawing, graphics primitive information that is parts identification information corresponding to the parts, and when a predetermined operation is performed for one of the graphics primitives that constitute the board diagram or the circuit diagram displayed in the drawing display area, generating and displaying menu information that includes a choice for issuing an order for parts using email;

generating a parts order page when the choice for issuing an order for parts using email is selected in the menu information, and based on the parts identification information included in the graphics primitive information for the selected graphics primitive, extracting for the part, from parts table database information wherein detailed information related to each of the parts is stored together with parts identification information for parts, detailed information that includes parts identification information provided in the graphics primitive information for the selected graphics primitive;

reading email setup information wherein are entered email address information for a predetermined parts order receiving server that receives an order for the parts, information showing an information type to be transmitted to the parts order receiving server, and a method for writing information in an email to be transmitted to the parts order receiving server;

employing the email setup information to selectively embed, in the thus generated parts order page, the extracted, detailed information related to the parts and the information indicating the information type to be transmitted to the parts order receiving server;

displaying the parts order page;

accepting, at a predetermined location on the parts order page, the quantity to be ordered for each of the parts; and employing the method, included in the email setup information, for writing information for an email to be transmitted to the parts order receiving server, and for generating an email in order to transmit, to an email address, information for the parts order receiving server, the type of information, which is embedded in the parts order page to be transmitted to the parts order receiving server and that is related to the parts, and the quantity of each of the parts to be ordered.

In addition, to achieve this objective, according to the present invention, provided is an electronic service manual display control method, for displaying, on a display device, information that is related to parts and that is used for a predetermined product constituted by an electric circuit or an electronic circuit employing the parts as components, and at the least either a board diagram that represents not only a board used for the predetermined product but also the parts mounted on the board, or a circuit diagram that represents a circuit provided on the board, comprising the steps of:

displaying, in a designated index page display area, an index page showing a list of names for, at the least, either the board or the circuit;

displaying, in a designated parts table page display area, a parts table page showing a list of the parts;

establishing in advance, for each of the names published on the index page, index page information, which is drawing identification information for a drawing, at the least either a board diagram for the board or a circuit diagram for the circuit, that corresponds to the name, and when one of the names displayed on the index page display area is selected, obtaining from the index page information the drawing identification information that is designated in correlation with the selected name;

searching for the drawing designated by the thus obtained drawing identification information, and displaying the drawing in a designated drawing display area;

reading network connection destination information, including parts ordering setup information wherein are entered URL information for a predetermined order receiving server that receives orders for the parts, information indicating an information type to be transmitted to the parts order receiving server, and a method for the transmission of orders to the parts order receiving server;

establishing in advance, for graphics primitives that are constituents of the drawing, graphics primitive information, which is parts identification information corresponding to the parts, and when a predetermined operation is performed for one of the graphics primitives that constitute the board diagram or the circuit diagram displayed in the drawing display area, examining the network connection destination information to generate and display menu information that includes choices for the issue of an order for parts to the parts order receiving server;

generating a parts order page when in the menu information a choice is selected for issuing an order for parts to the parts order receiving order, and based on the parts identification information included in the graphics primitive information for the selected graphics primitive, obtaining for the part, from parts table database information wherein detailed information for each of the parts is stored together with the parts identification information, an information type to be transmitted to the parts order receiving server, and embedding, in the parts order page, the information type that is to be transmitted to the parts order receiving server and that is related to each of the parts;

displaying the parts order page;

accepting, at a predetermined location in the parts order page, an entry for the quantity of each of the parts to be ordered;

employing the method for the transmission to the parts order receiving server to transmit, to the parts order receiving server designated by the URL information, the information type that is to be transmitted to the parts order receiving server and is related to each of the parts, and the quantity of each of the parts to be ordered;

receiving from the parts order receiving server order acceptance results related to the parts; and displaying the order acceptance results that have been received.

Further, to achieve this objective, according to the present invention, provided is an electronic service manual display control method, for displaying, on a display device, information that is related to parts and that is used for a predetermined product constituted by an electric circuit or an electronic circuit employing the parts as components, and at the least either a board diagram that represents not only a board used for the predetermined product but also the parts mounted on the board, or a circuit diagram that represents a circuit provided on the board, comprising the steps of:

displaying, in a designated index page display area, an index page showing a list of names for, at the least, either the board or the circuit;

displaying, in a designated parts table page display area, a parts table page showing a list of the parts;

establishing in advance, for each of the names published on the index page, index page information, which is drawing identification information for a drawing, at the least either a board diagram for the board or a circuit diagram for the circuit, that corresponds to the name, and when one of the names displayed on the index page display area is selected, obtaining from the index page information the drawing identification information that is designated in correlation with the selected name;

searching for the drawing designated by the thus obtained drawing identification information, and displaying the drawing in a designated drawing display area;

establishing in advance, for graphics primitives that are constituents of the drawing, graphics primitive information that is parts identification information corresponding to the parts, and when a predetermined operation is performed for one of the graphics primitives that constitute the board diagram or the circuit diagram displayed in the drawing display area, generating and displaying menu information that includes a choice for issuing an order for parts using email;

generating a parts order page when the choice for issuing an order for parts using email is selected in the menu information, and based on the parts identification information included in the graphics primitive information for the selected graphics primitive, extracting for the part, from parts table database information wherein detailed information related to each of the parts is stored together with parts identification information for parts, detailed information that includes parts identification information provided in the graphics primitive information for the selected graphics primitive;

reading email setup information wherein are entered email address information for a predetermined parts order receiving server that receives an order for the parts, information showing an information type to be transmitted to the parts order receiving server, and a method for writing information in an email to be transmitted to the parts order receiving server;

employing the email setup information to selectively embed, in the thus generated parts order page, the extracted, detailed information related to the parts and the information indicating the information type to be transmitted to the parts order receiving server;

displaying the parts order page;

accepting, at a predetermined location on the parts order page, the quantity to be ordered for each of the parts; and employing the method, included in the email setup information, for writing information for an email to be transmitted to the parts order receiving server, and for generating an email in order to transmit, to an email address, information for the parts order receiving server, the type of information, which is embedded in the parts order page to be transmitted to the parts order receiving server and that is related to the parts, and the quantity of each of the parts to be ordered.

In addition, to achieve this objective, according to the present invention, provided is an electronic service manual display control apparatus, for displaying, on a display device, information that is related to parts and that is used for a predetermined product constituted by an electric circuit or an electronic circuit employing the parts as components, and at the least either a board diagram that represents not only a board used for the predetermined product but also the parts mounted on the board, or a circuit diagram that represents a circuit provided on the board, comprising:

means for displaying, in a designated index page display area, an index page showing a list of names for, at the least, either the board or the circuit;

means for displaying, in a designated parts table page display area, a parts table page showing a list of the parts;

means for establishing in advance, for each of the names published on the index page, index page information, which is drawing identification information for a drawing, at the least either a board diagram for the board or a circuit diagram for the circuit, that corresponds to the name, and for, when one of the names displayed on the index page display area is selected, obtaining from the index page information the drawing identification information that is designated in correlation with the selected name;

means for searching for the drawing designated by the thus obtained drawing identification information, and for displaying the drawing in a designated drawing display area;

means for reading network connection destination information, including parts ordering setup information wherein are entered URL information for a predetermined order receiving server that receives orders for the parts, information indicating an information type to be transmitted to the parts order receiving server, and a method for the transmission of orders to the parts order receiving server;

means for establishing in advance, for graphics primitives that are constituents of the drawing, graphics primitive information, which is parts identification information corresponding to the parts, and for, when a predetermined operation is performed for one of the graphics primitives that constitute the board diagram or the circuit diagram displayed in the drawing display area, examining the network connection destination information to generate and display menu information that includes choices for the issue of an order for parts to the parts order receiving server;

means for generating a parts order page when in the menu information a choice is selected for issuing an order for parts to the parts order receiving order, and for, based on the parts identification information included in the graphics primitive information for the selected graphics primitive, obtaining for the part, from parts table database information wherein detailed information for each of the parts is stored together with the parts identification information, an information type to be transmitted to the parts order receiving server, and embedding, in the parts order page, the information type that is to be transmitted to the parts order receiving server and that is related to each of the parts;

means for displaying the parts order page;

means for accepting, at a predetermined location in the parts order page, an entry for the quantity of each of the parts to be ordered;

means for employing the method for the transmission to the parts order receiving server to transmit, to the parts order receiving server designated by the URL information, the information type that is to be transmitted to the parts order receiving server and is related to each of the parts, and the quantity of each of the parts to be ordered;

means for receiving from the parts order receiving server order acceptance results related to the parts; and means for displaying the order acceptance results that have been received.

Further, to achieve this objective, according to the present invention, provided is an electronic service manual display control apparatus, for displaying, on a display device, information that is related to parts and that is used for a predetermined product constituted by an electric circuit or an electronic circuit employing the parts as components, and at the least either a board diagram that represents not only a board used for the predetermined product but also the parts mounted on the board, or a circuit diagram that represents a circuit provided on the board, comprising:

means for displaying, in a designated index page display area, an index page showing a list of names for, at the least, either the board or the circuit;

means for displaying, in a designated parts table page display area, a parts table page showing a list of the parts;

means for establishing in advance, for each of the names published on the index page, index page information, which is drawing identification information for a drawing, at the least either a board diagram for the board or a circuit diagram for the circuit, that corresponds to the name, and for, when one of the names displayed on the index page display area is selected, obtaining from the index page information the drawing identification information that is designated in correlation with the selected name;

means for searching for the drawing designated by the thus obtained drawing identification information, and displaying the drawing in a designated drawing display area;

means for establishing in advance, for graphics primitives that are constituents of the drawing, graphics primitive information that is parts identification information corresponding to the parts, and for, when a predetermined operation is performed for one of the graphics primitives that constitute the board diagram or the circuit diagram displayed in the drawing display area, generating and displaying menu information that includes a choice for issuing an order for parts using email;

means for generating a parts order page when the choice for issuing an order for parts using email is selected in the menu information, and for, based on the parts identification information included in the graphics primitive information for the selected graphics primitive, extracting for the part, from parts table database information wherein detailed information related to each of the parts is stored together with parts identification information for parts, detailed information that includes parts identification information provided in the graphics primitive information for the selected graphics primitive;

means for reading email setup information wherein are entered email address information for a predetermined parts order receiving server that receives an order for the parts, information showing an information type to be transmitted to the parts order receiving server, and a method for writing information in an email to be transmitted to the parts order receiving server;

means for employing the email setup information to selectively embed, in the thus generated parts order page, the extracted, detailed information related to the parts and the information indicating the information type to be transmitted to the parts order receiving server;

means for displaying the parts order page;

means for accepting, at a predetermined location on the parts order page, the quantity to be ordered for each of the parts; and means for employing the method, included in the email setup information, for writing information for an email to be transmitted to the parts order receiving server, and for generating an email in order to transmit, to an email address, information for the parts order receiving server, the type of information, which is embedded in the parts order page to be transmitted to the parts order receiving server and that is related to the parts, and the quantity of each of the parts to be ordered.

Moreover, to achieve this objective, according to the present invention, provided is a program transmission method, for transmitting an electronic service manual display program, which permits a computer to provide a function for displaying, on a display device, information that is related to parts and that is used for a predetermined product constituted by an electric circuit or an electronic circuit employing the parts as components, and at the least either a board diagram that represents not only a board used for the predetermined product but also the parts mounted on the board, or a circuit diagram that represents a circuit provided on the board, comprising the steps of:

converting the electronic service manual display program into a digital signal sequence, for a communication line or a network, with an added header; and initiating employment of a communication protocol with a partner station across the communication line or the network and transmitting the digital signal sequence, whereby the electronic service manual display program includes the steps of displaying, in a designated index page display area, an index page showing a list of names for, at the least, either the board or the circuit, displaying, in a designated parts table page display area, a parts table page showing a list of the parts, establishing in advance, for each of the names published on the index page, index page information, which is drawing identification information for a drawing, at the least either a board diagram for the board or a circuit diagram for the circuit, that corresponds to the name, and when one of the names displayed on the index page display area is selected, obtaining from the index page information the drawing identification information that is designated in correlation with the selected name, searching for the drawing designated by the thus obtained drawing identification information, and displaying the drawing in a designated drawing display area, reading network connection destination information, including parts ordering setup information wherein are entered URL information for a predetermined order receiving server that accepts orders for the parts, information indicating an information type to be transmitted to the parts order receiving server, and a method for the transmission of orders to the parts order receiving server, establishing in advance, for graphics primitives that are constituents of the drawing, graphics primitive information, which is parts identification information corresponding to the parts, and when a predetermined operation is performed for one of the graphics primitives that constitute the board diagram or the circuit diagram displayed in the drawing display area, examining the network connection destination information to generate and display menu information that includes choices for the issue of an order for parts to the parts order receiving server, generating a parts order page when in the menu information a choice is selected for issuing an order for parts to the parts order receiving order, and based on the parts identification information included in the graphics primitive information for the selected graphics primitive, obtaining for the part, from parts table database information wherein detailed information for each of the parts is stored together with the parts identification information, an information type to be transmitted to the parts order receiving server, and embedding, in the parts order page, the information type that is to be transmitted to the parts order receiving server and that is related to each of the parts, displaying the parts order page, accepting, at a predetermined location in the parts order page, an entry for the quantity of each of the parts to be ordered, employing the method for the transmission to the parts order receiving server to transmit, to the parts order receiving server designated by the URL information, the information type that is to be transmitted to the parts order receiving server and is related to each of the parts, and the quantity of each of the parts to be ordered, receiving from the parts order receiving server order acceptance results related to the parts, and displaying the order acceptance results that have been received.

Further, to achieve this objective, according to the present invention, provided is a program transmission method, for transmitting an electronic service manual display program, which permits a computer to provide a function for displaying, on a display device, information that is related to parts and that is used for a predetermined product constituted by an electric circuit or an electronic circuit employing the parts as components, and at the least either a board diagram that represents not only a board used for the predetermined product but also the parts mounted on the board, or a circuit diagram that represents a circuit provided on the board, comprising the steps of:

converting the electronic service manual display program into a digital signal sequence, for a communication line or a network, with an added header; and initiating employment of a communication protocol with a partner station across the communication line or the network and transmitting the digital signal sequence, whereby the electronic service manual display program includes the steps of displaying, in a designated index page display area, an index page showing a list of names for, at the least, either the board or the circuit, displaying, in a designated parts table page display area, a parts table page showing a list of the parts, establishing in advance, for each of the names published on the index page, index page information, which is drawing identification information for a drawing, at the least either a board diagram for the board or a circuit diagram for the circuit, that corresponds to the name, and when one of the names displayed on the index page display area is selected, obtaining from the index page information the drawing identification information that is designated in correlation with the selected name, searching for the drawing designated by the thus obtained drawing identification information, and displaying the drawing in a designated drawing display area, establishing in advance, for graphics primitives that are constituents of the drawing, graphics primitive information that is parts identification information corresponding to the parts, and when a predetermined operation is performed for one of the graphics primitives that constitute the board diagram or the circuit diagram displayed in the drawing display area, generating and displaying menu information that includes a choice for issuing an order for parts using email, generating a parts order page when the choice for issuing an order for parts using email is selected in the menu information, and based on the parts identification information included in the graphics primitive information for the selected graphics primitive, extracting for the part, from parts table database information wherein detailed information related to each of the parts is stored together with parts identification information for parts, detailed information that includes parts identification information provided in the graphics primitive information for the selected graphics primitive, reading email setup information wherein are entered email address information for a predetermined parts order receiving server that receives an order for the parts, information showing an information type to be transmitted to the parts order receiving server, and a method for writing information in an email to be transmitted to the parts order receiving server, employing the email setup information to selectively embed, in the thus generated parts order page, the extracted, detailed information related to the parts and the information indicating the information type to be transmitted to the parts order receiving server, displaying the parts order page, accepting, at a predetermined location on the parts order page, the quantity to be ordered for each of the parts, and employing the method, included in the email setup information, for writing information for an email to be transmitted to the parts order receiving server, and for generating an email in order to transmit, to an email address, information for the parts order receiving server, the type of information, which is embedded in the parts order page to be transmitted to the parts order receiving server and that is related to the parts, and the quantity of each of the parts to be ordered.

Furthermore, to achieve this objective, according to the present invention, provided is a program transmission apparatus, for transmitting an electronic service manual display program, which permits a computer to provide a function for displaying, on a display device, information that is related to parts and that is used for a predetermined product constituted by an electric circuit or an electronic circuit employing the parts as components, and at the least either a board diagram that represents not only a board used for the predetermined product but also the parts mounted on the board, or a circuit diagram that represents a circuit provided on the board, comprising:

conversion means for converting the electronic service manual display program into a digital signal sequence, for a communication line or a network, with an added header; and transmission means for initiating employment of a communication protocol with a partner station across the communication line or the network and transmitting the digital signal sequence, wherein the electronic service manual display program includes the steps of displaying, in a designated index page display area, an index page showing a list of names for, at the least, either the board or the circuit, displaying, in a designated parts table page display area, a parts table page showing a list of the parts, establishing in advance, for each of the names published on the index page, index page information, which is drawing identification information for a drawing, at the least either a board diagram for the board or a circuit diagram for the circuit, that corresponds to the name, and when one of the names displayed on the index page display area is selected, obtaining from the index page information the drawing identification information that is designated in correlation with the selected name, searching for the drawing designated by the thus obtained drawing identification information, and displaying the drawing in a designated drawing display area, reading network connection destination information, including parts ordering setup information wherein are entered URL information for a predetermined order receiving server that accepts orders for the parts, information indicating an information type to be transmitted to the parts order receiving server, and a method for the transmission of orders to the parts order receiving server, establishing in advance, for graphics primitives that are constituents of the drawing, graphics primitive information, which is parts identification information corresponding to the parts, and when a predetermined operation is performed for one of the graphics primitives that constitute the board diagram or the circuit diagram displayed in the drawing display area, examining the network connection destination information to generate and display menu information that includes choices for the issue of an order for parts to the parts order receiving server, generating a parts order page when in the menu information a choice is selected for issuing an order for parts to the parts order receiving order, and based on the parts identification information included in the graphics primitive information for the selected graphics primitive, obtaining for the part, from parts table database information wherein detailed information for each of the parts is stored together with the parts identification information, an information type to be transmitted to the parts order receiving server, and embedding, in the parts order page, the information type that is to be transmitted to the parts order receiving server and that is related to each of the parts, displaying the parts order page, accepting, at a predetermined location in the parts order page, an entry for the quantity of each of the parts to be ordered, employing the method for the transmission to the parts order receiving server to transmit, to the parts order receiving server designated by the URL information, the information type that is to be transmitted to the parts order receiving server and is related to each of the parts, and the quantity of each of the parts to be ordered, receiving from the parts order receiving server order acceptance results related to the parts, and displaying the order acceptance results that have been received.

Also, to achieve this objective, according to the present invention, provided is a program transmission apparatus, for transmitting an electronic service manual display program, which permits a computer to provide a function for displaying, on a display device, information that is related to parts and that is used for a predetermined product constituted by an electric circuit or an electronic circuit employing the parts as components, and at the least either a board diagram that represents not only a board used for the predetermined product but also the parts mounted on the board, or a circuit diagram that represents a circuit provided on the board, comprising:

conversion means for converting the electronic service manual display program into a digital signal sequence, for a communication line or a network, with an added header; and transmission means for initiating employment of a communication protocol with a partner station across the communication line or the network and transmitting the digital signal sequence, wherein the electronic service manual display program includes the steps of displaying, in a designated index page display area, an index page showing a list of names for, at the least, either the board or the circuit, displaying, in a designated parts table page display area, a parts table page showing a list of the parts, establishing in advance, for each of the names published on the index page, index page information, which is drawing identification information for a drawing, at the least either a board diagram for the board or a circuit diagram for the circuit, that corresponds to the name, and when one of the names displayed on the index page display area is selected, obtaining from the index page information the drawing identification information that is designated in correlation with the selected name, searching for the drawing designated by the thus obtained drawing identification information, and displaying the drawing in a designated drawing display area, establishing in advance, for graphics primitives that are constituents of the drawing, graphics primitive information that is parts identification information corresponding to the parts, and when a predetermined operation is performed for one of the graphics primitives that constitute the board diagram or the circuit diagram displayed in the drawing display area, generating and displaying menu information that includes a choice for issuing an order for parts using email, generating a parts order page when the choice for issuing an order for parts using email is selected in the menu information, and based on the parts identification information included in the graphics primitive information for the selected graphics primitive, extracting for the part, from parts table database information wherein detailed information related to each of the parts is stored together with parts identification information for parts, detailed information that includes parts identification information provided in the graphics primitive information for the selected graphics primitive, reading email setup information wherein are entered email address information for a predetermined parts order receiving server that receives an order for the parts, information showing an information type to be transmitted to the parts order receiving server, and a method for writing information in an email to be transmitted to the parts order receiving server, employing the email setup information to selectively embed, in the thus generated parts order page, the extracted, detailed information related to the parts and the information indicating the information type to be transmitted to the parts order receiving server, displaying the parts order page, accepting, at a predetermined location on the parts order page, the quantity to be ordered for each of the parts, and employing the method, included in the email setup information, for writing information for an email to be transmitted to the parts order receiving server, and for generating an email in order to transmit, to an email address, information for the parts order receiving server, the type of information, which is embedded in the parts order page to be transmitted to the parts order receiving server and that is related to the parts, and the quantity of each of the parts to be ordered.

Moreover, to achieve this objective, according to the present invention, provided is a program reception method, for receiving an electronic service manual display program, which permits a computer to provide a function for displaying, on a display device, information that is related to parts and that is used for a predetermined product constituted by an electric circuit or an electronic circuit employing the parts as components, and at the least either a board diagram that represents not only a board used for the predetermined product but also the parts mounted on the board, or a circuit diagram that represents a circuit provided on the board, comprising the steps of:

initiating employment of a communication protocol with a partner station across a communication line or a network and receiving a digital signal sequence; and removing headers from the digital signal sequence and converting the digital signal sequence used for a communication line or a network into the original electronic service manual display program, whereby the electronic service manual display program includes the steps of displaying, in a designated index page display area, an index page showing a list of names for, at the least, either the board or the circuit, displaying, in a designated parts table page display area, a parts table page showing a list of the parts, establishing in advance, for each of the names published on the index page, index page information, which is drawing identification information for a drawing, at the least either a board diagram for the board or a circuit diagram for the circuit, that corresponds to the name, and when one of the names displayed on the index page display area is selected, obtaining from the index page information the drawing identification information that is designated in correlation with the selected name, searching for the drawing designated by the thus obtained drawing identification information, and displaying the drawing in a designated drawing display area, reading network connection destination information, including parts ordering setup information wherein are entered URL information for a predetermined order receiving server that accepts orders for the parts, information indicating an information type to be transmitted to the parts order receiving server, and a method for the transmission of orders to the parts order receiving server, establishing in advance, for graphics primitives that are constituents of the drawing, graphics primitive information, which is parts identification information corresponding to the parts, and when a predetermined operation is performed for one of the graphics primitives that constitute the board diagram or the circuit diagram displayed in the drawing display area, examining the network connection destination information to generate and display menu information that includes choices for the issue of an order for parts to the parts order receiving server, generating a parts order page when in the menu information a choice is selected for issuing an order for parts to the parts order receiving order, and based on the parts identification information included in the graphics primitive information for the selected graphics primitive, obtaining for the part, from parts table database information wherein detailed information for each of the parts is stored together with the parts identification information, an information type to be transmitted to the parts order receiving server, and embedding, in the parts order page, the information type that is to be transmitted to the parts order receiving server and that is related to each of the parts, displaying the parts order page, accepting, at a predetermined location in the parts order page, an entry for the quantity of each of the parts to be ordered, employing the method for the transmission to the parts order receiving server to transmit, to the parts order receiving server designated by the URL information, the information type that is to be transmitted to the parts order receiving server and is related to each of the parts, and the quantity of each of the parts to be ordered, receiving from the parts order receiving server order acceptance results related to the parts, and displaying the order acceptance results that have been received.

Further, to achieve this objective, according to the present invention, provided is a program reception method, for receiving an electronic service manual display program, which permits a computer to provide a function for displaying, on a display device, information that is related to parts and that is used for a predetermined product constituted by an electric circuit or an electronic circuit employing the parts as components, and at the least either a board diagram that represents not only a board used for the predetermined product but also the parts mounted on the board, or a circuit diagram that represents a circuit provided on the board, comprising the steps of:

initiating employment of a communication protocol with a partner station across a communication line or a network and receiving a digital signal sequence; and removing headers from the digital signal sequence and converting the digital signal sequence used for a communication line or a network into the original electronic service manual display program, whereby the electronic service manual display program includes the steps of displaying, in a designated index page display area, an index page showing a list of names for, at the least, either the board or the circuit, displaying, in a designated parts table page display area, a parts table page showing a list of the parts, establishing in advance, for each of the names published on the index page, index page information, which is drawing identification information for a drawing, at the least either a board diagram for the board or a circuit diagram for the circuit, that corresponds to the name, and when one of the names displayed on the index page display area is selected, obtaining from the index page information the drawing identification information that is designated in correlation with the selected name, searching for the drawing designated by the thus obtained drawing identification information, and displaying the drawing in a designated drawing display area, establishing in advance, for graphics primitives that are constituents of the drawing, graphics primitive information that is parts identification information corresponding to the parts, and when a predetermined operation is performed for one of the graphics primitives that constitute the board diagram or the circuit diagram displayed in the drawing display area, generating and displaying menu information that includes a choice for issuing an order for parts using email, generating a parts order page when the choice for issuing an order for parts using email is selected in the menu information, and based on the parts identification information included in the graphics primitive information for the selected graphics primitive, extracting for the part, from parts table database information wherein detailed information related to each of the parts is stored together with parts identification information for parts, detailed information that includes parts identification information provided in the graphics primitive information for the selected graphics primitive, reading email setup information wherein are entered email address information for a predetermined parts order receiving server that receives an order for the parts, information showing an information type to be transmitted to the parts order receiving server, and a method for writing information in an email to be transmitted to the parts order receiving server, employing the email setup information to selectively embed, in the thus generated parts order page, the extracted, detailed information related to the parts and the information indicating the information type to be transmitted to the parts order receiving server, displaying the parts order page, accepting, at a predetermined location on the parts order page, the quantity to be ordered for each of the parts, and employing the method, included in the email setup information, for writing information for an email to be transmitted to the parts order receiving server, and for generating an email in order to transmit, to an email address, information for the parts order receiving server, the type of information, which is embedded in the parts order page to be transmitted to the parts order receiving server and that is related to the parts, and the quantity of each of the parts to be ordered.

In addition, to achieve this objective, according to the present invention, provided is a program reception apparatus, for receiving an electronic service manual display program, which permits a computer to provide a function for displaying, on a display device, information that is related to parts and that is used for a predetermined product constituted by an electric circuit or an electronic circuit employing the parts as components, and at the least either a board diagram that represents not only a board used for the predetermined product but also the parts mounted on the board, or a circuit diagram that represents a circuit provided on the board, comprising:

reception means for initiating employment of a communication protocol with a partner station across a communication line or a network and receiving a digital signal sequence; and conversion means for removing headers from the digital signal sequence and converting the digital signal sequence used for a communication line or a network into the original electronic service manual display program, wherein the electronic service manual display program includes the steps of displaying, in a designated index page display area, an index page showing a list of names for, at the least, either the board or the circuit, displaying, in a designated parts table page display area, a parts table page showing a list of the parts, establishing in advance, for each of the names published on the index page, index page information, which is drawing identification information for a drawing, at the least either a board diagram for the board or a circuit diagram for the circuit, that corresponds to the name, and when one of the names displayed on the index page display area is selected, obtaining from the index page information the drawing identification information that is designated in correlation with the selected name, searching for the drawing designated by the thus obtained drawing identification information, and displaying the drawing in a designated drawing display area, reading network connection destination information, including parts ordering setup information wherein are entered URL information for a predetermined order receiving server that accepts orders for the parts, information indicating an information type to be transmitted to the parts order receiving server, and a method for the transmission of orders to the parts order receiving server, establishing in advance, for graphics primitives that are constituents of the drawing, graphics primitive information, which is parts identification information corresponding to the parts, and when a predetermined operation is performed for one of the graphics primitives that constitute the board diagram or the circuit diagram displayed in the drawing display area, examining the network connection destination information to generate and display menu information that includes choices for the issue of an order for parts to the parts order receiving server, generating a parts order page when in the menu information a choice is selected for issuing an order for parts to the parts order receiving order, and based on the parts identification information included in the graphics primitive information for the selected graphics primitive, obtaining for the part, from parts table database information wherein detailed information for each of the parts is stored together with the parts identification information, an information type to be transmitted to the parts order receiving server, and embedding, in the parts order page, the information type that is to be transmitted to the parts order receiving server and that is related to each of the parts, displaying the parts order page, accepting, at a predetermined location in the parts order page, an entry for the quantity of each of the parts to be ordered, employing the method for the transmission to the parts order receiving server to transmit, to the parts order receiving server designated by the URL information, the information type that is to be transmitted to the parts order receiving server and is related to each of the parts, and the quantity of each of the parts to be ordered, receiving from the parts order receiving server order acceptance results related to the parts, and displaying the order acceptance results that have been received.

Further, to achieve this objective, according to the present invention, provided is a program reception apparatus, for receiving an electronic service manual display program, which permits a computer to provide a function for displaying, on a display device, information that is related to parts and that is used for a predetermined product constituted by an electric circuit or an electronic circuit employing the parts as components, and at the least either a board diagram that represents not only a board used for the predetermined product but also the parts mounted on the board, or a circuit diagram that represents a circuit provided on the board, comprising:

reception means for initiating employment of a communication protocol with a partner station across a communication line or a network and receiving a digital signal sequence; and conversion means for removing headers from the digital signal sequence and converting the digital signal sequence used for a communication line or a network into the original electronic service manual display program, wherein the electronic service manual display program includes the steps of displaying, in a designated index page display area, an index page showing a list of names for, at the least, either the board or the circuit, displaying, in a designated parts table page display area, a parts table page showing a list of the parts, establishing in advance, for each of the names published on the index page, index page information, which is drawing identification information for a drawing, at the least either a board diagram for the board or a circuit diagram for the circuit, that corresponds to the name, and when one of the names displayed on the index page display area is selected, obtaining from the index page information the drawing identification information that is designated in correlation with the selected name, searching for the drawing designated by the thus obtained drawing identification information, and displaying the drawing in a designated drawing display area, establishing in advance, for graphics primitives that are constituents of the drawing, graphics primitive information that is parts identification information corresponding to the parts, and when a predetermined operation is performed for one of the graphics primitives that constitute the board diagram or the circuit diagram displayed in the drawing display area, generating and displaying menu information that includes a choice for issuing an order for parts using email, generating a parts order page when the choice for issuing an order for parts using email is selected in the menu information, and based on the parts identification information included in the graphics primitive information for the selected graphics primitive, extracting for the part, from parts table database information wherein detailed information related to each of the parts is stored together with parts identification information for parts, detailed information that includes parts identification information provided in the graphics primitive information for the selected graphics primitive, reading email setup information wherein are entered email address information for a predetermined parts order receiving server that receives an order for the parts, information showing an information type to be transmitted to the parts order receiving server, and a method for writing information in an email to be transmitted to the parts order receiving server, employing the email setup information to selectively embed, in the thus generated parts order page, the extracted, detailed information related to the parts and the information indicating the information type to be transmitted to the parts order receiving server, displaying the parts order page, accepting, at a predetermined location on the parts order page, the quantity to be ordered for each of the parts, and employing the method, included in the email setup information, for writing information for an email to be transmitted to the parts order receiving server, and for generating an email in order to transmit, to an email address, information for the parts order receiving server, the type of information, which is embedded in the parts order page to be transmitted to the parts order receiving server and that is related to the parts, and the quantity of each of the parts to be ordered.

BRIEF DESCRIPTION OF THE DRAWINGS

[FIG. 19] A flowchart showing the processing performed for information that is the basis for the generation of an SVG viewer context menu in the double-screen mode or the triple-screen mode according to the embodiment of the present invention.

[FIG. 20] A diagram showing example network connection destination information according to the embodiment of the present invention.

[FIG. 21] A first page of a flowchart showing the processing for issuing an order for a part that corresponds to a graphics primitive in a drawing displayed in either the frame B or the frame C or D in the double-screen mode or the triple-screen mode according to the embodiment of the present invention.

[FIG. 26] A diagram showing an example pseudo entry HTML page according to the embodiment of the present invention.

[FIG. 27] A diagram showing example order style setup information according to the embodiment of the present invention.

[FIG. 28] A diagram showing an example parts order list page according to the embodiment of the present invention.

BEST MODE FOR CARRYING OUT THE INVENTION

Figure 1:
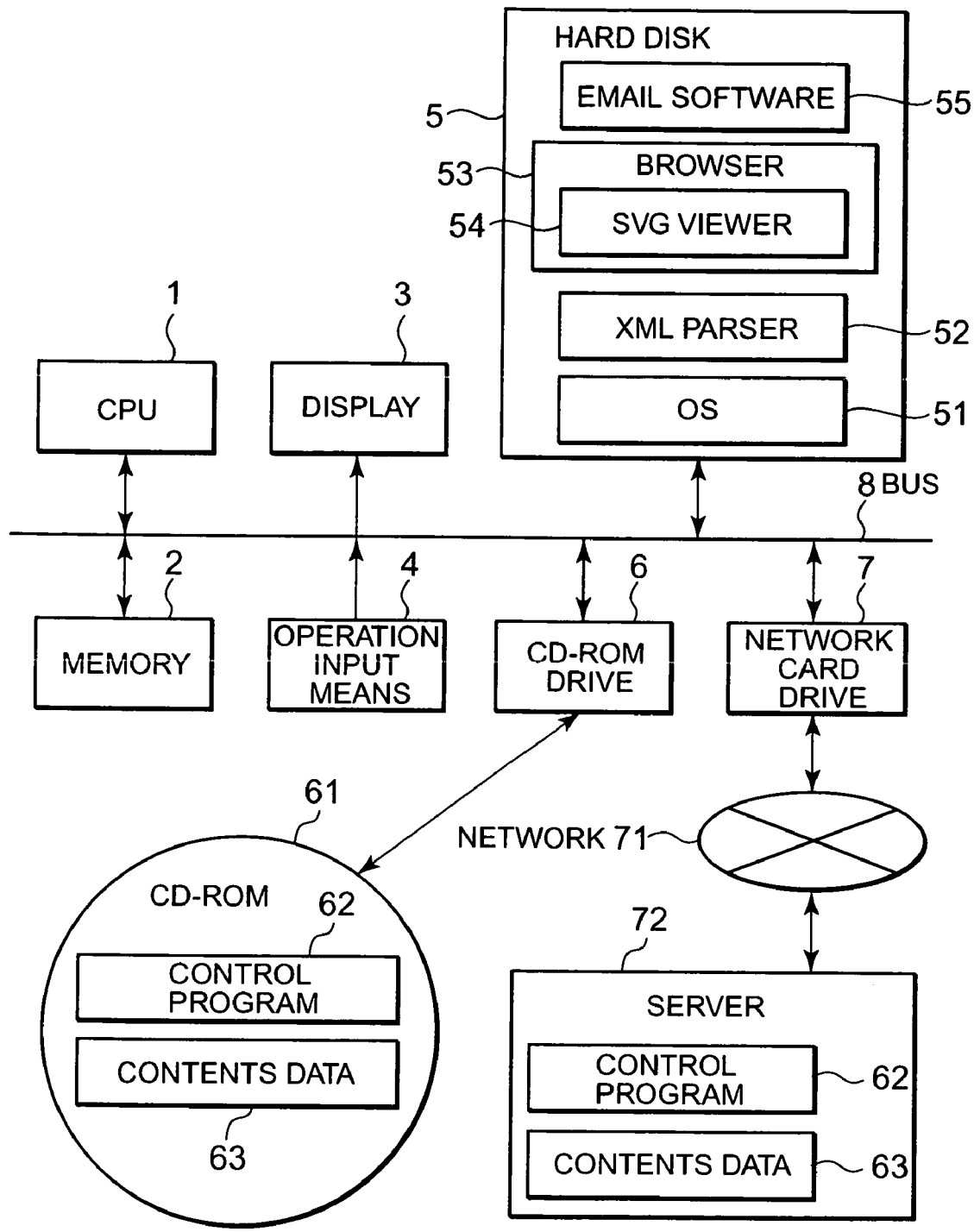
[FIG. 1] A hardware configuration diagram used for one embodiment of the present invention.

One embodiment of the present invention will now be described while referring to the drawings. FIG. 1 is a diagram showing a hardware configuration used for the embodiment of the present invention. Interconnected by a bus 8, in the state shown in FIG. 1, are a CPU (Central Processing Unit) 1, for performing a computation process and a control process; a memory 2, for temporarily storing data; a display device 3, such as a CRT (Cathode Ray Tube) display device or a liquid crystal display device for visually presenting information; operation input means 4, such as a keyboard or a mouse for entering an operation or information; a hard disk 5, for storing various digital data; a CD-ROM drive 6, for reading data recorded on a CD-ROM (Compact Disk Read Only Memory) 61; and a network card drive 7, for communicating through a network 71 with a server 72 or another communication device connected to the network.

Stored on the hard disk 5 are an OS (Operating System) 51, which is the basic software for managing software and hardware and for enabling their use by an application; an XML parser 52, for analyzing text written in the XML (extensible Markup Language) data; a browser 53, for analyzing and displaying XML data, analyzed by the XML parser 52, or HTML (Hyper Text Markup Language) data; and an SVG viewer 54, for displaying vector graphics data such as SVG (Scalable Vector Graphics) data or SVGZ (compressed SVG) data; and an email software 55. It should be noted that the SVG viewer 54 has a function for enabling the enlarged display and the reduced display of SVG data and the shifting and the display of SVG data in a drawing.

These applications are executed by the CPU 1. Further, in the state specifically shown in FIG. 1, the SVG viewer 54 is plugged into the browser 53, and the XML parser 52 is provided independently of the browser 53. However, an environment wherein, for example, the XML parser 52 is incorporated in the browser 53 may be employed. That is, in this case, any environment is available so long as XML data or SVG data can be appropriately displayed by the browser 53.

On the CD-ROM 61 are stored a control program 62, which includes script languages such as XSL (extensible Stylesheet Language) data used for determining the display style of the XML data, HTML data or JavaScript (trademark) data, and contents data 63, which include raster image data, such as XML data or PNG (Potable Network Graphics) data, and vector graphics data, such as SVG data or SVGZ data. When these data stored on the CD-ROM 61 are read by using the CD-ROM drive 6, and are processed and displayed by a script engine mounted in the XML parser 52 or the browser 53, contents having a desired form can be displayed on the browser 53. It should be noted that the SVG data are vector graphics data, the file size of which is smaller than that of PDF data, and is written on the XML base.

Further, in addition to the CD-ROM drive 6 and the CD-ROM 61, a set consisting of a DVD (Digital Versatile Disk) reading drive and a DVD, or various other recording medium readers and recording media can be employed. Further, by using the network card drive 7, a control program 62 and contents data 63 stored in a predetermined communication device (e.g., the server 72) connected to the network 71 can be obtained, and a desired display can be presented on the browser 53. Also, a required control program 62 and required contents data 63 can be stored in advance on the hard disk 5.

The configuration wherein the CPU 1, the memory 2, the display device 3, the operation input means 4, the hard disk 5, the CD-ROM drive 6 and the network card drive 7 are interconnected by the bus 8 can also be provided, for example, by a common PC. In the following explanation, an example is employed wherein a common PC is employed to perform the processing related to a service manual and to provide a display for the service manual.

An explanation will now be given for the processing performed to display contents data 63 on the display device 3. For this, a service manual related to one specific product will be described. Basically, contents data 63 are prepared for each product, so that for one product one service manual is available. That is, for example, a service manual is individually prepared for each model of a DVD audio player. To present this service manual, XML data, included with the contents data 63, are employed as a database.

To display the contents of XML data on the display device 3, first, the XML parser 52 analyzes the hierarchical structure of and the format used for the XML data stored on the CD-ROM 61, or in the server 72 or another data storage means. The XML data analyzed by the XML parser 52 are then transmitted to the browser 53 or the SVG viewer 54, where they are processed by referring to predetermined XSL data. The resultant XML data are then displayed.

A specific explanation will now be given for an index page, a circuit diagram page, a board diagram page and a parts table page that are generated, based on the XML data included in the contents data 63, and displayed on the display device 3. The index page and the parts table page are set up so that they are displayed by the browser 53, as desired, in accordance with a data set consisting of XML data for each corresponding page and predesignated XSL data. The circuit diagram page and the board diagram page are set so that they can be displayed by the browser 53, as desired, in accordance with SVG data or SVGZ data for each corresponding page.

Figure 10:
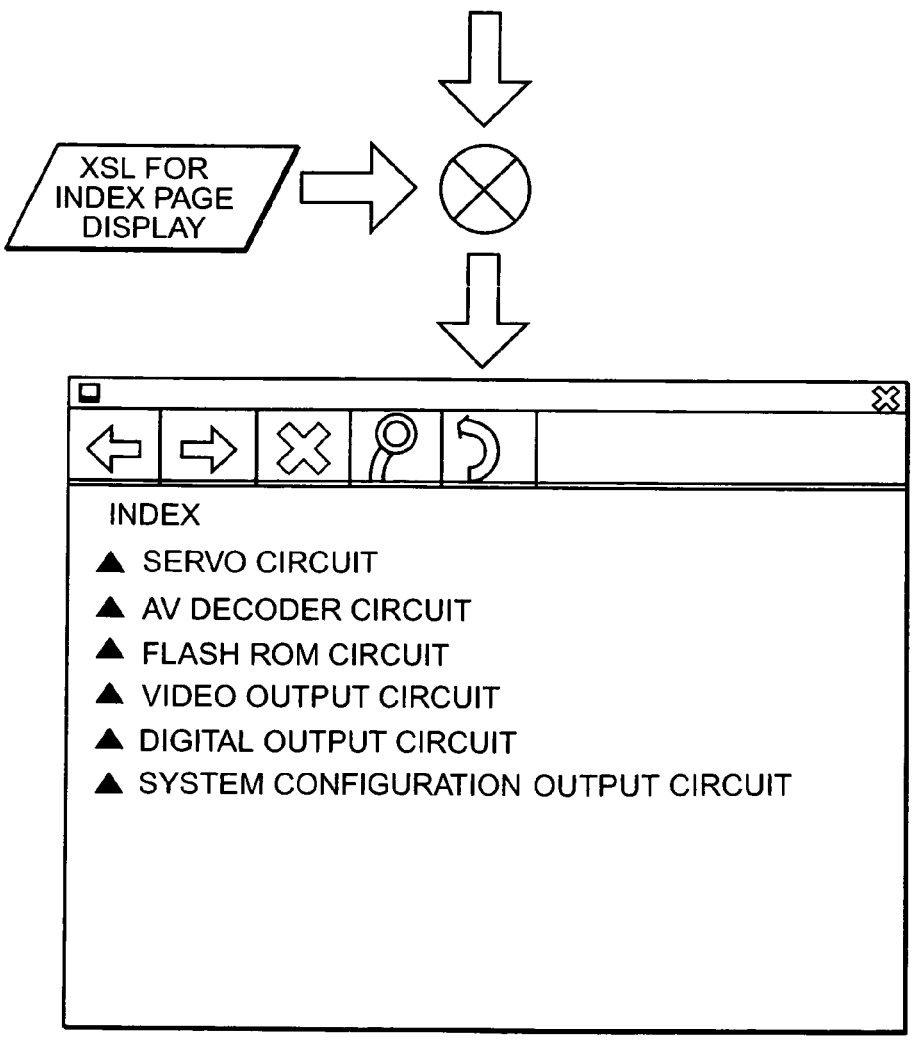
[FIG. 10] A diagram showing example index XML data and an example index page generated based on the index XML data according to the embodiment of the present invention.

For example, in FIG. 10 are shown example XML data (index XML data) for a corresponding index page and the state wherein the index XML data are processed and displayed by the browser 53. The index XML data represent a correlation of all the circuits mounted in the pertinent model, the browsing modes (which will be described later) for displaying SVG data related to the individual circuits, the circuit diagram data names (first SVG data names) for displaying detailed circuit diagrams for these circuits, and the board diagram data names (second SVG data names) for displaying display board diagrams for the individual circuits that are mounted.

To display index XML data on the browser 53, XSL for an index page display is used to process the index XML data. For example, an index page for displaying the list of circuits is generated based on the index XML data. The categories (hereinafter also referred to as drawing categories) in the circuit list can be selected by using a mouse, for example, and as will be described later, by selecting a drawing category, a circuit diagram or a board diagram that corresponds to the selected drawing category (specifically, a circuit diagram (first SVG data name) or a board diagram (second SVG data name) correlated in the index XML data) is selectively displayed in a predetermined frame.

Figure 11:
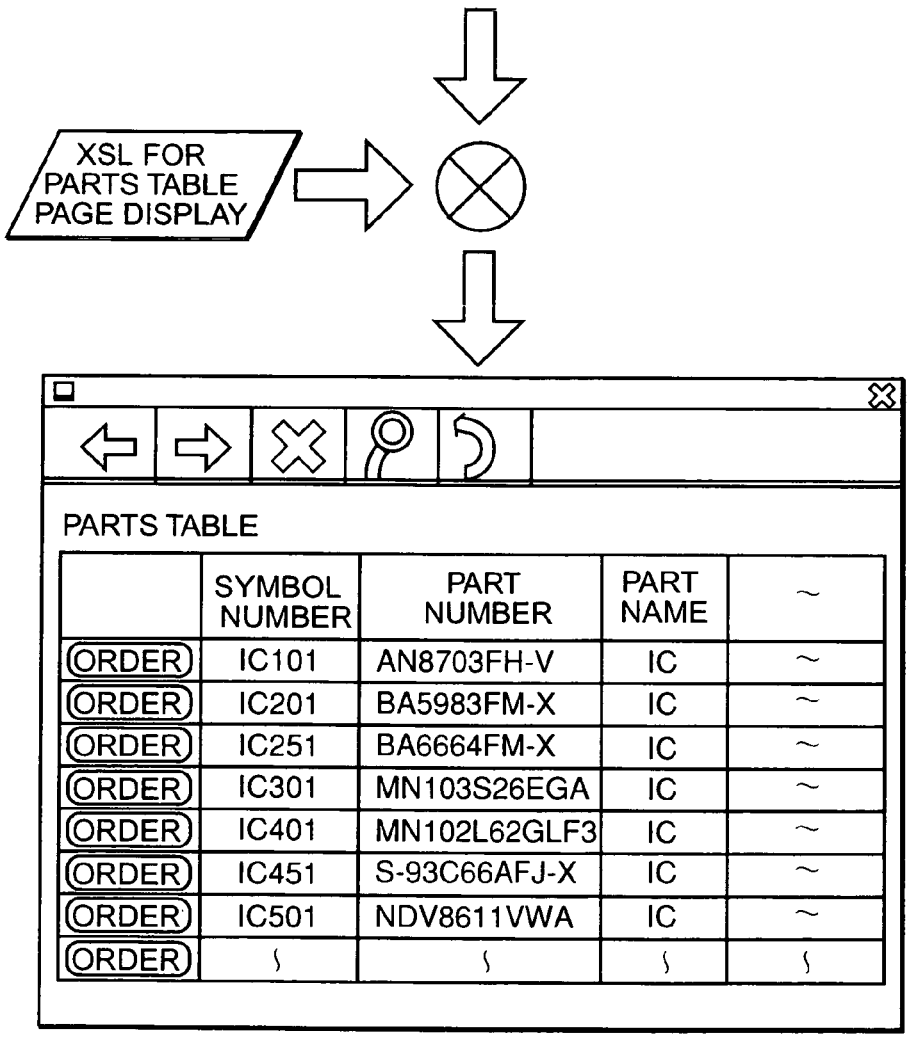
[FIG. 11] A diagram showing example parts table XML data and an example index page generated based on the parts table XML data according to the embodiment of the present invention.

Shown in FIG. 11 are example XML data (parts table XML data) corresponding to a parts table page and the state wherein the parts table XML data are processed and displayed on the browser 53. For the parts table XML data, a record is provided for each of the parts, such as an IC, a resistor and a diode, that constitute a circuit. This record includes not only various information such as a symbol number (identification number), a part number and a part name, but also the names of circuit diagram data and board diagram data where the pertinent part exists. A symbol number is provided for each part so as to correlate each part with a specific symbol number without overlapping, i.e., one record is correlated with one symbol number. Furthermore, the parts table XML data satisfactorily represents all the parts of all the circuits constituting the model.

When the parts table XML data is to be displayed by the browser 53, XSL is employed for a parts table page display. For example, a parts table page for displaying a list of parts is generated based on the parts table XML data. The individual categories (hereinafter also referred to as parts categories) on the list in the parts table can be selected by using a mouse, for example, and as will be described later, by selecting a parts category, a corresponding circuit diagram or a board diagram (specifically, a circuit diagram (first SVG data name) or a board diagram (second SVG data name) correlated in the parts XML data) is selectively displayed in a predetermined frame. Further, an order issue button, represented by "order", is displayed for each parts category, and as will be described later, by selecting this order issue button, the data transmission function of the browser 53 is employed, or an email for issuing an order is prepared, so that an order for a part corresponding to the selected order issue button can be issued to a predetermined parts order receiving server.

Figure 12:
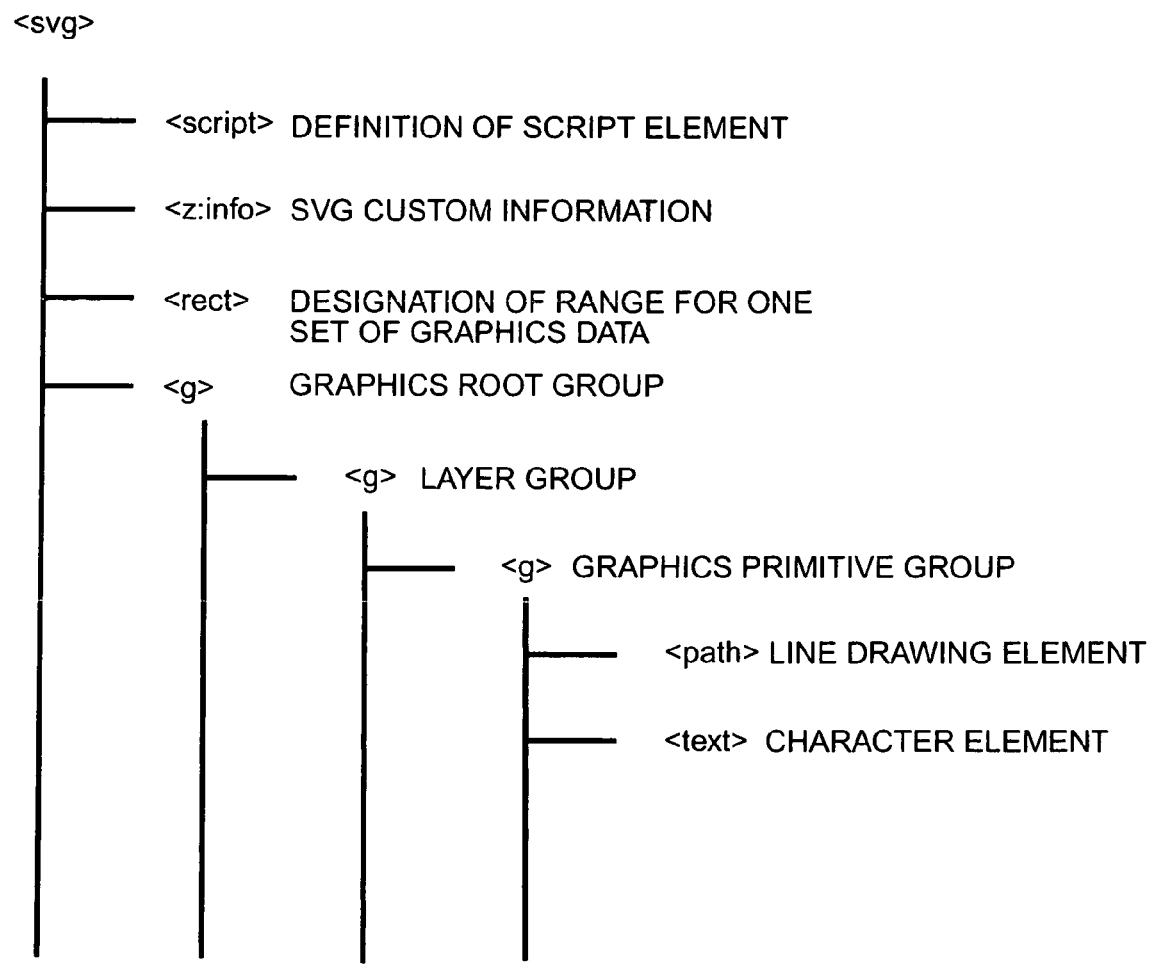
[FIG. 12] A diagram showing an example SVG data structure according to the embodiment of the present invention.
Figure 13:
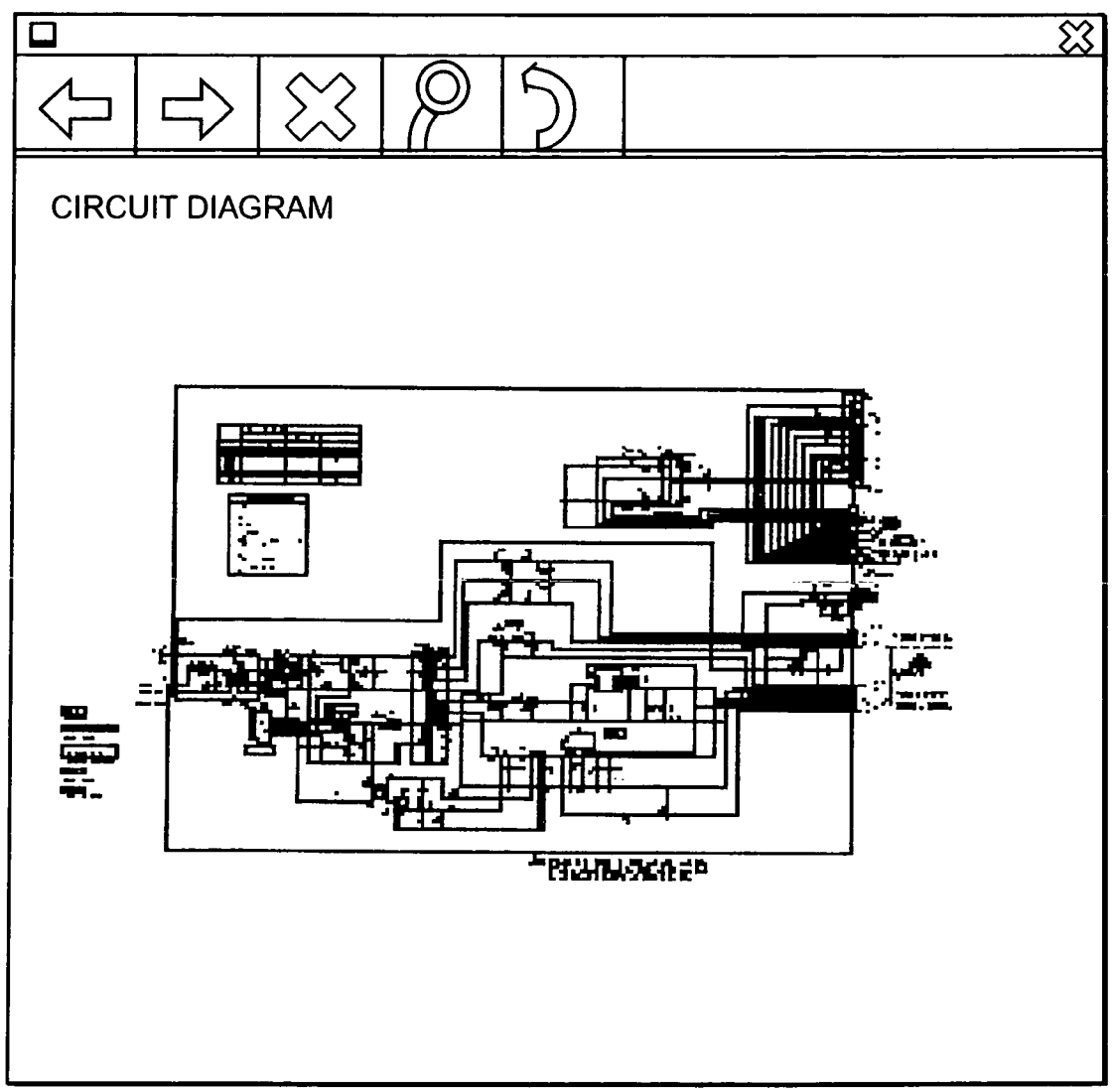
[FIG. 13] An example circuit diagram to be displayed by processing SVG data using an SVG viewer according to the embodiment of the present invention.
Figure 14:
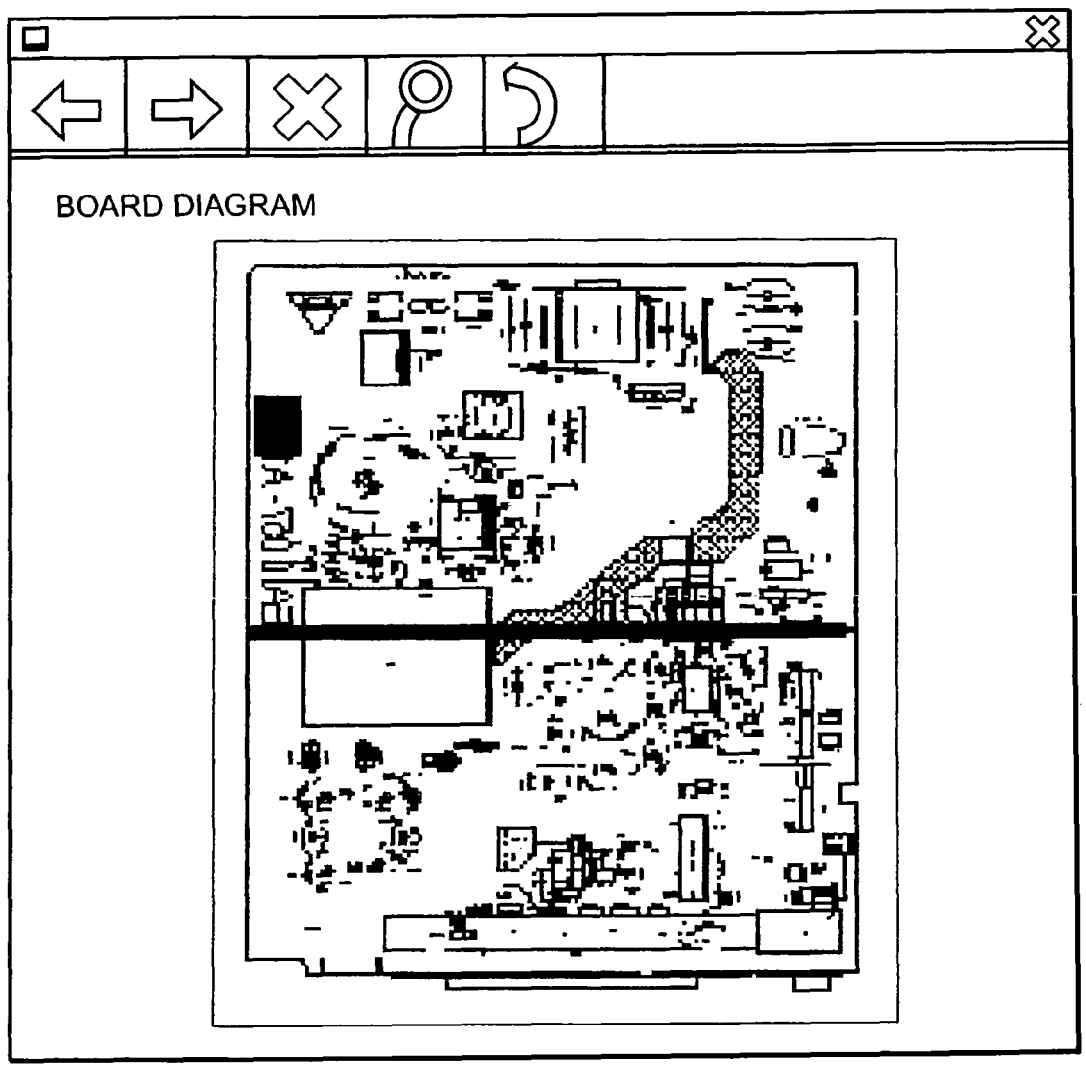
[FIG. 14] An example board diagram to be displayed by processing SVG data using the SVG viewer according to the embodiment of the present invention.

Shown in FIG. 12 are an example SVG data structure for circuit diagram data or board diagram data, and the state wherein the SVG data are processed and displayed by the browser 53. Further, shown in FIGS. 13 and 14 are an example circuit diagram and an example board diagram for which display by the SVG viewer is enabled by the processing performed for the SVG data. The SVG data structure includes [<script>: definition of a script element], [<z:info>: SVG custom information such as a SVG data name], [<rect>: designation of the range for one set of graphics data] and [<g>: graphics root group to which belong various graphics primitives constituting one set of graphics data]. The graphics root group is formed of a plurality of layers [<g>: layer group], each composed of a plurality of graphics primitives [<g>: graphics primitive group]. A layer also includes lines [<path>: line drawing element] used to form the individual graphics primitives, and various text information [<text>: character element], such as the symbol numbers of parts. It should be noted that the graphics primitives correspond to the parts, such as ICs, resistors and diodes, that constitute circuits.

The SVG data names are written in the SVG custom information for the SVG data structure using the same forms as are used for SVG data names written in the index XML data and the parts table XML data, and the symbol numbers of parts are written in the character elements of the SVG data structure using the same form as are used for symbol numbers written in the parts table XML data. That is, the index XML data, the parts table XML data and the SVG data structure are closely correlated by employing the SVG data names and the symbol numbers for the parts.

In addition to the XML data, SVG data written in the XML data form also serve as a database written in the text form. Therefore, in accordance with a script language such as Java-Script (trademark), a keyword search can be easily performed for both the XML data and the SVG data by using a drawing data name or a symbol number as a keyword. It is especially very useful to employ the above described script language to perform a search of the SVG data for the graphics primitives, which are drawing data. Since the coupling process program can be located outside the contents, electronic service manual producers do not need the operation for the embedding, for example, of hyperlinks during the production of electronic service manuals, so that both the labor expended and the time required for production can be considerably reduced.

Figure 2:
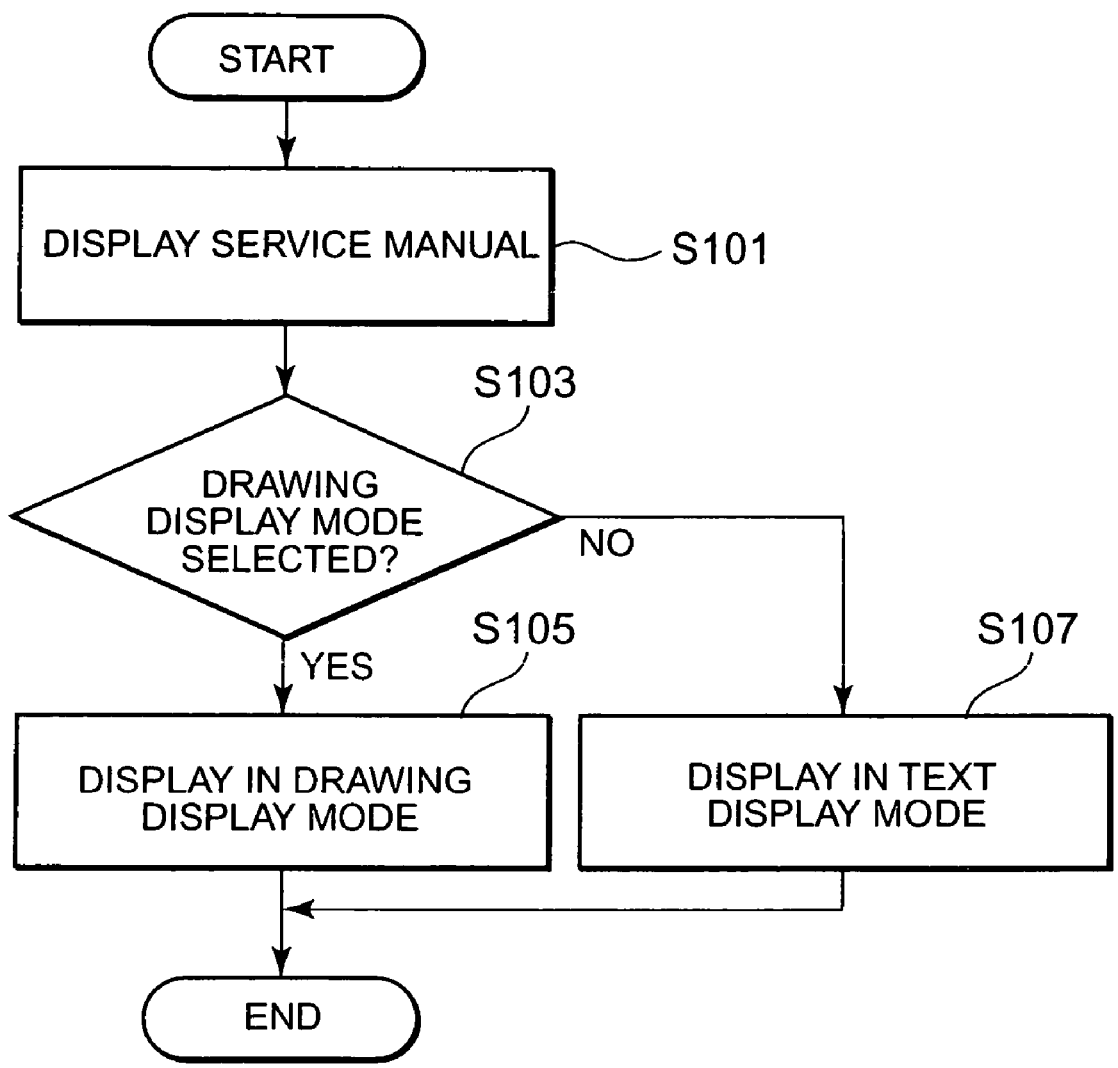
[FIG. 2] A flowchart showing an overview of a service manual display operation according to the embodiment of the present invention.

Next, an explanation will be given for the sequential processing performed to display a service manual for a specific model. FIG. 2 is a flowchart showing an overview of the service manual display processing performed according to the embodiment of the present invention. In the following explanation, an example is employed whereby the control program 62 and the contents data 63 required to display a service manual are all stored on and read from, as needed, the CD-ROM 61.

First, while monitoring the display device 3, a user manipulates the operation input means 4, such as a mouse, to select a file corresponding to a desired service manual. For example, a file corresponding to a service manual for a DVD audio/video player, model number A1234, is selected by the operation input means 4, such as a mouse.

Figure 15:
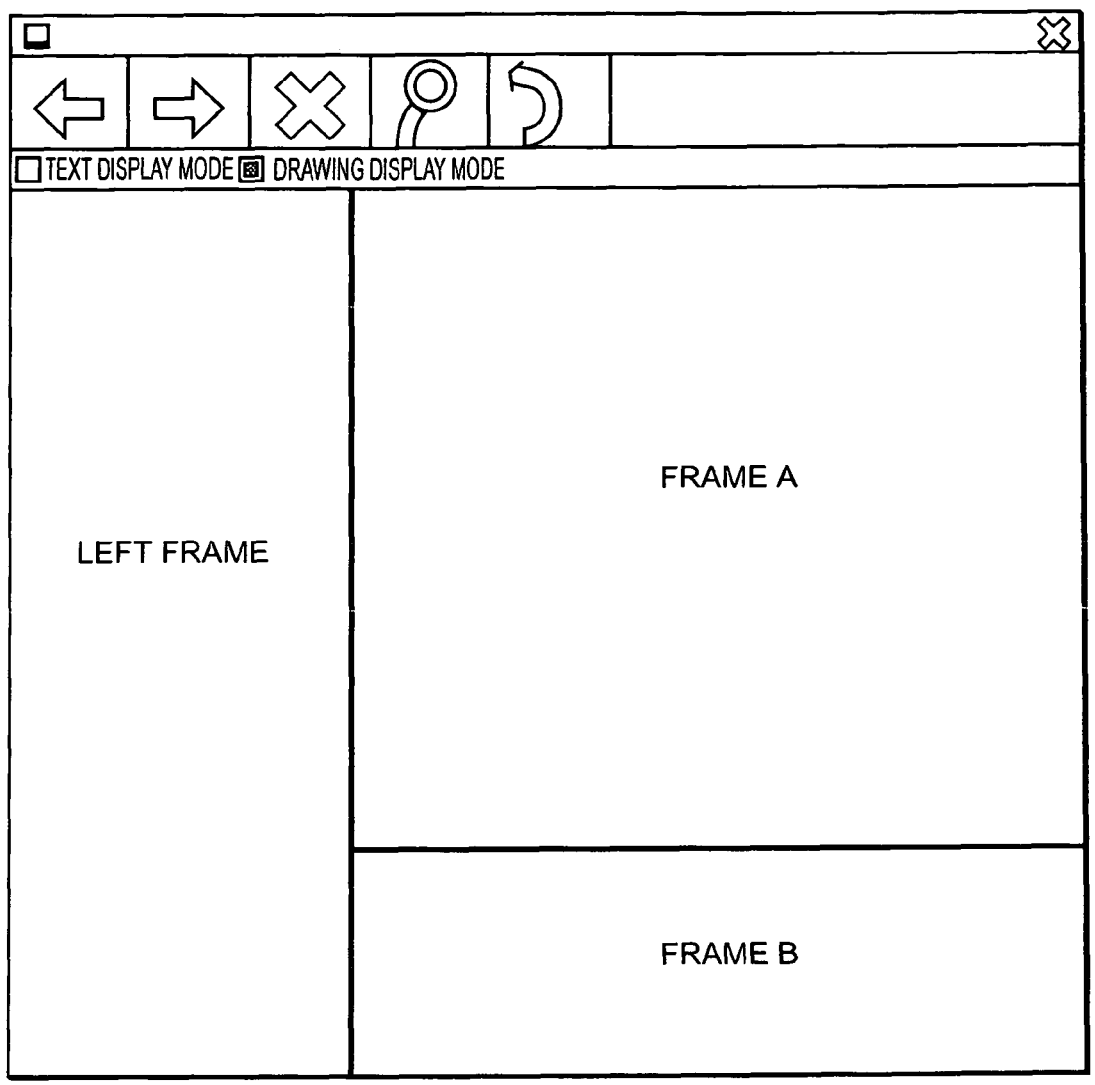
[FIG. 15] A diagram showing an example layout (example double-screen mode) for the frame A and a frame B in a browser according to the embodiment of the present invention.

When the user selects the service manual, the PC performs a process for using the browser 53 to display the top page of that service manual on the display device 3 (step S101: Display service manual). At this time, as is shown in FIG. 15 (which will be described later), the area in the browser 53 is divided into two frames (a left frame and a right frame), for example, and the index page for the service manual is displayed in one of the frames (the left frame), while a text page in the service manual is displayed in the other frame (the right frame). It should be noted that as is shown in FIG. 10, the index page is composed of index XML data and predetermined XSL data. And the text page, as are all other pages, is composed of XML text data and predetermined XSL data, and no detailed explanation will be given for the text page.

Further, as an example, buttons for selecting a mode, either a text display mode or a drawing display mode, are displayed on the tool bar of the browser 53. Through a mode selection procedure, for which the mode selection button is used, a user can select either the text display mode or the drawing display mode.

When the drawing display mode is selected by a user ("YES" at step S103), upon the selection of a category on the index page in the left frame, a circuit diagram or a board diagram corresponding to the selected category and information concerning parts included in the circuit diagram, or the board diagram, are displayed in the right frame (step S105: Present display in drawing display mode).

On the other hand, when the text display mode has been selected by a user ("NO" at step S103), upon the selection of a category on the index page in the left frame, text pages including various captions and drawings corresponding to the selected category are displayed in the right frame (step S107: Present display in text display mode). In this embodiment, since the display is presented in the text display mode at step S101, the text display mode is continued when mode selection is not performed.

Figure 3:
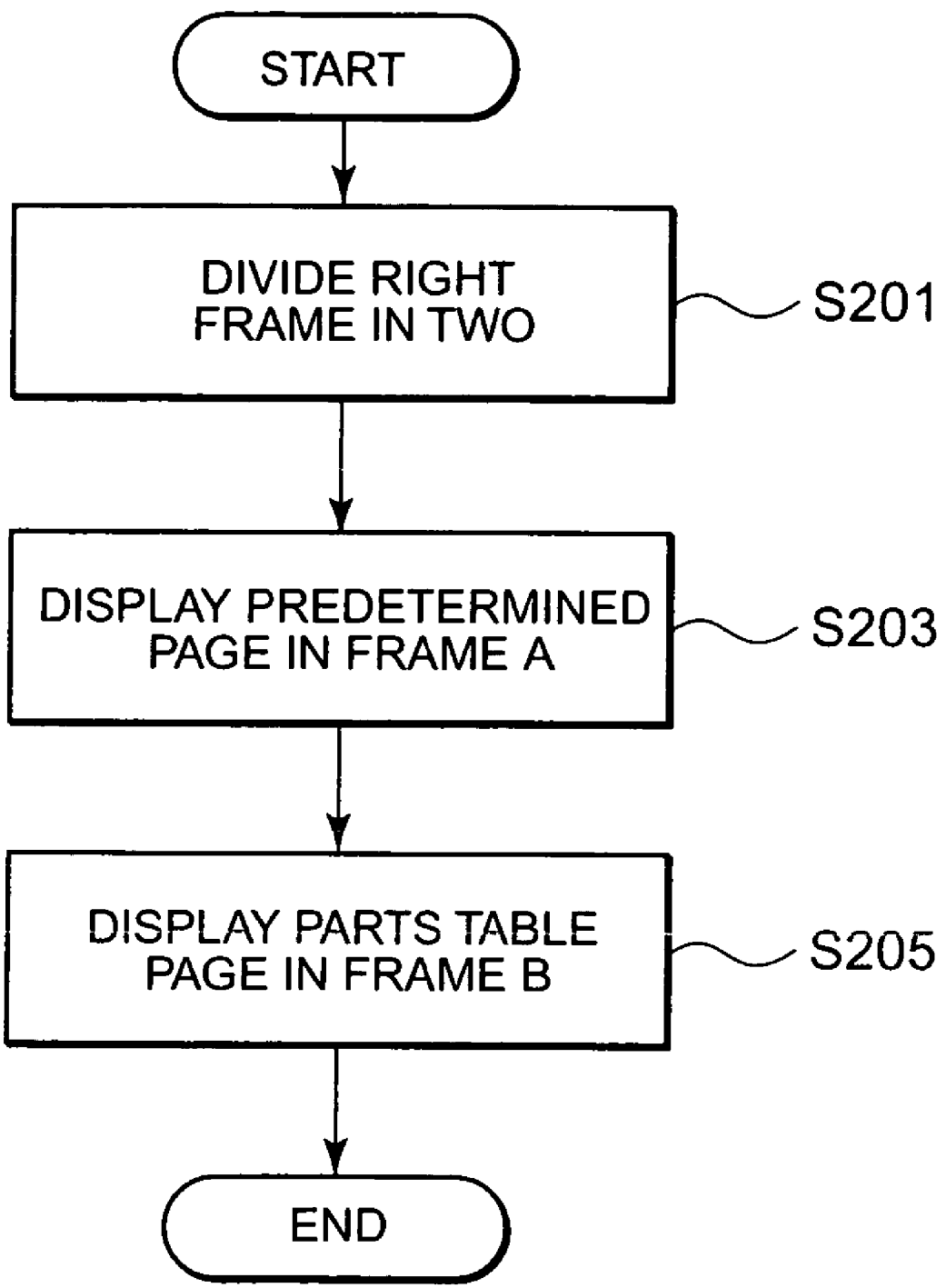
[FIG. 3] A flowchart showing an overview of the display processing performed in a drawing display mode according to the embodiment of the present invention.

The drawing display mode will now be described while referring to the flowchart in FIG. 3. FIG. 3 is a flowchart showing an overview of the display processing performed in the drawing display mode according to the embodiment of the present invention. In the drawing display mode, as is shown in FIG. 15, subdivision of the right frame is performed to obtain two frames (frames A and B) (step S201: Divide right frame in two). The frames A and B can be arbitrarily arranged. As an example, the right frame can be divided into an upper and a lower frame, as is shown in FIG. 15. Hereafter, the upper frame in the right frame is called frame A (drawing display area), and the lower frame is called frame B (parts table page display area). A predetermined top page in the drawing display mode is displayed in frame A (step S203: Display predetermined page in frame A), and a parts table page is displayed in frame B (step S205: Display parts table page in frame B). It should be noted that, as is shown in FIG. 11, the parts table page is generated based on parts table XML data and predetermined XSL data.

Figure 4:
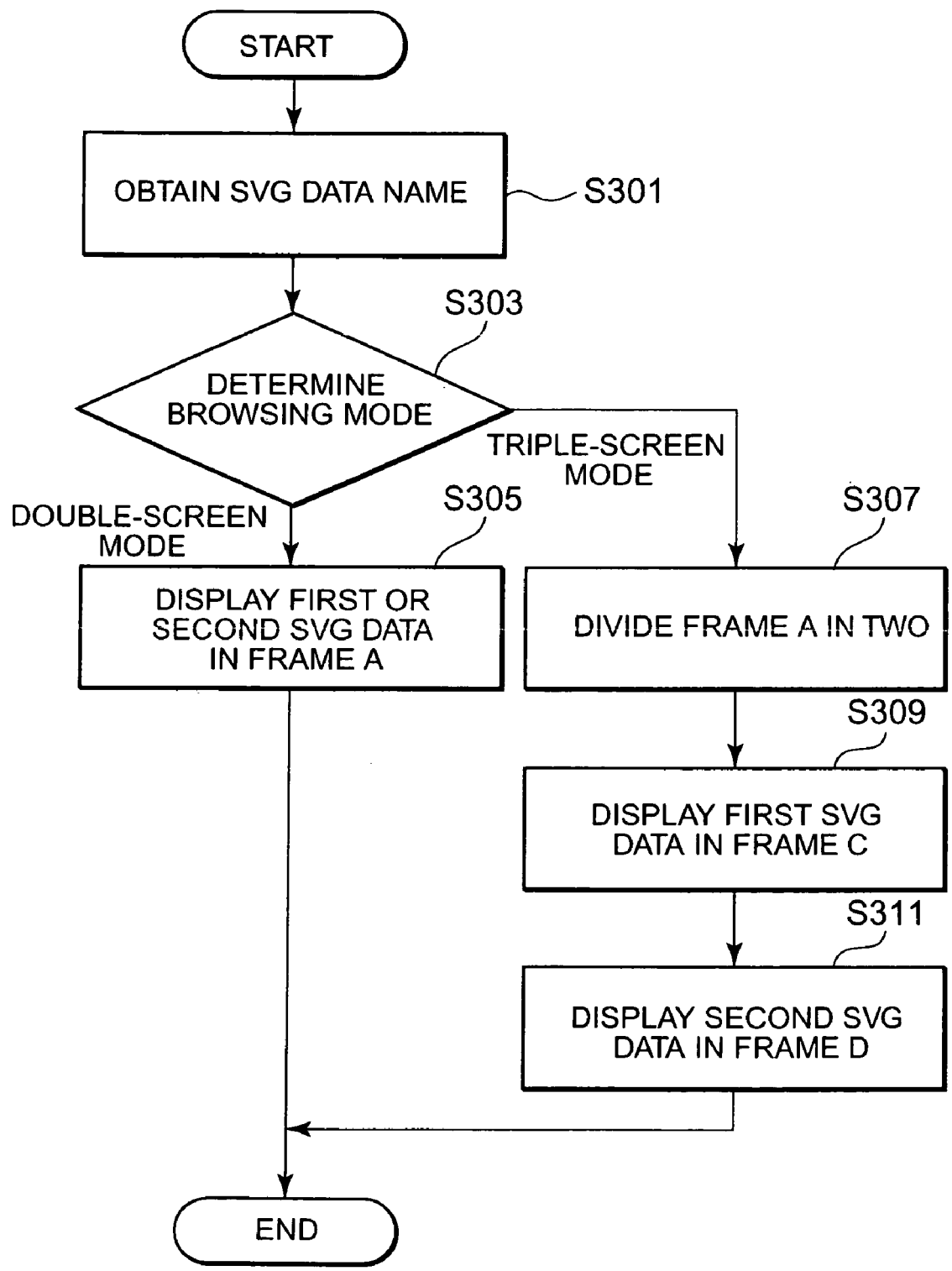
[FIG. 4] A flowchart showing an overview of the display processing performed when, in the drawing display mode according to the embodiment of the present invention, a user selects a drawing category on an index page.

While referring to the flowchart in FIG. 4, an explanation will now be given for an overview of the display processing performed when the process at step S205 has been completed and when a user selects a drawing category on the index page displayed in the drawing display mode. FIG. 4 is a flowchart showing an overview of the display processing performed, according to the embodiment of the present invention, when a drawing category on the index page is selected in the drawing display mode.

When the drawing category displayed on the index page is selected by the user, first, the PC examines index XML data and obtains an SVG data name related to the selected drawing category (step S301: Obtain SVG data name), and determines a browsing mode for the selected drawing category (step S303: Determine browsing mode). Various methods are available for obtaining the SVG data name. As an example, the SVG data name can be easily obtained by acquiring the name of a currently displayed file.

The browsing mode designated for each drawing category on the index page is information indicating that the drawing category includes one or both of a circuit diagram and a board diagram, and whether subdivision of the frame A should be performed to obtain two more frames (frames C and D) is determined in accordance with the browsing mode. For example, when the browsing mode is "1", as is shown in index XML data in FIG. 10, two sets of SVG data (first and second SVG data) are present as associated drawings, and in order for these two sets of SVG data to be displayed, subdivision of the frame A should be performed to obtain the two frames C and D in which to display these drawings.

On the other hand, when the browsing mode is "0", only the first SVG data is present as an associated drawing, or when the browsing mode is "3", only the second SVG data is present as an associated drawing and frame subdivision is not required; either the first or the second SVG data need only be displayed in the current frame A. It may also be determined that subdivision of the frame A is not to occur when the number of associated SVG data sets is one, or that subdivision of the frame A is to be performed to obtain the two frames C and D when the number of associated SVG data sets is two, so that the decision at step S303 can be made without the browsing mode being used. In this embodiment, the frame A has been subdivided to obtain the two frames C and D. However, the frame A may, for example, be subdivided in advance to obtain the two frames C and D, so that when the number of associated SVG data sets is one, either frame C or D is not displayed, or when the number of associated SVG data sets is two, both frames C and D are displayed. That is, in accordance with the decision at step S303, whether to display one drawing in frame A or to independently display two drawings is determined.

Figure 16:
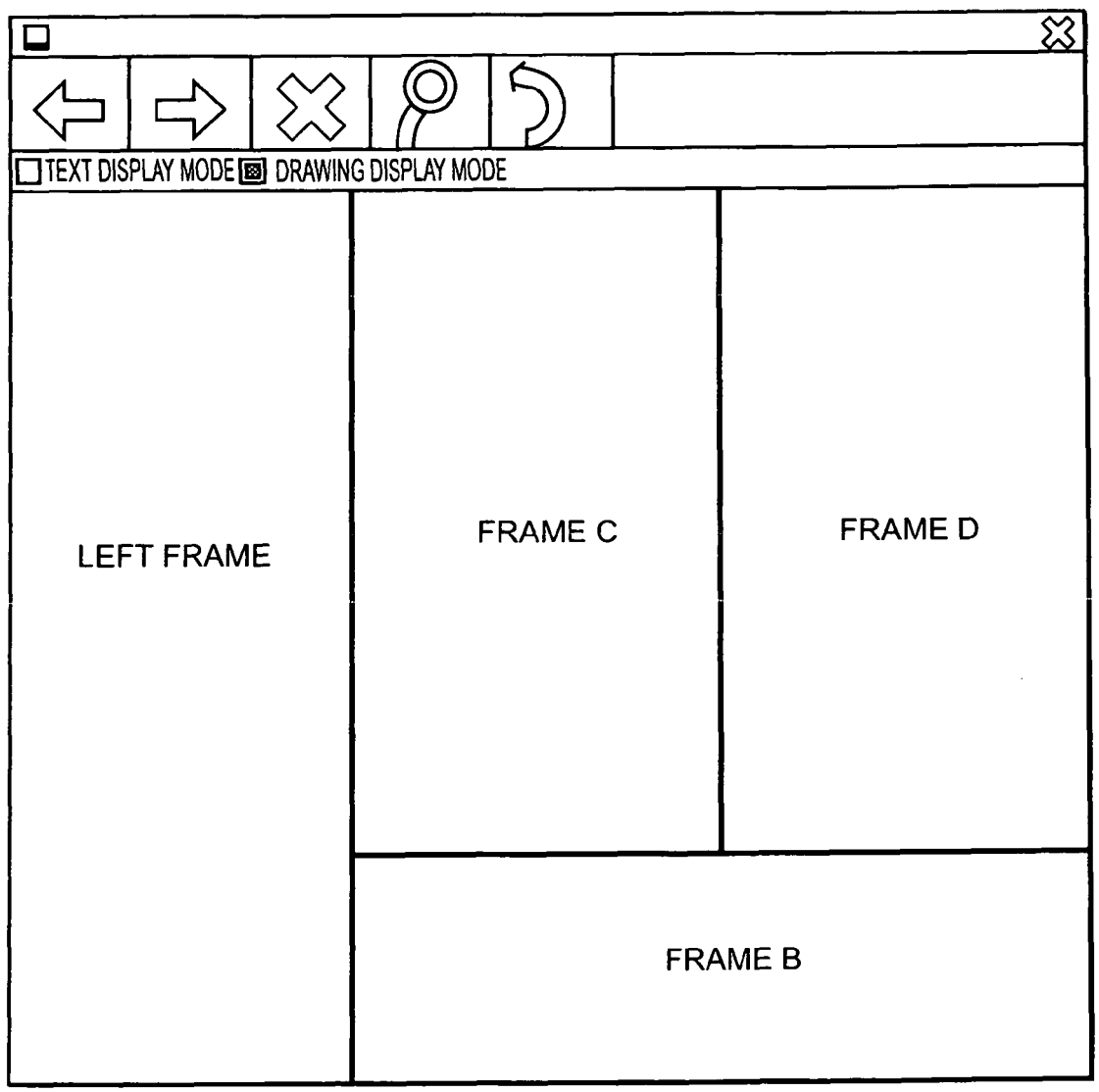
[FIG. 16] A diagram showing an example layout (example triple-screen mode) for the frame B, the frame C and the frame D in the browser according to the embodiment of the present invention.

When frame A is subdivided as shown in FIG. 16, three frames, B, C and D, are obtained by dividing the right frame, and hereinafter, the state wherein the three frames B, C and D are obtained is called a triple-screen mode. Further, in comparison with the triple-screen mode, the state wherein frames A and B are obtained by dividing the right frame, but wherein frame A is not subdivided is called a double-screen mode.

As is described above, in accordance with the browsing mode decision at step S303, either the double-screen or the triple-screen mode is determined for the right frame. In the double-screen mode, the first or the second SVG data is displayed in the frame A (step S305: Display first or second SVG data in frame A). In the triple-screen mode, however, frame A is subdivided to obtain two frames (frames C and D) (step S307: Divide frame A in two). The layout of the frames C and D is arbitrary, and in this embodiment, as an example, frame A is divided into left and right frames, as is shown in FIG. 16, and the first SVG data are displayed in the left frame C (step S309: Display first SVG data in frame C), while the second SVG data are displayed in the right frame D (step S311: Display second SVG data in frame D).

Figure 17:
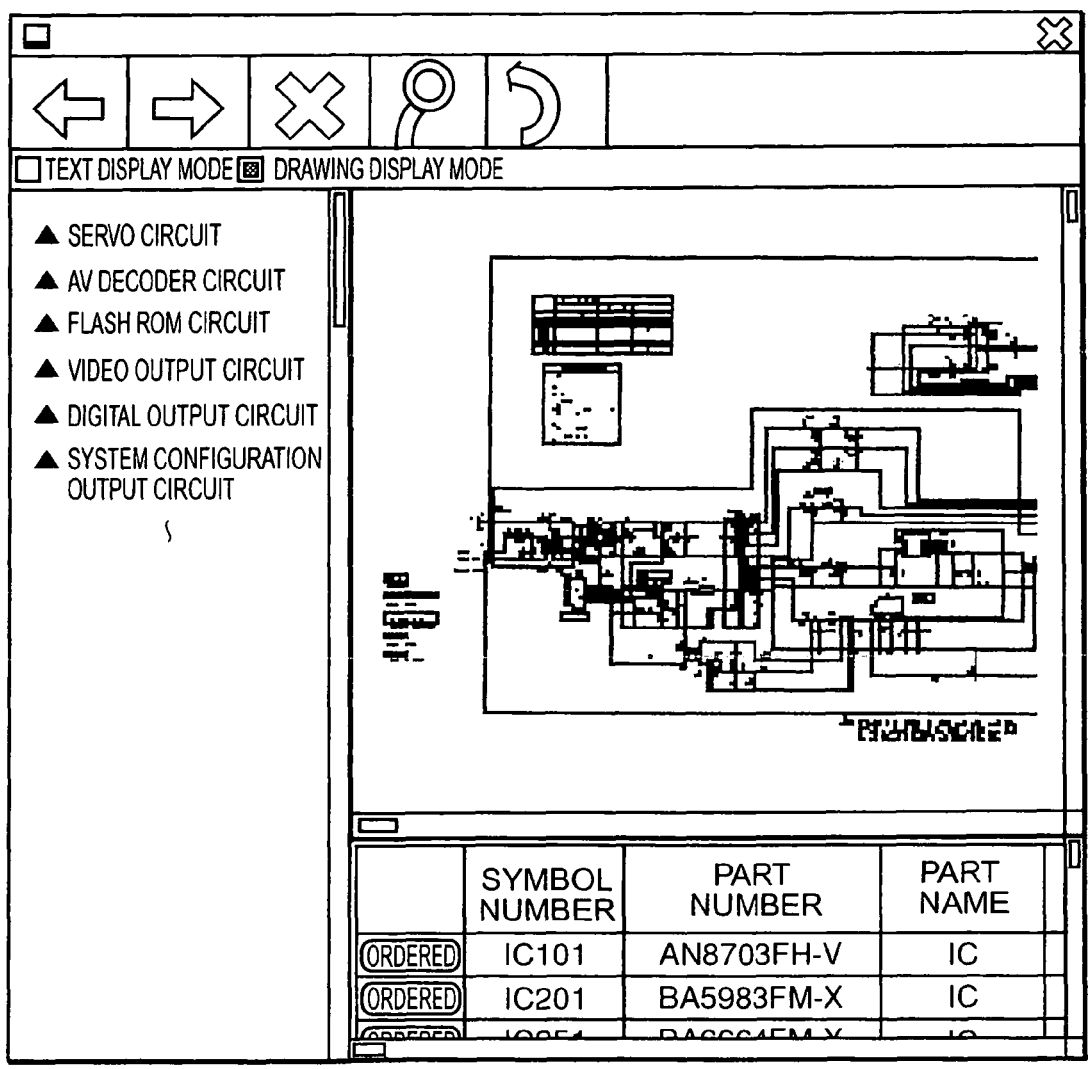
[FIG. 17] A diagram showing an index page in the left frame of the browser, a circuit diagram in the frame A and a parts table in the frame B in the double-screen mode according to the embodiment of the present invention.
Figure 18:
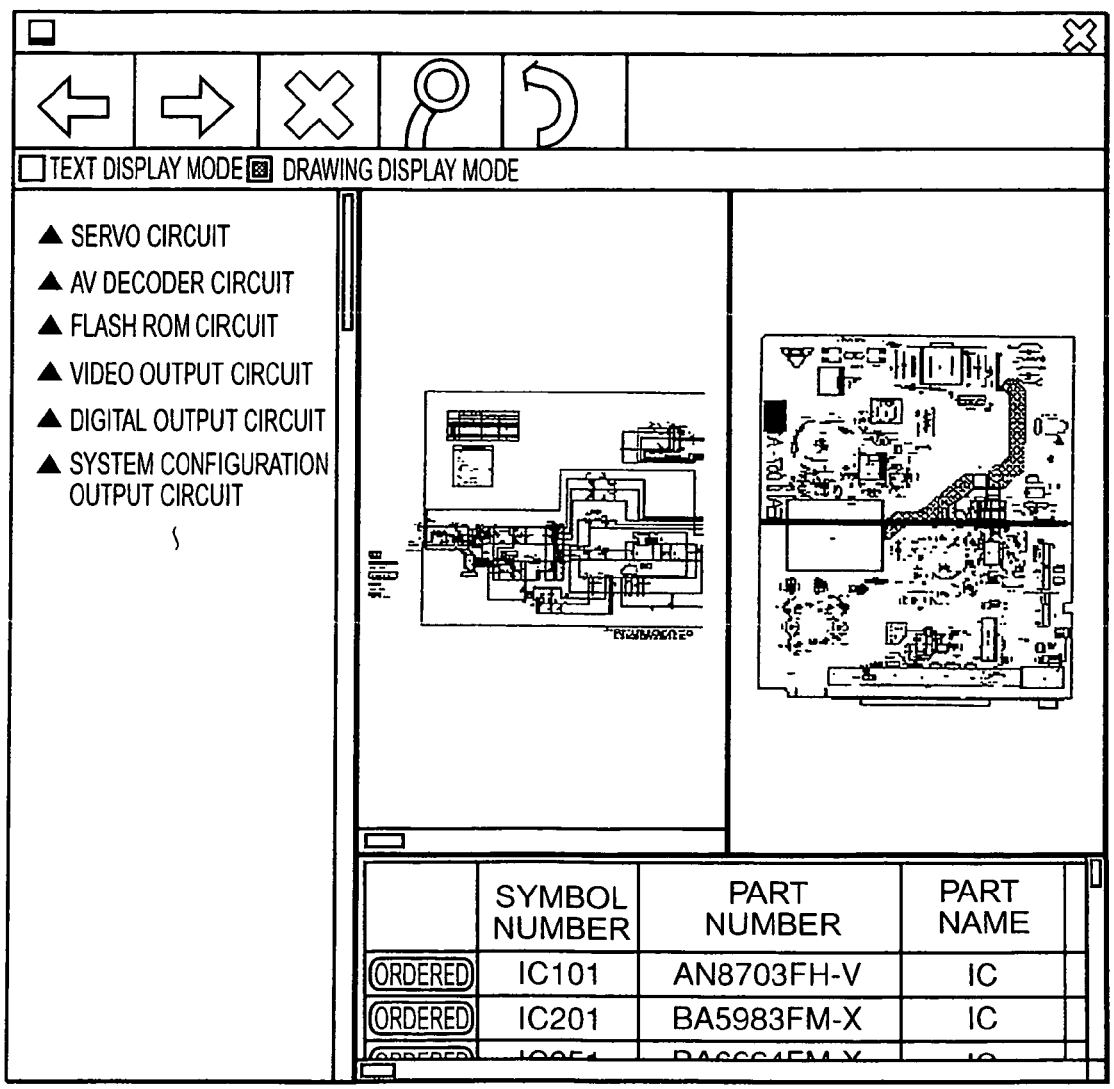
[FIG. 18] A diagram showing an index page in the left frame of the browser, a circuit diagram in the frame C, a board diagram in the frame D and a parts table in the frame B in the triple-screen mode according to the embodiment of the present invention.
Figure 22:
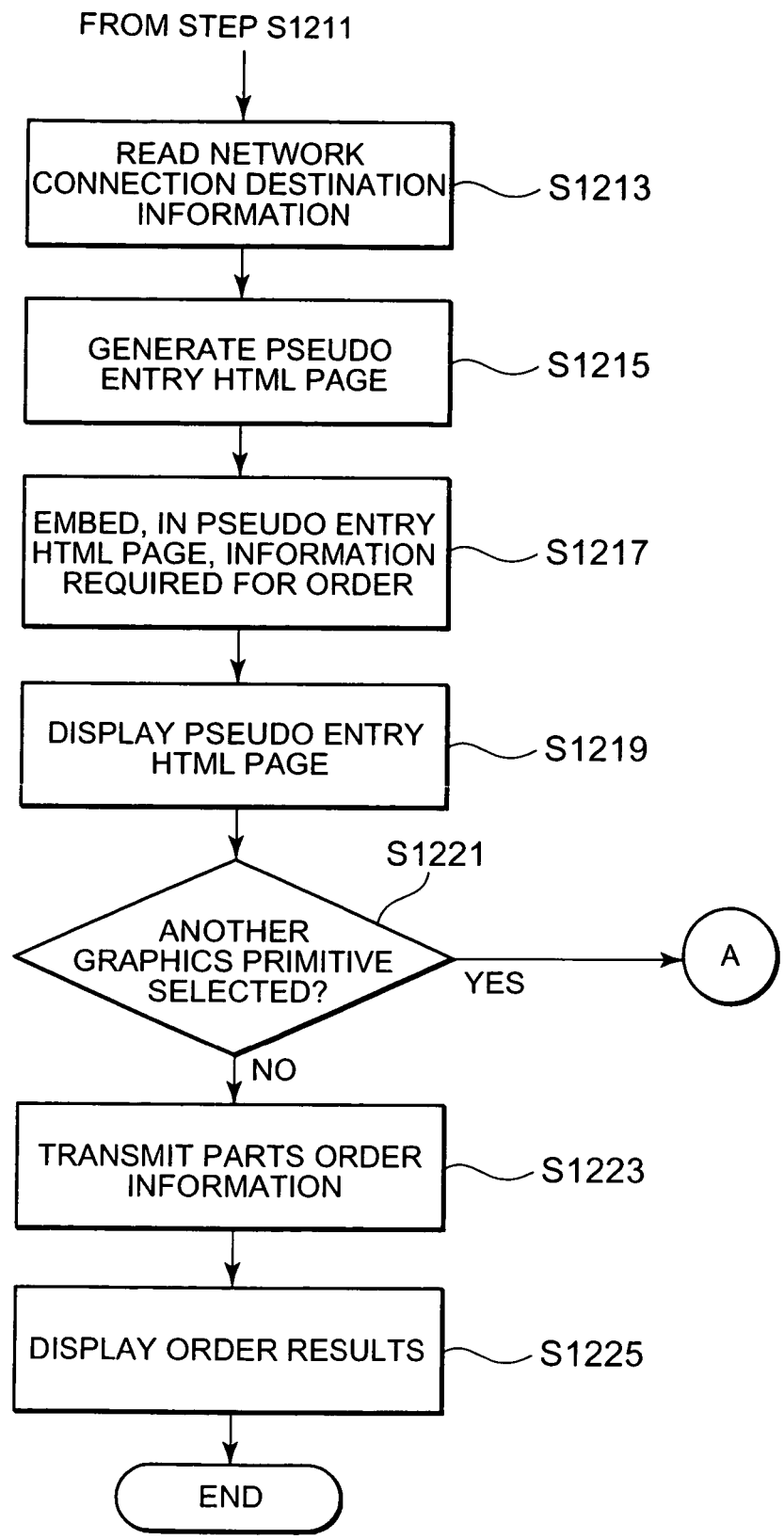
[FIG. 22] A second page of the flowchart showing the processing for issuing an order for a part that corresponds to a graphics primitive in a drawing displayed in either the frame B or the frame C or D in the double-screen mode or the triple-screen mode according to the embodiment of the present invention.
Figure 23:
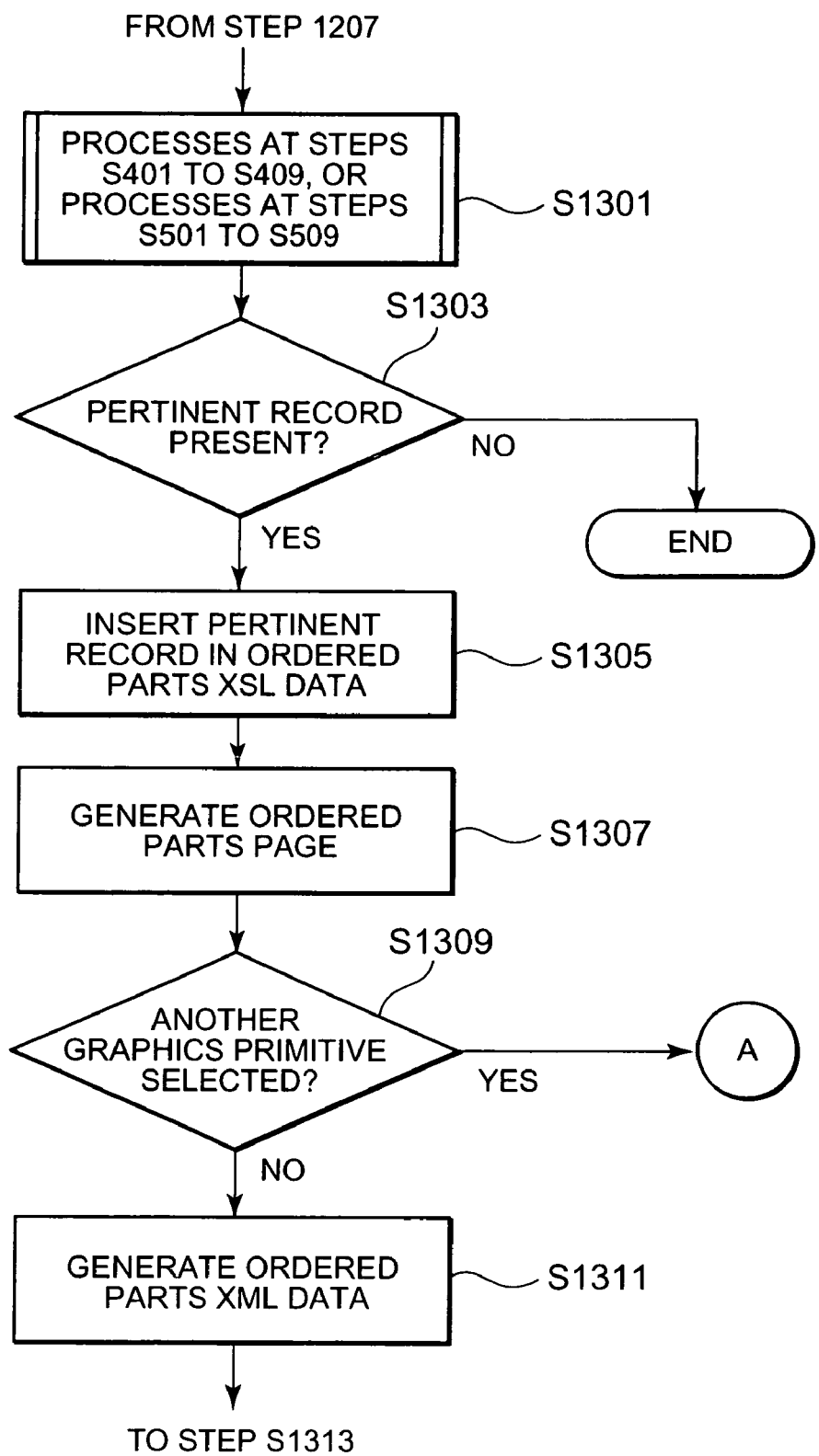
[FIG. 23] A third page of the flowchart showing the processing for issuing an order for a part that corresponds to a graphics primitive in a drawing displayed in either the frame B or the frame C or D in the double-screen mode or the triple-screen mode according to the embodiment of the present invention.
Figure 24:
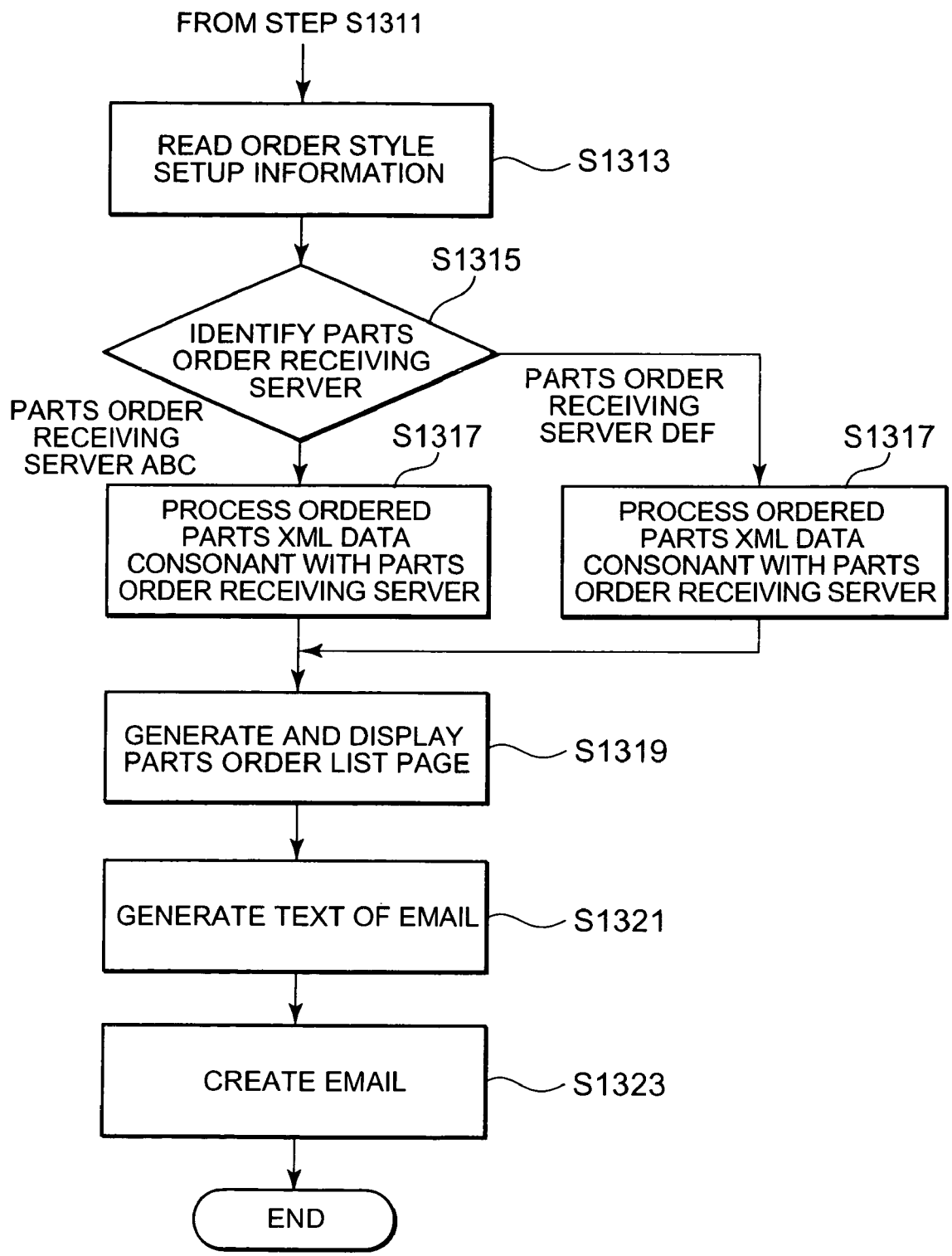
[FIG. 24] A fourth page of the flowchart showing the processing for issuing an order for a part that corresponds to a graphics primitive in a drawing displayed in either the frame B or the frame C or D in the double-screen mode or the triple-screen mode according to the embodiment of the present invention.

When a drawing category is selected on the index page in this manner, the browsing mode for the drawing category is identified. And when the browsing mode is the double-screen mode, as is shown in FIG. 17, the first or the second SVG data (a board diagram or a circuit diagram) and the parts table page for the selected drawing category can be displayed in the right frame. On the other hand, when the browsing mode is the triple-screen mode, as is shown in FIG. 18, the first SVG data (circuit diagram), the second SVG data (board diagram) for the selected drawing category and the parts table page can be displayed in the right frame.

Figure 5:
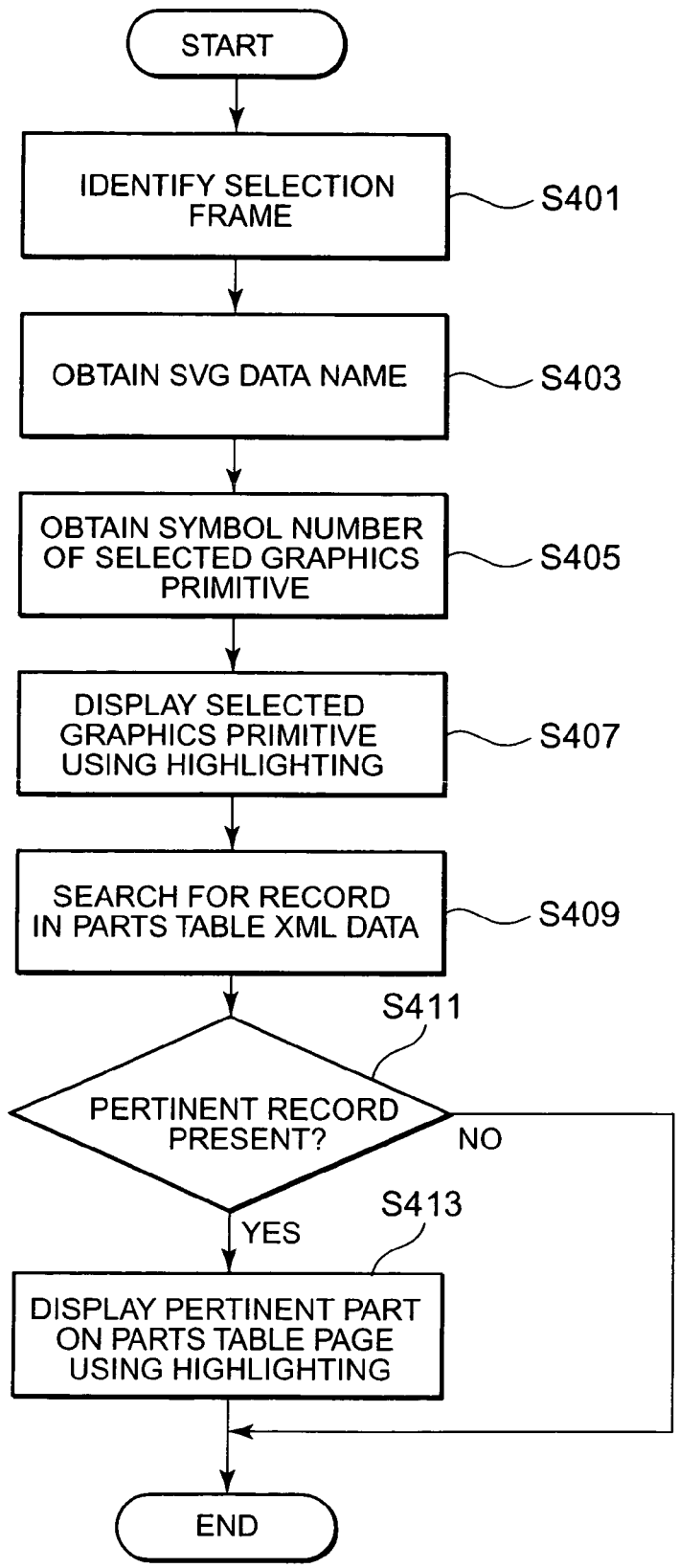
[FIG. 5] A flowchart showing the processing performed when a graphics primitive is selected in a drawing displayed in a frame A under the display conditions for a double-screen mode according to the embodiment of the present invention.

Sequentially, an explanation will be given for the processing performed when a graphics primitive is selected in a drawing displayed in the right frame in either the double-screen mode or the triple-screen mode. First, the processing performed when a graphics primitive is selected in the double-screen mode will be explained. FIG. 5 is a flowchart showing the processing performed, according to the embodiment of the present invention, when a graphics primitive is selected in a drawing displayed in frame A in the double-screen mode.

When a user selects a graphics primitive from SVG data (a circuit diagram or a board diagram) displayed in the frame A in the double-screen mode, first, the PC identifies the frame wherein the graphics primitive was selected (step S401: Identify selection frame). Since in the double-screen mode SVG data is displayed only in frame A, the selection frame is identified as frame A. Then, the name of the SVG data that include the selected graphics primitive (step S403: Obtain SVG data name) and the symbol number of the selected graphics primitive are obtained (step S405: Obtain symbol number of selected graphics primitive).

Thereinafter, in the double-screen mode, a graphics primitive that is displayed in the frame A and has the same symbol number as the selected graphics primitive is highlighted (step S407: Highlight selected graphics primitive). That is, through this processing, the graphics primitive selected by the user is highlighted on display. It should be noted that highlighting enables a user to easily identify a selected graphics primitive, by, for example, changing the color of the selected graphics primitive, or by causing the selected graphics primitive to blink.

Following this, parts table XML data are examined based on the SVG data name, which includes the selected graphics primitive and its symbol number, so as to search for a record that has both the symbol number and the SVG data (step S409: Search for record in parts table XML data).

When, as the result of the search at step S409, a pertinent record is found to be present in the parts table XML data ("YES" at step S411), the entry on the parts table page for the pertinent part is moved to a layout position where it can be easily read by the user (for example, the topmost portion of the frame B), and is displayed using highlighting (step S413: Highlight pertinent part on parts table page). It should be noted, that as well as the highlighting of a graphics primitive, the highlighting, on the parts table page, of the entry for the pertinent part enables the user to easily identify it, and that either the color of the entry for the pertinent part is changed, or the entry for the pertinent part blinks.

Although the parts table XML data should include records for all the parts included in the circuit and board diagrams, the possibility exists that the pertinent record may not be present in the parts table data, e.g., wherein a component other than a part is selected as a graphics primitive (e.g., wherein a signal line that connects parts is selected). When the pertinent part is not present in the parts table XML data, as in the above case ("NO" at step S411), highlighting of an item on the parts table page is not performed and the processing is thereafter terminated.

In this manner, a selected graphics primitive in a board or a circuit diagram can be highlighted in the frame A displayed in the double-screen mode, and the entry, on the parts table page, of a part corresponding to the selected graphics primitive can be highlighted in frame B.

Figure 6:
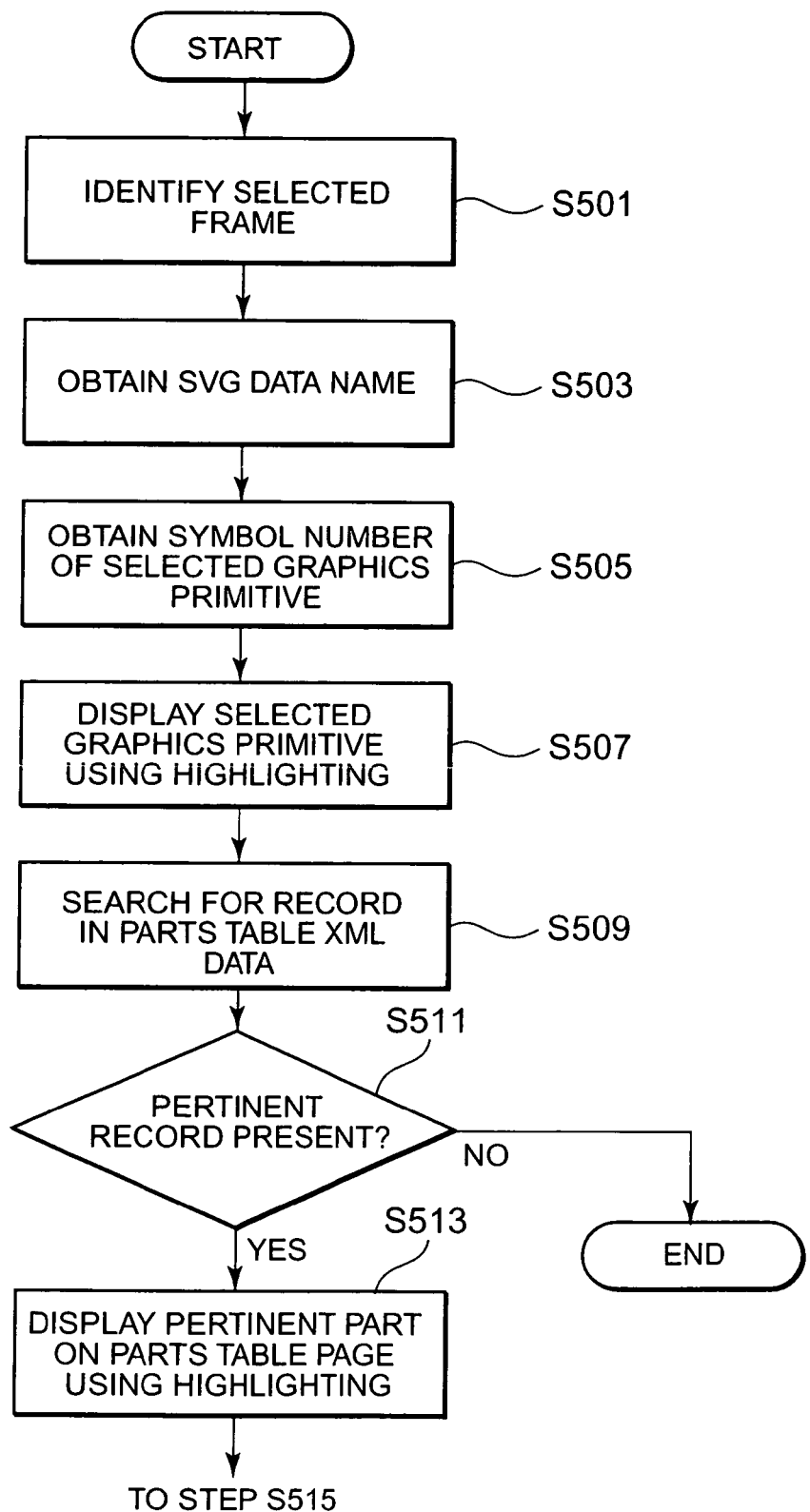
[FIG. 6] A first page for a flowchart showing the processing performed when a graphics primitive is selected in a drawing displayed in a frame C or a frame D under the display conditions for a triple-screen mode according to the embodiment of the present invention.
Figure 7:
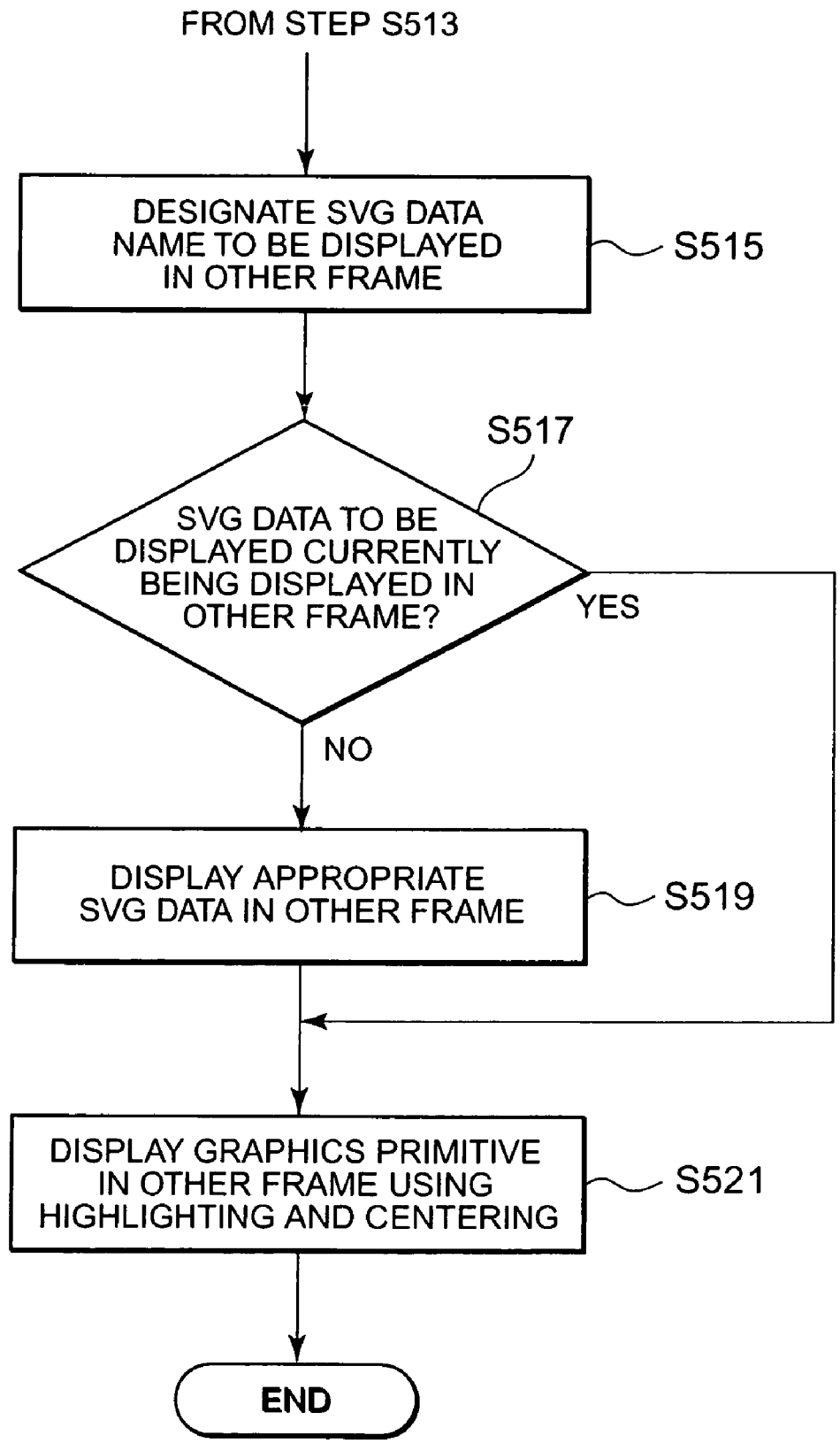
[FIG. 7] A second page for the flowchart showing the processing performed when a graphics primitive is selected in a drawing displayed in the frame C or the frame D under the display conditions for the triple-screen mode according to the embodiment of the present invention.

An explanation will now be given for the processing performed when a graphics primitive is selected in the triple-screen mode. FIGS. 6 and 7 are the first and second pages of a flowchart showing the processing performed when a graphics primitive is selected in a drawing displayed in one of the frames C and D.

When in the triple-screen mode a user uses, for example, a mouse and selects a graphics primitive in the first SVG data (circuit diagram) displayed in the frame C or a graphics primitive in the second SVG data (board diagram) displayed in the frame D, first, the PC identifies the frame wherein the graphics primitive is selected (step S501: Identify selected frame). Since SVG data are displayed both in the frames C and D in the triple-screen mode, it is readily apparent that the selected frame is either the frame C or D.

Then, an SVG data name including the selected graphics primitive is obtained (step S503: Obtain SVG data name), as is the symbol number of the selected graphics primitive (step S505: Obtain symbol number of selected graphics primitive). In the triple-screen mode, graphics primitives are displayed in the selected frame, and a graphics primitive having the same symbol as the selected graphics primitive is displayed using highlighting (at step S507: Highlight selected graphics primitive). That is, through this process, the selected graphics primitive displayed in the frame (either the frame C or D) that includes the selected graphics primitive is highlighted.

Following this, parts table XML data are examined based on the SVG data name, which includes the selected graphics primitive, and the symbol number of the selected graphics primitive, so as to search for a record that includes both the symbol number and the SVG data name (step S509: Search for record in parts table XML data).

When, as a result of the search at step S509, the pertinent record is found to be present in the parts table XML data ("YES" at step S511), the entry for the pertinent part in the parts table page is moved to a layout position where it can be easily read by the user (e.g., the topmost in the frame B), and where it is displayed and highlighted (step S513: Highlight pertinent part on part table page). On the other hand, when the pertinent record is not present in the parts table XML data ("NO" at step S511), a presentation that includes highlighting is not provided for the parts table page, and the processing is thereafter terminated.

In this embodiment, the same processing as in the double-screen mode has been performed, and in the triple-screen mode, a graphics primitive that is displayed in a frame differing from the frame including the selected graphics primitive must be highlighted. However, there is a case wherein a graphics primitive selected in one frame is not included in a drawing displayed in the other frame. That is, graphics primitives included in drawings displayed in the two frames C and D do not always correspond to each other. For example, for a high-density PCB (Print Circuit Board), a plurality of circuits are mounted on a single board, and N circuit diagrams may correspond to one board diagram. Therefore, when a graphics primitive is selected in a board diagram, a check is performed to determine whether the selected graphics primitive is included in a currently displayed circuit diagram. When the selected graphics primitive is not included in a currently displayed circuit diagram, a circuit diagram that includes the selected graphics primitive must be searched for and displayed, and highlighting and centering must be employed to display a graphics primitive included in the circuit diagram. A centering display here means that the circuit diagram is displayed in the frame, so that the graphics primitive is presented near the center in the frame, which is a layout position that a user can easily see (hereinafter, the centering display is also employed with the meaning that the drawing is so displayed that the graphics primitive is presented near the center of the frame).

At step S513, highlighting is employed for the display of the pertinent part on the parts table page, and then an SVG data name differing from the SVG data name obtained at step S503 is designated (at step S515: Designate SVG data name to be displayed in other frame). That is, at step S515, it is designated that SVG data be displayed in a frame different from the frame wherein the graphics primitive was selected.

Thereafter, a check is performed to determine whether the SVG data that is currently displayed in the other frame (the frame D when a graphics primitive is selected from a drawing displayed in the frame C, or the frame C when a graphics primitive is selected from a drawing displayed in the frame D), which is a different frame from the one wherein the graphics primitive was selected, is the same as the SVG data designated at step S515 (step S517: SVG data to be displayed currently being displayed in other frame?) When the currently displayed SVG data is not the same as the SVG data to be displayed, the SVG data designated at step S515 is displayed in the different frame from the one wherein the graphics primitive was selected (step S519: Display appropriate SVG data in other frame). Then, for the SVG data displayed at step S519, a graphics primitive having the same symbol number as the selected graphics primitive is displayed, highlighted, and is also displayed, centered, in the different frame (other frame) from the one wherein the graphics primitive was selected (step S521: Display graphics primitive in other frame using highlighting and centering).

In this manner, in the triple-screen mode, a graphics primitive, which has been selected in a board diagram or a circuit diagram displayed in either the frame C or D, is highlighted and displayed, and in the other frame, the same graphics primitive as the selected graphics primitive is displayed using highlighting and centering. Further, the entry for a part that is shown on the parts table page display and that corresponds to the selected graphics primitive can be highlighted and displayed in the frame B.

Figure 8:
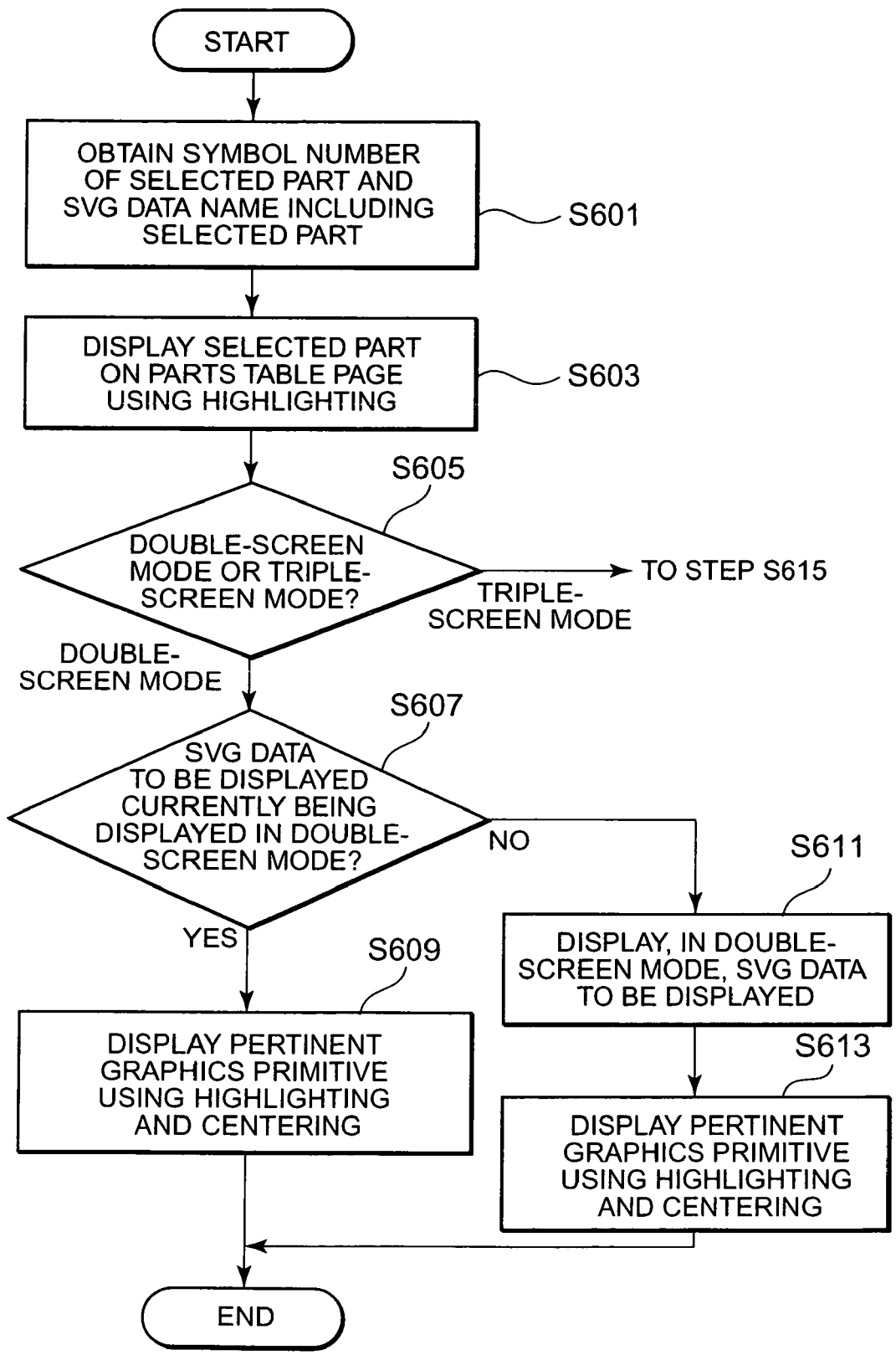
[FIG. 8] A first page of a flowchart showing an overview of the display processing performed, according to the embodiment of the present invention, when a user selects a part on a parts table page in the drawing display mode.
Figure 9:
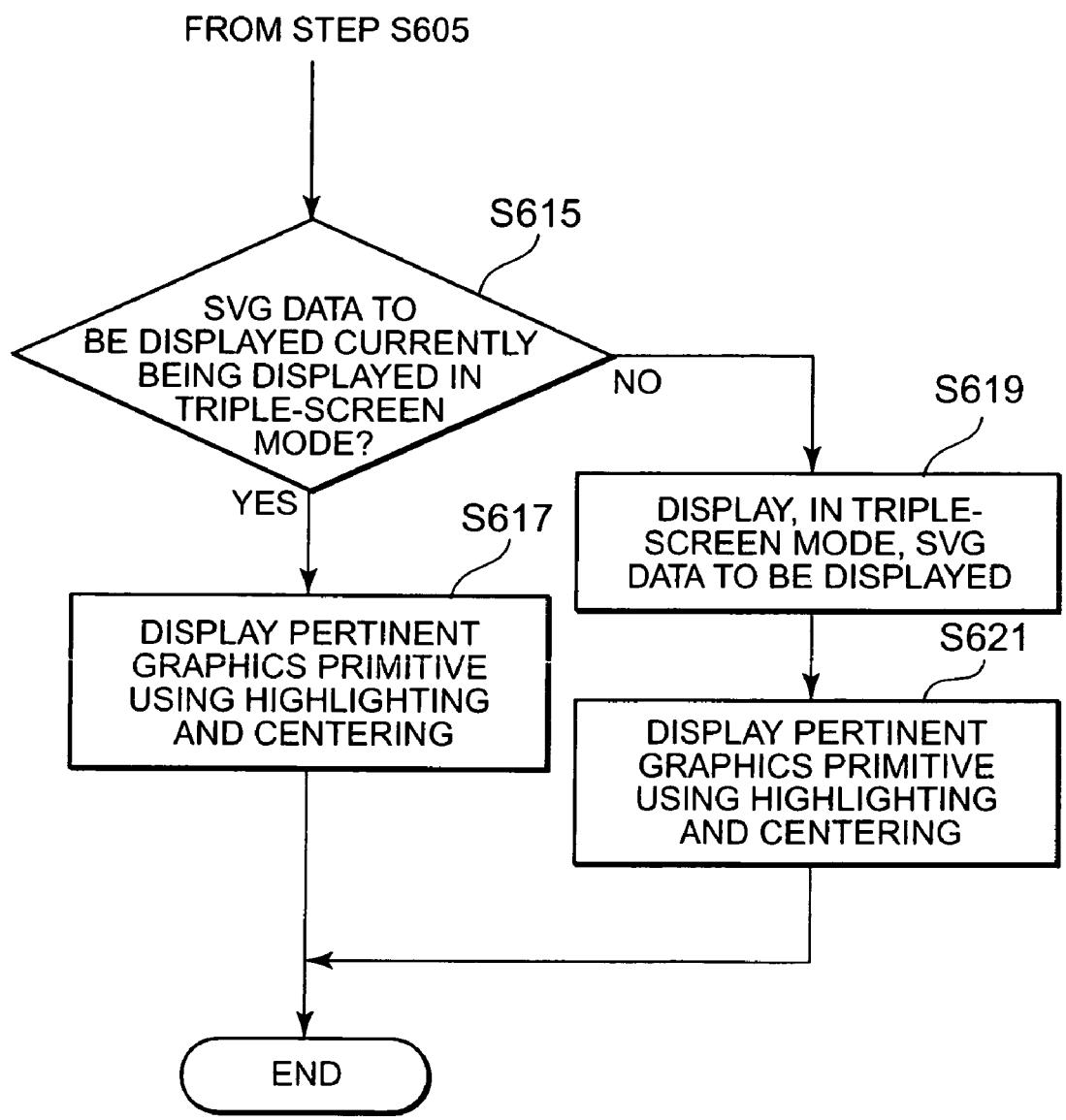
[FIG. 9] A second page of the flowchart showing the overview of the display processing performed, according to the embodiment of the present invention, when the user selects a part on the parts table page in the drawing display mode.

An explanation will now be given for the processing performed when a specific part is selected on the parts table page shown in the frame B. FIGS. 8 and 9 are the first and second pages of a flowchart showing an overview of the display processing performed, according to the embodiment of the present invention, when a user selects a part on the parts table page in the drawing display mode.

When a user uses, for example, a mouse and selects a part on the parts table page displayed in the frame B, first, the PC examines parts table XML data and obtains the symbol number of the selected part and the SVG data name in the record for this part (step S601: Obtain symbol number of selected part and SVG data name including selected part). Further, the entry for the part selected on the parts table page is highlighted (step S603: Highlight selected part on parts table page)

There are cases wherein only one set of SVG data is entered in the record for the selected part, and wherein two sets of SVG data are entered. When only one set of SVG data is entered, it is determined that the double-screen mode should be used to display a drawing that includes the part ("Double-screen mode" at step S605). When two sets of SVG data are entered, it is determined that the triple-screen mode should be used to display a drawing that includes the part ("Triple-screen mode" at step S605).

When it is determined at step S605 that the double-screen mode should be used to display the drawing, a check is performed to determine whether the SVG data designated at step S601 is currently being displayed in the double-screen mode (step S607: SVG data to be displayed being currently displayed in double-screen mode?). When the SVG data designated at step S601 are currently being displayed in the double-screen mode ("YES" at step S607), highlighting and centering are used to display a graphics primitive having the symbol number of the selected part (step S609: Display pertinent graphics primitive by highlighting and centering). Whereas, when the SVG data designated at step S601 are not being displayed in the double-screen mode ("NO" at step S607), the double-screen mode is used to display the SVG data (step S611: Display, in double-screen mode, SVG data to be displayed), and highlighting and centering are used to display a graphics primitive having the symbol number of the selected part (step S613: Display pertinent graphics primitive by highlighting and centering).

When it is determined at step S605 that the drawing should be displayed in the triple-screen mode, a check is performed to determine whether two sets of SVG data designated at step S601 are currently being displayed in the triple-screen mode (step S615: SVG data to be displayed being currently displayed in triple-screen mode?). When the two sets of SVG data designated at step S601 are currently being displayed in the triple-screen mode ("YES" at step S615), highlighting and centering are used to display in the frames C and D a graphics primitive having the symbol number of the selected part (step S617: Display pertinent graphics primitive by highlighting and centering). Whereas, when the two sets of SVG data designated at step S601 are not currently being displayed in the triple-screen mode ("NO" at step S615), the triple-screen mode is used to display the two sets of SVG data (S619: Display, in triple-screen mode, SVG data to be displayed), and highlighting and centering are used to display in the frames C and D a graphics primitive having the symbol number of the selected part (step S621: Display pertinent graphics primitive by highlighting and centering).

An explanation will now be given for a link function that can transmit, to an arbitrary Web site, information related to a graphics primitive selected in a drawing displayed in the double-screen mode or the triple-screen mode (shown in FIG. 17 or 18) explained while referring to FIG. 4. When the link function is employed, an order issuing function, for example, can also be provided whereby parts identification information is transmitted to a predetermined parts order receiving server on the Internet to issue an order for a desired part.

First, while referring to FIG. 19, an explanation will be given for the generation of an SVG viewer context menu for enabling the issue of an order for a part related to a graphics primitive selected in a drawing. FIG. 19 is a flowchart showing the processing for information that is the basis for the generation of an SVG viewer context menu in the double-screen mode or the triple screen mode according to the embodiment of the present invention.

First, the PC displays SVG data in the double-screen mode or the triple-screen mode shown in FIG. 17 or 18, and at the same time, performs the basic setup for an SVG viewer context menu (step S1101: Basic setup for SVG viewer context menu). For this basic setup, by right clicking on a mouse, for example, an SVG viewer context menu is set up that is to be displayed at an arbitrary location designated in a drawing, so that specifically, various categories, such as a category for enabling switching between an enlargement and a size reduction of a drawing, can be displayed in the SVG viewer context menu.

Next, the PC reads network connection destination information stored in the PC as cookie information (step S1103: Read network connection destination information), and determines whether network connection destination information is present (step S1105: Network connection destination information present?). When network connection destination information is present ("YES" at step S1105), the network connection destination information is embedded in the SVG viewer context menu (step S1107: Embed network connection destination information in SVG viewer context menu). Whereas, when network connection destination is not present ("NO" at step S1105), there is no network connection destination information to be embedded in the SVG viewer context menu, and no processing is especially performed.

The network connection destination information will now be explained. FIG. 20 is a diagram showing example network connection destination information according to the embodiment of the present invention. The network connection destination information is, for example, cookie information stored in local data storage means, such as on the hard disk 5. The network connection destination information includes URL (Uniform Resource Locator) information for a parts order receiving server to be connected to a network 71, such as the Internet, and a connection mode. Specifically, as is shown in FIG. 20, the network connection destination information includes, for a parts order receiving server at each connection destination, a title name (information provided so that a connection destination can be easily identified), URL information, transmission information, a transmission method, a User ID and a user password.

A user can designate a plurality of conventional parts order receiving servers for the network connection destination information, and can also change or correct them, as needed. Furthermore, the network connection destination information may be distributed by a predetermined server 72 to the PC to eliminate the need for the user to perform this setup.

The operation for receiving an order for a part and the quantity of the part is basically the same for each parts order receiving server; however, the mode for performing this operation differs a little. The transmission information, the transmission means, the user ID and the user password are designated in accordance with the mode of operation for each Web site.

A model name, a symbol number, a part number and a part name can be employed, for example, as the transmission information. In addition, in accordance with a parts order receiving server indicated by the URL information, the type of information requested by the parts order receiving server to perform the order receiving process should be appropriately designated in the transmission information. As an example, a part number and the quantity of a part to be ordered may be designated for transmission to a specific parts order receiving server, and the symbol number and the quantity of a part to be ordered may be designated for transmission to another parts order receiving server.

A transmission method, such as GET or POST, is designated as the transmission method. For a transmission using GET, the transmission information is transmitted with the URL information for the connection destination, whereas for a transmission using POST, the URL information for the connection destination and the transmission information are transmitted separately. This transmission method should also be appropriately designated in accordance with each Web site. Further, the user ID, the user password and the email (electronic mail) address of a user are employed when authentication (including anonymous authentication) is required for the use of a Web site at the connection designation.

When the network connection destination information is embedded in the SVG viewer context menu in this manner, and when the user performs a predetermined manipulation (e.g., right clicking, using the mouse), various categories in accordance with the basic setup and the individual Web sites presented in the network connection destination information are displayed on the SVG viewer context menu.

While referring to FIGS. 21 to 24, an explanation will now be given for the order issue processing for issuing an order for a part corresponding to a graphics primitive selected in a drawing in the double-screen mode or the triple-screen mode (shown in FIG. 17 or 18). FIGS. 21 to 24 are first to fourth pages of a flowchart showing the processing for issuing an order for a part that corresponds to a graphics primitive in a drawing that is displayed in either the frame B or the frame C or D in the double-screen mode or in the triple-screen mode according to the embodiment of the present invention.

When a user employs a mouse, for example, and selects a graphics primitive in SVG data (a circuit diagram or a board diagram) displayed in the frame A (in the double-screen mode) or in the frame C or D (in the triple-screen mode), the PC highlights and displays the graphics primitive or a corresponding part on the parts table page, as explained while referring to FIG. 5 or FIGS. 6 and 7 (step S1201: Processing in FIG. 5 or processing in FIGS. 6 and 7). Further, information (e.g., a symbol number) related to the selected graphics primitive is embedded in the SVG viewer context menu (step S1203: Embed symbol number of selected graphics primitive in SVG viewer context menu).

Then, when manipulation (e.g., right clicking, using the mouse) consonant with the presentation on the SVG viewer context menu is performed, an SVG context menu, which includes categories related to the symbol number of the graphics primitive, various categories based on the basic setup and categories related to parts order receiving servers indicated in the network connection destination information, is automatically generated and is displayed on the display device (step S1205: Display SVG viewer context menu).

Figure 25:
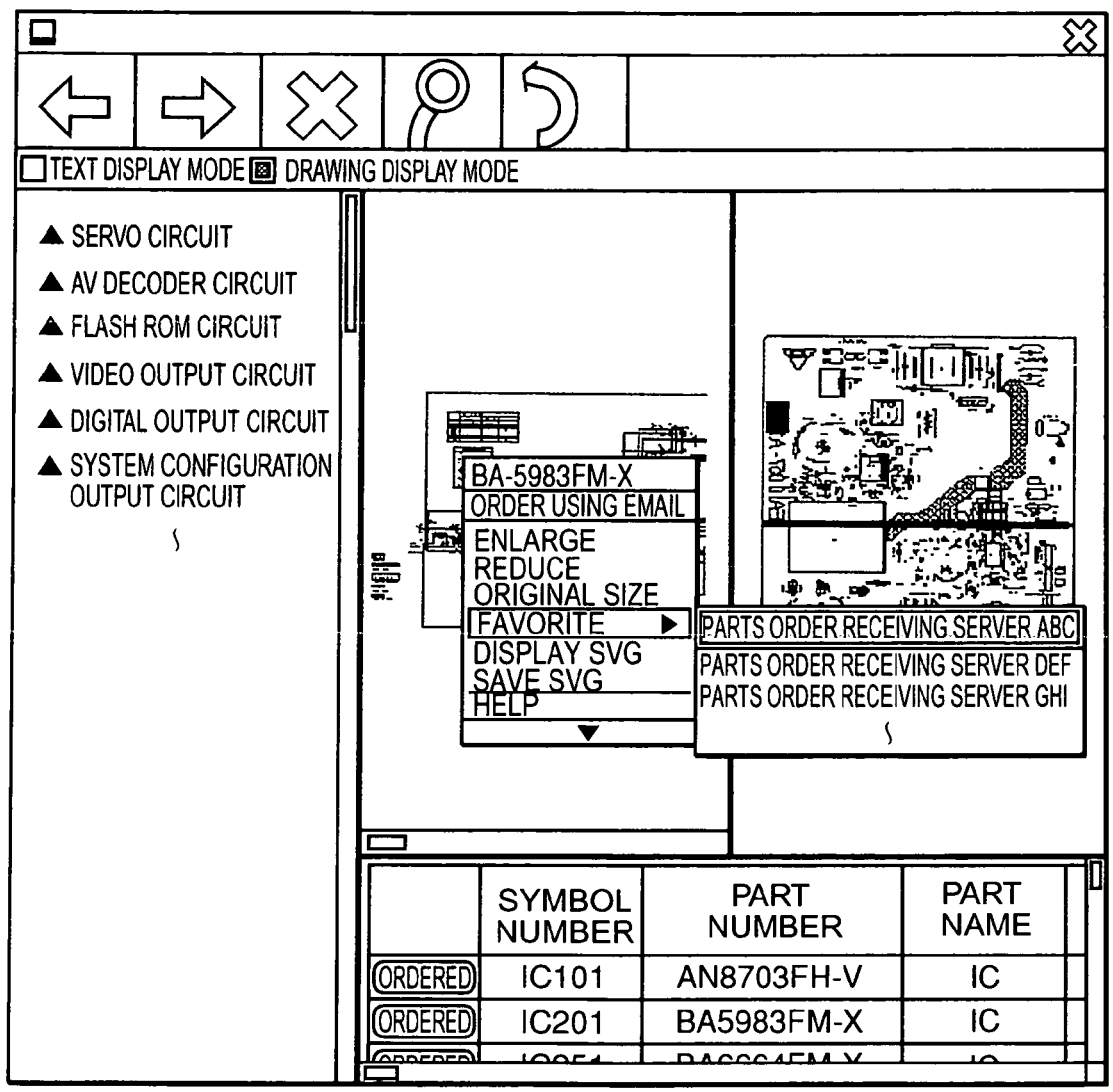
[FIG. 25] A diagram showing the state wherein the SVG viewer context menu is displayed on a display device according to the embodiment of the present invention.

FIG. 25 is a diagram showing the state according to the embodiment of the invention wherein the SVG viewer context menu is displayed on the display device. As is shown in FIG. 25, categories related to the symbol numbers of graphics primitives, various categories based on the basic setup and categories related to parts order receiving servers indicated in the network connection destination information are displayed on the SVG viewer context menu in parallel or hierarchically.

The operation for issuing an order for a part to a parts order receiving server will now be described separately as a method using the data transmission function of a browser and as a method using an email to issue an order for a part. The method that uses the data transmission function of the browser 53 is effective in that an order for a part can be immediately issued and in that the email software 55 is not required when issuing an order for a part. The method that uses an email to issue an order for a part is effective in that order information related to the issue of an order for a part can be prepared even off-line (while not connected to the network), and later, when on-line, the order for a part can be issued. According to this embodiment, it is assumed that the method that uses the data transmission function of the browser 53 is so set that it can be performed by selecting a parts order receiving server displayed in the "favorite" category on the SVG viewer context menu, and the method that uses an email to issue an order for a part is so set that it can be performed by selecting the "order by email" category on the SVG viewer context menu.

First, the method using the data transmission function of the browser 53 will be described. When, for example, an arbitrary parts order receiving server is selected on the SVG viewer context menu ("Issue order for part using data transmission function of browser" at step S1207), the processes at steps S401 to S409 in FIG. 5, or at steps S501 to S509 in FIG. 6, are performed to examine records in the parts table XML data that correspond to a selected graphics primitive (step S1209: Processes at steps S401 to S409, or at steps S501 to S509), and a check is performed to determine whether the pertinent record is present (step S1211: Pertinent record present?).

When, as a result of the search at step S1211, it is found the pertinent record is not present in the parts table XML data ("NO" at step S1211), the processing is terminated directly. On the other hand, when as a result of the search performed at step S1211 it is found the pertinent record is present in the parts table XML data ("YES" at step S1211), the network connection destination information stored as cookie information on the hard disk 5 is read (at step S1213: Read network connection destination information). The URL information and the transmission information on the SVG viewer context menu are referred to in consonance with the selected Web site, and a pseudo entry HTML page is generated (step S1215: Generate pseudo entry HTML page).

Based on the record for the part that corresponds to the graphics primitive obtained at step S1211, information required for issuing an order for the part corresponding to the selected graphics primitive is embedded at a predetermined location on the pseudo entry HTML page (step S1217: Embed, in pseudo entry HTML page, information required for order), and the pseudo entry HTML page, wherein the information required for an order is embedded, is displayed (step S1219: Display pseudo entry HTML page).

Figure 26:
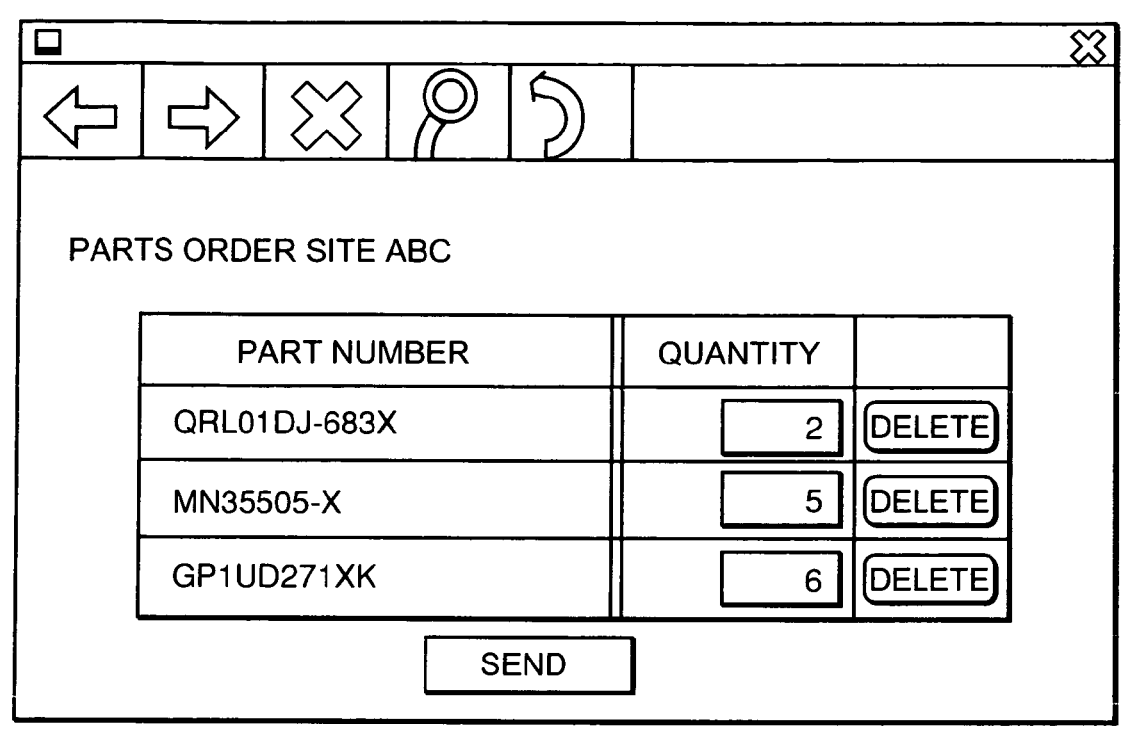

FIG. 26 is a diagram showing an example pseudo entry HTML page, according to the embodiment of the present invention, wherein information required for an order is embedded. In FIG. 26 is shown an example pseudo entry HTML page that is generated when the user selects parts order receiving server ABC presented in the network connection destination information in FIG. 20. The part number and the quantity are designated as the transmission information in the record for the parts order receiving server ABC in the network connection destination information in FIG. 20. Then, at step S1213, the PC generates a pseudo entry HTML page to transmit to the URL information, for the parts order receiving server ABC, the part number and the quantity corresponding to the selected graphics primitive.

In the pseudo entry HTML page is embedded information for identifying a part, such as the part number and the name of a part that corresponds to the graphics primitive selected by using a mouse, for example. When the information for identifying a part is to be embedded in the pseudo entry HTML page, it is preferable that a default "1" be set as the quantity for the part, and that the quantity be changeable, as needed, by a manipulation performed by the user. Further, on the pseudo entry HTML page, a delete button is provided for each part for deleting the part (for canceling the order), so that a part that is erroneously registered in the order information can be easily deleted.

It is also preferable that it be possible to temporarily store the parts order information in the memory 2, for example, until the transmission of the order information has been completed. Then, when another, new graphics primitive is selected ("YES" at step S1221: Return to step S1201), program control returns to step S1201. And when an order for a part corresponding to another graphics primitive is issued and a new pseudo entry HTML page is to be generated, the order information previously designated is referred to, so that order information for a plurality of parts can be displayed on one pseudo entry HTML page. It should be noted that in FIG. 26 an example pseudo entry HTML page is shown that is generated when order information for three parts has been designated in the above described manner (i.e., the selection of a graphics primitive and the selection of an order have been performed three times).

When another graphics primitive is not selected ("NO" at step S1221), and when the send button on the pseudo entry HTML page is selected, the information required for the issue of an order for parts and the quantity of each part are transmitted to the URL information for the parts order receiving server using a predetermined transmission method (step S1223: Transmit parts order information). Then, an order receiving completion response is received from the parts order receiving server, and a message indicating that the order for the part has been completed and the information representing the part that has been ordered, and the part quantity, displayed by the browser wherein the pseudo entry HTML page is currently being displayed (step S1225: Display order results).

Using the above described method and the data transmission function of the browser, a graphics primitive is selected in a circuit diagram or a board diagram, a parts order is selected from the SVG viewer context menu, and order information for the part is transmitted to a predetermined parts order receiving server, thereby enabling the issue of an order for a part. Further, conventionally, an entry error tends to occur, especially for a part number and a part name or a symbol name that is an alphabetical or numerical string and that are used as the parts identification information; however, according to the invention, correct digital data is directly employed to issue an order for a part, and such man-made errors can be avoided.

An explanation will now be given for the method whereby an email is employed to issue an order for a part. When, for example, an arbitrary parts order receiving server is selected on the SVG viewer context menu ("Issue order for part using email" at step S1207), the processes at steps S401 to S409 in FIG. 5, or steps S501 to S509 in FIG. 6, are performed to examine records in the parts table XML data that correspond to the selected graphics primitive (step S1301: Processes at step S401 to S409 or S501 to S509), and a check is performed to determine whether the pertinent record is present (step S1303: Pertinent record present?).

When, as a result of the search at step S1303, it is found the pertinent record is not present in the parts table XML data ("NO" at step S1303), the processing is terminated without performing any process. On the other hand, when as a result of the search at step S1303 it is found the pertinent record is present in the parts table XML data ("YES" at step S1303), the pertinent record is inserted into the variable in the ordered parts XML data (step S1305: Insert pertinent record in ordered parts XML data), and the ordered parts XML data and the XML parts table data are employed to generate a ordered parts page (step S1307: Generate ordered parts page). The ordered parts page is then obtained by extracting, from the parts table XML data, only information related to the parts to be ordered, and processing this information to be displayed by the browser 53.

Further, as well as for the method using the data transmission function of the browser, it is preferable that it be possible to temporarily store the parts order information in the memory 2, for example, until the transmission of order information using an email has been completed. Then, when another, new graphics primitive is selected ("YES" at step S1309), program control returns to step S1201. And when an order for a part corresponding to another graphics primitive is issued and a new ordered parts page is to be generated, the previously designated order information is examined to display the order information for a plurality of parts on one ordered parts page.

On the other hand, when another graphics primitive is not selected ("NO" at step S1309), and when an ordered part register button on the order information page is selected, ordered parts XML data is generated by extracting, from the parts table XML data, only the information related to the ordered parts (step S1311: Generate ordered parts XML data). Then, order style setup information is read that uses an email and that is stored on the hard disk 5 as cookie information (step S1313: Read order style setup information).

The order style setup information will now be described. FIG. 27 is a diagram showing example order style setup information according to the embodiment of the present invention. The order style setup information is cookie information, for example, stored in local data storage means, such as the hard disk 5. The order style setup information includes email addresses for multiple individual parts order receiving servers and additional information to be transmitted to these parts order receiving servers. The user may also register new parts order receiving servers as order style setup information.

The user can also select a parts order receiving server to issue an order for parts, and the designation of the parts order receiving server by the user is reflected to category "select" in the order style setup information. The PC examines the "select" category in the order style setup information that has been read, and identifies a parts order receiving server to be employed (step S1315: Identify parts order receiving server). The processing XSL data consonant with the results of the identification are employed to generate ordered parts XML data that are generated at step S1307 (step S1317: Process ordered parts XML data in consonance with parts order receiving server), and a part order list page is generated and displayed (step S1319: Generate and display parts order list page). When a parts order list page that differs in the parts order receiving servers is generated in this manner, information written in an email that is prepared later can be optimized. That is, even when necessary information differs in the individual parts order receiving servers to analyze the text of an email and to perform the automatic order receiving process, a corresponding email can be prepared. In the flowchart in the drawing, only two results, the parts order receiving server ABC and the parts order receiving server DEF are shown at step S1315; however, many more parts order receiving servers can be identified.

FIG. 28 is a diagram showing an example parts order list page according to the embodiment of the present invention. The information for parts to be ordered and the list of the quantities of the individual parts are entered on the parts order list page. Further, a delete button is provided for order information for each part in order to delete the pertinent part. On the parts order list page, the user makes a final confirmation for parts to be ordered, selects an email send button to perform the processing that will be described later, and prepares an order email. Further, when a print button is selected, a list of the parts to be ordered can be printed by a printer. When the printed list of parts is transmitted to a parts order issuing center by facsimile or by mail, the labor effort required for the preparation of a parts order sheet can be reduced, and when an order for parts is issued, an order receiving destination can be correctly notified, for example, of the parts numbers and symbol numbers represented by alphanumerical strings. Further, all the parts information can be deleted from the parts order list page by using a clear button, or an order for parts can be halted by using a cancel button.

When the email send button is selected on the parts order list page, the text of an email is prepared so as to provide the information used to identify parts entered on the parts order list page and the quantities of the parts to be ordered (step S1321: Generate text of email). Then, the email software 55 is activated to create an email, including the text, that addresses the parts order receiving server (step S1323: Create email). As is described above, it is preferable that, in the text of the email, information related to a part and the quantity of the part be described using a format that enables the parts order receiving server to perform the automatic order receiving process. The thus created email can be held, pending transmission, and be transmitted upon the detection of manipulation by the user or a connection to a network, or can be transmitted immediately after the email has been is created.

Using the above described method that employs an email to issue an order for a part, a graphics primitive is selected in a circuit diagram or a board diagram, the parts order on the SVG viewer context menu is selected, and parts order information is transmitted as an email to a predetermined email address so that an order for a part can be issued. Further, conventionally, at the time an order is issued for a part, entry errors tend to occur, especially when the part number and the part name or the symbol number are alphabetical and numerical strings that are employed as parts of the identification information; however, according to the invention, since correct digital data are directly employed to issue an order for parts, such a man-made errors can be avoided.

An order for a part can also be issued by selecting an order button on the parts table page shown in FIG. 11. In this case, a graphics primitive is selected in a circuit diagram or a board diagram, and the order button need only be selected, in the same manner as the parts order on the SVG viewer context menu is selected, by using the data transmission function of the browser 53 or by using an email. Then, information related to the selected part is extracted from the parts table XML data, and is reflected on the pseudo entry HTML page or in the ordered parts XML data. As a result, not only the selection of a graphics primitive in a circuit diagram or a board diagram, but also the submission, using the parts table page, of an order for a part can be performed.

An explanation will now be given for a program transmission method and a program reception method that are employed when the electronic service manual display program for this invention is transmitted or received as software via a communication line/a network. As is described above, in the configuration shown in FIG. 1, for example, an apparatus that employs an electronic service manual can obtain (download) from the server 72, through the network card drive 7 and the network 71, the control program 62 and the contents data 63 that are required to use the electronic service manual. The apparatus that employs the electronic service manual can also supply (upload) to the server 72, through the network card drive 7 and the network 71, the control program 62 and the contents data 63 that are required to use the electronic service manual.

Figure 29:
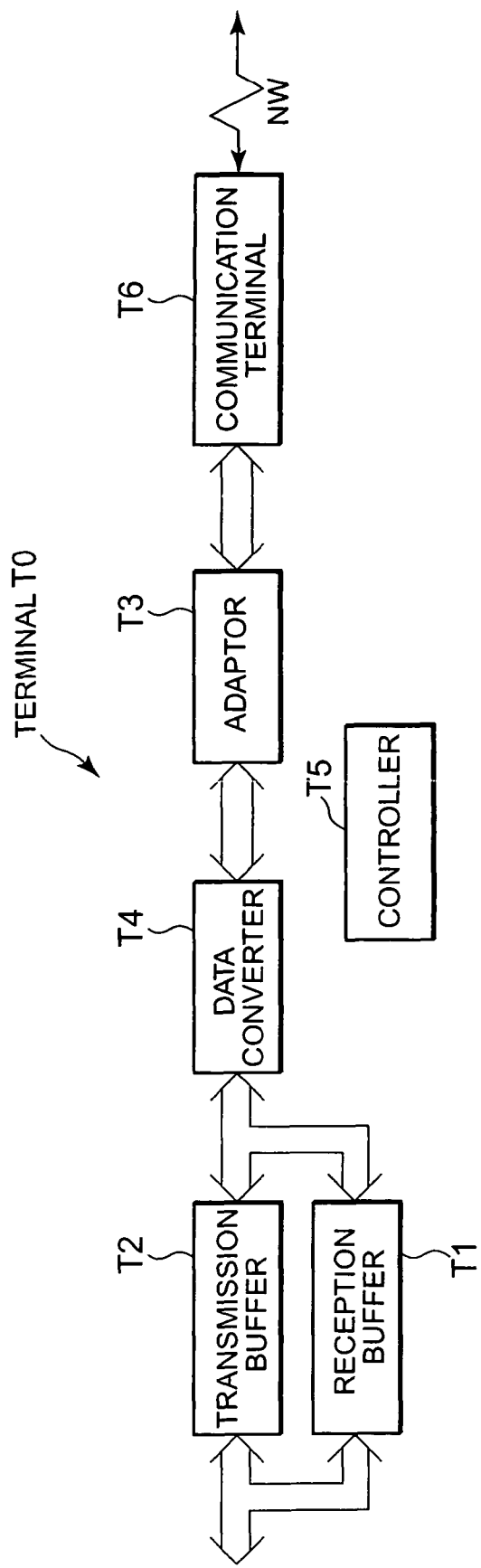
[FIG. 29] A diagram showing the configuration of a terminal that can transmit and receive an electronic service manual display program for the embodiment of the present invention, and other, additional data.

FIG. 29 is a diagram showing the configuration of a terminal that can transmit and receive the electronic service manual display program for the embodiment of the invention, and the other, additional data. The control program 62 and the contents data 63 are transmitted by a terminal T0 to a communication line (e.g., a CATV network) or a network (e.g., the Internet), and are transferred as packets to another host in accordance with a communication protocol. Further, for the reception of the control program 62 and the contents data 63 from another host, the control program 62 and the contents data 63 are received as packets, and are stored, for example, in the RAM for the CPU 1 or the memory 2. It should be noted that the terminal T0 specifically represents a specific data transmission/reception function included in the apparatus that employs the electronic service manual and the server 72 shown in FIG. 1.

The terminal T0 in FIG. 29 comprises: a reception buffer T1, a transmission buffer T2, a communication interface adaptor (Adaptor) T3, a data converter T4, a controller T5 and a communication terminal T6. The controller T5 controls the operations of the individual components of the terminal T0, and executes the transmission processing sequences in a flowchart in FIG. 30 and the reception processing sequences in a flowchart in FIG. 31.

Figure 30:
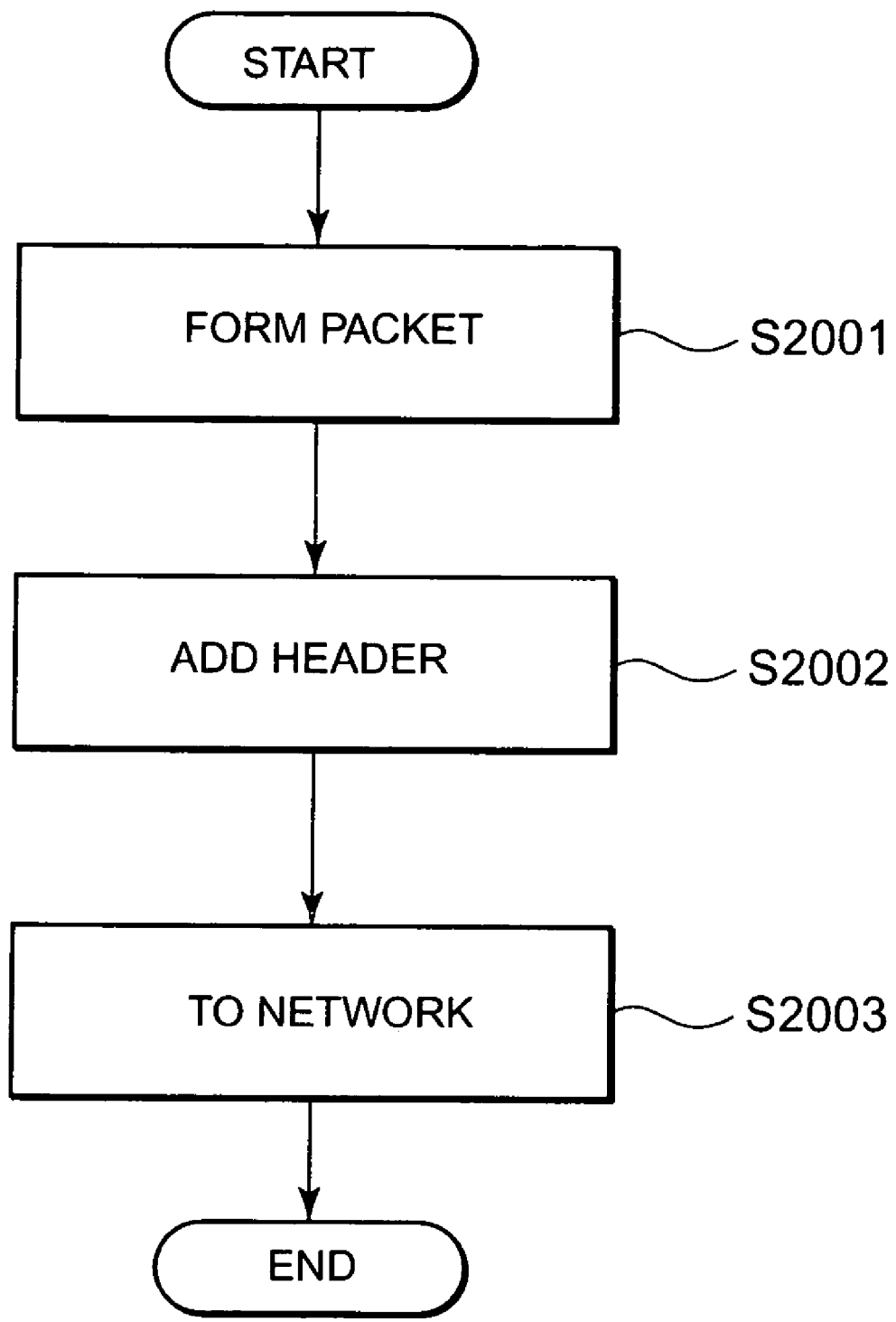
[FIG. 30] A flowchart employed for the transfer (transmission) of the electronic service manual display program for the embodiment of the present invention, and other, additional data.
Figure 32:
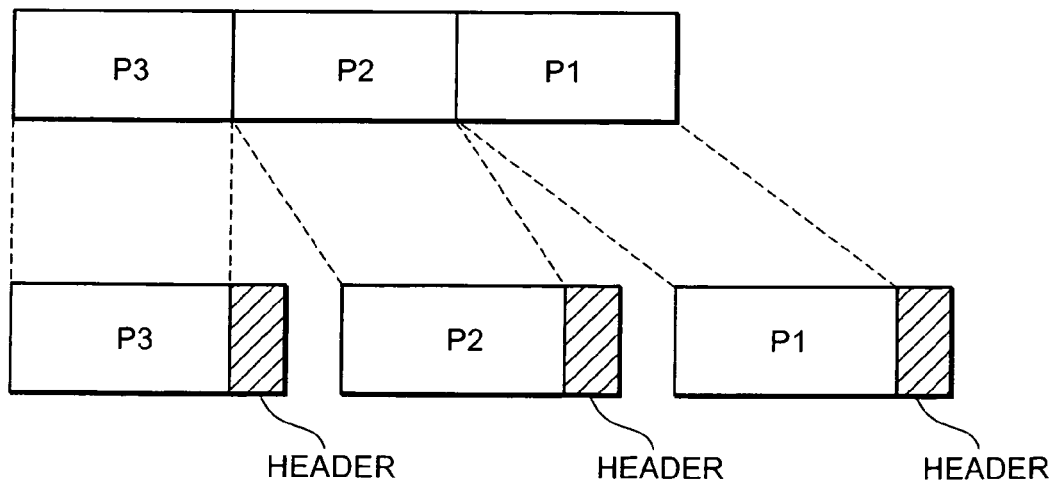
[FIG. 32] An explanatory diagram for the formation of data packets performed by a data converter shown in FIG. 29.
Figure 34:
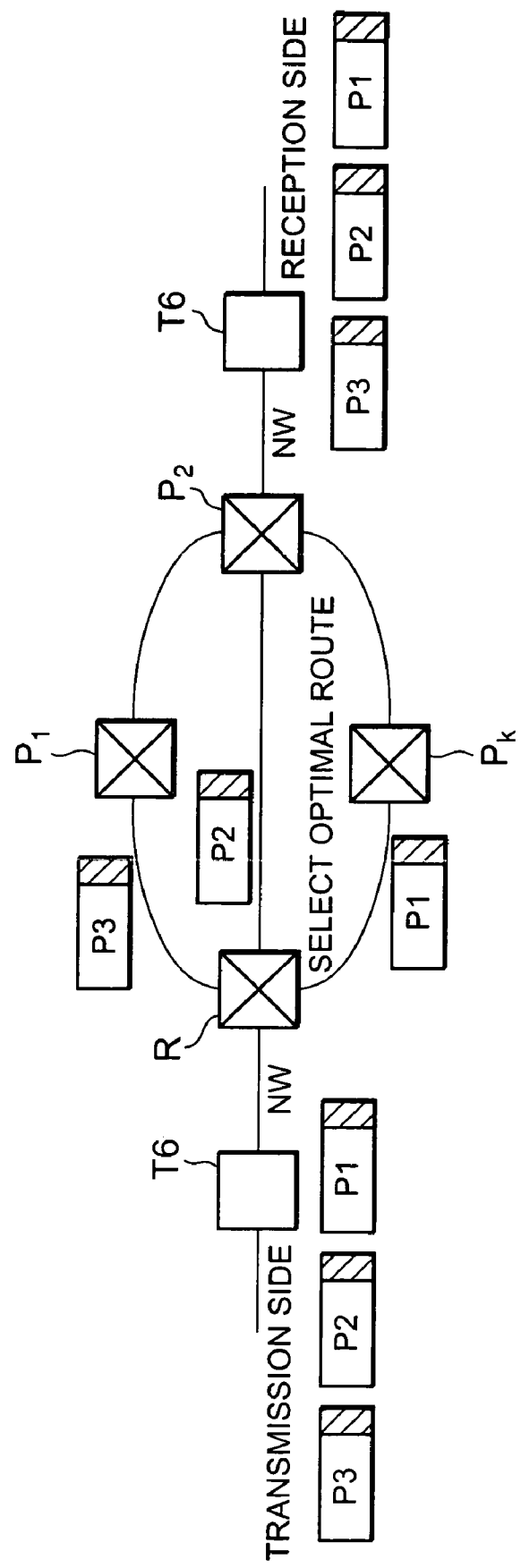
[FIG. 34] A configuration diagram showing a communication network, extended between a transmission side and a reception side, for the electronic service manual display program for the embodiment of the present invention, and other, additional data.

FIG. 30 is a flowchart for the transfer (transmission) of the electronic service manual display program for the embodiment of the present invention, and other, additional data. In the flowchart shown in FIG. 30 for the transfer (transmission), for example, as is shown in FIG. 32, the electronic service manual display program (program information) according to this invention is broken by the data converter T4, via the transmission buffer T2, into blocks (called packets) P1, P2 and P3 of predetermined sizes (step S2001). Then, headers (addresses) are added, and the resultant packets are assembled or formatted into a digital signal sequence (step S2002). The packets are then transmitted from the communication terminal T6 to a communication network NW (corresponding to the network 71 in FIG. 1) through the adaptor T3, which employs a communication protocol to connect with a partner station (step S2003). The information carried by the packets shown in FIG. 32, which are routed across a communication network NW, is supplied in accordance with the communication protocol through a router R, which selects an optimal route, and a packet exchange Pn (n=1, 2, ..., k) to the communication terminal T6 of the partner station in the communication network configuration shown in FIG. 34.

Figure 31:
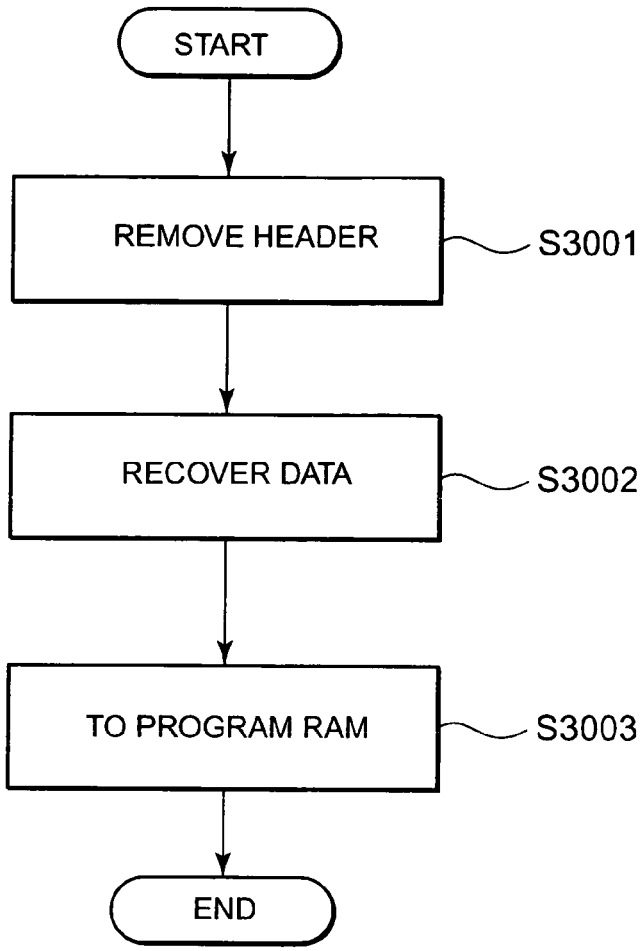
[FIG. 31] A flowchart employed for the reception of the electronic service manual display program for the embodiment of the present invention, and other, additional data.
Figure 33:
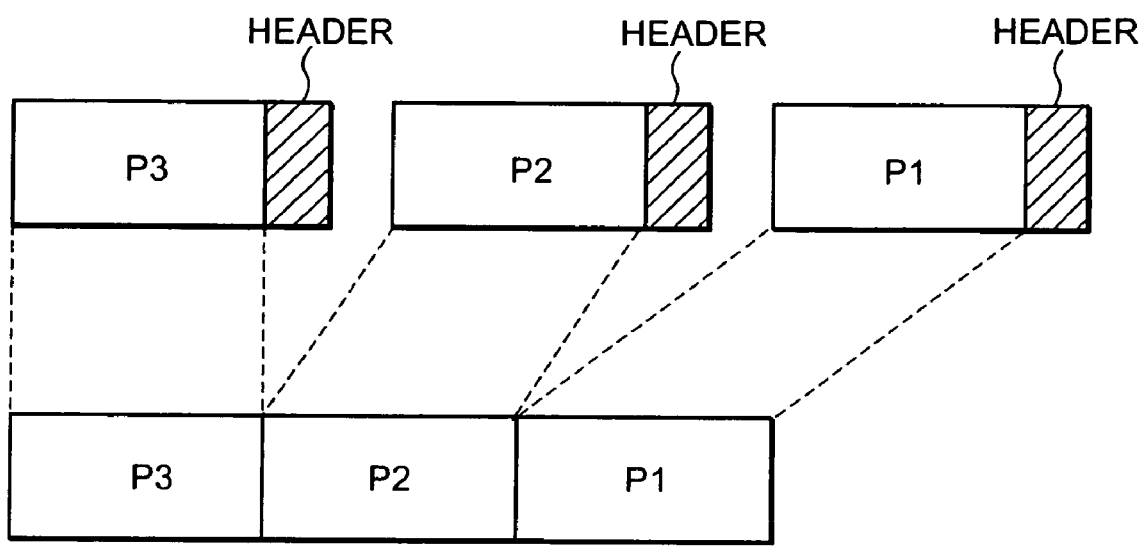
[FIG. 33] An explanatory diagram for the recovery of data from the packets performed by the data converter shown in FIG. 29.

FIG. 31 is a flowchart for the reception of the electronic service manual display program for the embodiment of the present invention, and the other, additional data. The headers of the above described information received through the communication terminal T6 and the adaptor T3 are removed by the data converter T4, as is shown in FIG. 33 (step S3001). The resultant information is arranged in the order P1, P2 and P3, and the original data is recovered (step S3002). The thus obtained data is supplied as a program, through the reception buffer T1, to the internal memory (e.g., the RAM of the CPU 1 shown in FIG. 1) (step S3003). In this manner, the information is transmitted as packets to a partner station (a plurality of stations is also available), whereat the original information is recovered. Through this processing, the control program related to the electronic service manual, and the contents data, are transferred (transmitted) to and used by a partner.

In this embodiment, it is assumed that a requesting station (reception station) browses the Web page of a data supplying station (a transmission station or a server) and requests (accesses through the Internet), from among items available on the Web page, a desired control program and contents data, and that the transmission station, upon receiving the request, transmits the control program and the contents data to the requesting station. For the Internet, the TCP/IP protocol suite, for example, is generally employed as the communication interface adaptor T3. Furthermore, the present invention is not limited to the above described data transmission/reception mode, and in addition to the mode for transmitting data upon the reception of a request, unidirectional data transmission from the data supplying station to the other (reception station) is also enabled.

In this specification, an explanation has basically been given for the mode wherein the operation of this invention is performed when a CPU mounted in a computer, such as a PC, executes a predetermined program. In this case, as an example, the means for performing the steps in the individual flowcharts are provided by the CPU. However, when these means are constituted by hardware, a display control apparatus that provides the electronic service manual according to the invention, a transmission apparatus for transmitting a control program and contents data, and a reception apparatus for receiving a control program and contents data can also be obtained.

Technical ideas, other than the claims, that for ready understanding are presented during the course of the embodiment of the present invention will now be described.

An electronic service manual display program that permits a computer to perform the steps of:

presenting an order display in order to enable the submission of an order for each part entered in the parts list on the parts table page; and establishing in advance, for each part on the parts table page, parts identification information corresponding to the part, and when the order display is selected, obtaining the parts identification information that is designated for a part for which the order display has been selected on the parts table page, employing the obtained results to read, from the parts table database information, an information type that is related to the part and is to be transmitted to the parts order receiving server, and embedding the information type in the order page.

A recording medium, on which recorded is an electronic service manual display program that permits a computer to perform the steps of:

presenting an order display in order to enable the submission of an order for each part entered in the parts list on the parts table page; and establishing in advance, for each part on the parts table page, parts identification information corresponding to the part, and when the order display is selected, obtaining the parts identification information that is designated for a part for which the order display has been selected on the parts table page, employing the obtained results to read, from the parts table database information, an information type that is related to the part and is to be transmitted to the parts order receiving server, and embedding the information type in the order page.

An electronic service manual display control method, for displaying, on a display device, information that is related to parts and that is used for a predetermined product constituted by an electric circuit or an electronic circuit employing the parts as components, and at the least either a board diagram that represents not only a board used for the predetermined product but also the parts mounted on the board, or a circuit diagram that represents a circuit provided on the board, comprising the steps of:

displaying an index page display area for displaying an index page on which a list of names for, at the least, either the board or the circuit is published;

displaying a parts table page display area for displaying a parts table page on which a list of the parts is published;

displaying a drawing display area to display a drawing, at the least, either a board diagram for the board or a circuit diagram for the circuit;

displaying the index page in the index page display area;

displaying the parts table page in the parts table page display area;

establishing in advance, for each of the names published on the index page, index page information, which is drawing identification information for the drawing corresponding to the names, and when one of the names displayed in the index page display area is selected, obtaining from the index page information the drawing identification information that is designated for the selected name;

when the thus obtained drawing identification information is information for a designation of the board diagram or the circuit diagram, searching for and displaying, in the drawing display area, the board diagram or the circuit diagram that corresponds to the drawing identification information;

when the drawing identification information thus obtained is information for a designation of both the board diagram and the circuit diagram, dividing the drawing display area into first and second display areas and searching for and displaying, in the first and second display areas, the board diagram and the circuit diagram that correspond to the drawing identification information;

reading network connection destination information, including parts ordering setup information wherein are entered URL information for a predetermined order receiving server that receives orders for the parts, information indicating an information type to be transmitted to the parts order receiving server, and a method for the transmission of orders to the parts order receiving server;

establishing in advance, for graphics primitives that are constituents of the drawing, graphics primitive information, which is parts identification information corresponding to the parts, and when a predetermined operation is performed for one of the graphics primitives that constitute the board diagram or the circuit diagram displayed in the drawing display area, examining the network connection destination information to generate and display menu information that includes choices for the issue of an order for parts to the parts order receiving server;

generating a parts order page when in the menu information a choice is selected for issuing an order for parts to the parts order receiving order, and based on the parts identification information included in the graphics primitive information for the selected graphics primitive, obtaining for the part, from parts table database information wherein detailed information for each of the parts is stored together with the parts identification information, an information type to be transmitted to the parts order receiving server, and embedding, in the parts order page, the information type that is to be transmitted to the parts order receiving server and that is related to each of the parts;

displaying the parts order page;

accepting, at a predetermined location in the parts order page, an entry for the quantity of each of the parts to be ordered;

employing the method for the transmission to the parts order receiving server to transmit, to the parts order receiving server designated by the URL information, the information type that is to be transmitted to the parts order receiving server and is related to each of the parts, and the quantity of each of the parts to be ordered;

receiving from the parts order receiving server order acceptance results related to the parts; and displaying the order acceptance results that have been received.

An electronic service manual display control method, for displaying, on a display device, information that is related to parts and that is used for a predetermined product constituted by an electric circuit or an electronic circuit employing the parts as components, and at the least either a board diagram that represents not only a board used for the predetermined product but also the parts mounted on the board, or a circuit diagram that represents a circuit provided on the board, comprising the steps of:

displaying an index page display area for displaying an index page on which a list of names for, at the least, either the board or the circuit is published;

displaying a parts table page display area for displaying a parts table page on which a list of the parts is published;

displaying a drawing display area to display a drawing, at the least, either a board diagram for the board or a circuit diagram for the circuit;

displaying the index page in the index page display area;

displaying the parts table page in the parts table page display area;

establishing in advance, for each of the names published on the index page, index page information, which is drawing identification information for the drawing corresponding to the names, and when one of the names displayed in the index page display area is selected, obtaining from the index page information the drawing identification information that is designated for the selected name;

when the thus obtained drawing identification information is information for a designation of the board diagram or the circuit diagram, searching for and displaying, in the drawing display area, the board diagram or the circuit diagram that corresponds to the drawing identification information;

when the drawing identification information thus obtained is information for a designation of both the board diagram and the circuit diagram, dividing the drawing display area into first and second display areas and searching for and displaying, in the first and second display areas, the board diagram and the circuit diagram that correspond to the drawing identification information;

establishing in advance, for graphics primitives that are constituents of the drawing, graphics primitive information that is parts identification information corresponding to the parts, and when a predetermined operation is performed for one of the graphics primitives that constitute the board diagram or the circuit diagram displayed in the drawing display area, generating and displaying menu information that includes a choice for issuing an order for parts using email;

generating a parts order page when the choice for issuing an order for parts using email is selected in the menu information, and based on the parts identification information included in the graphics primitive information for the selected graphics primitive, extracting for the part, from parts table database information wherein detailed information related to each of the parts is stored together with parts identification information for parts, detailed information that includes parts identification information provided in the graphics primitive information for the selected graphics primitive;

reading email setup information wherein are entered email address information for a predetermined parts order receiving server that receives an order for the parts, information showing an information type to be transmitted to the parts order receiving server, and a method for writing information in an email to be transmitted to the parts order receiving server;

employing the email setup information to selectively embed, in the thus generated parts order page, the extracted, detailed information related to the parts and the information indicating the information type to be transmitted to the parts order receiving server;

displaying the parts order page;

accepting, at a predetermined location on the parts order page, the quantity to be ordered for each of the parts; and employing the method, included in the email setup information, for writing information for an email to be transmitted to the parts order receiving server, and for generating an email in order to transmit, to an email address, information for the parts order receiving server, the type of information, which is embedded in the parts order page to be transmitted to the parts order receiving server and that is related to the parts, and the quantity of each of the parts to be ordered.

An electronic service manual display control method comprising the steps of:

presenting an order display in order to enable the submission of an order for each part entered in the parts list on the parts table page; and establishing in advance, for each part on the parts table page, parts identification information corresponding to the part, and when the order display is selected, obtaining the parts identification information that is designated for a part for which the order display has been selected on the parts table page, employing the obtained results to read, from the parts table database information, an information type that is related to the part and is to be transmitted to the parts order receiving server, and embedding the information type in the order page.

An electronic service manual display control apparatus, for displaying, on a display device, information that is related to parts and that is used for a predetermined product constituted by an electric circuit or an electronic circuit employing the parts as components, and at the least either a board diagram that represents not only a board used for the predetermined product but also the parts mounted on the board, or a circuit diagram that represents a circuit provided on the board, comprising:

means for displaying an index page display area for displaying an index page on which a list of names for, at the least, either the board or the circuit is published;

means for displaying a parts table page display area for displaying a parts table page on which a list of the parts is published;

means for displaying a drawing display area to display a drawing, at the least, either a board diagram for the board or a circuit diagram for the circuit;

means for displaying the index page in the index page display area;

means for displaying the parts table page in the parts table page display area;

means for establishing in advance, for each of the names published on the index page, index page information, which is drawing identification information for the drawing corresponding to the names, and for, when one of the names displayed in the index page display area is selected, obtaining from the index page information the drawing identification information that is designated for the selected name;

means for, when the thus obtained drawing identification information is information for a designation of the board diagram or the circuit diagram, searching for and displaying, in the drawing display area, the board diagram or the circuit diagram that corresponds to the drawing identification information;

means for, when the drawing identification information thus obtained is information for a designation of both the board diagram and the circuit diagram, dividing the drawing display area into first and second display areas and searching for and displaying, in the first and second display areas, the board diagram and the circuit diagram that correspond to the drawing identification information;

means for reading network connection destination information, including parts ordering setup information wherein are entered URL information for a predetermined order receiving server that receives orders for the parts, information indicating an information type to be transmitted to the parts order receiving server, and a method for the transmission of orders to the parts order receiving server;

means for establishing in advance, for graphics primitives that are constituents of the drawing, graphics primitive information, which is parts identification information corresponding to the parts, and for, when a predetermined operation is performed for one of the graphics primitives that constitute the board diagram or the circuit diagram displayed in the drawing display area, examining the network connection destination information to generate and display menu information that includes choices for the issue of an order for parts to the parts order receiving server;

means for generating a parts order page when in the menu information a choice is selected for issuing an order for parts to the parts order receiving order, and for, based on the parts identification information included in the graphics primitive information for the selected graphics primitive, obtaining for the part, from parts table database information wherein detailed information for each of the parts is stored together with the parts identification information, an information type to be transmitted to the parts order receiving server, and embedding, in the parts order page, the information type that is to be transmitted to the parts order receiving server and that is related to each of the parts;

means for displaying the parts order page;

means for accepting, at a predetermined location in the parts order page, an entry for the quantity of each of the parts to be ordered;

means for employing the method for the transmission to the parts order receiving server to transmit, to the parts order receiving server designated by the URL information, the information type that is to be transmitted to the parts order receiving server and is related to each of the parts, and the quantity of each of the parts to be ordered;

means for receiving from the parts order receiving server order acceptance results related to the parts; and means for displaying the order acceptance results that have been received.

An electronic service manual display control apparatus, for displaying, on a display device, information that is related to parts and that is used for a predetermined product constituted by an electric circuit or an electronic circuit employing the parts as components, and at the least either a board diagram that represents not only a board used for the predetermined product but also the parts mounted on the board, or a circuit diagram that represents a circuit provided on the board, comprising:

means for displaying an index page display area for displaying an index page on which a list of names for, at the least, either the board or the circuit is published;

means for displaying a parts table page display area for displaying a parts table page on which a list of the parts is published;

means for displaying a drawing display area to display a drawing, at the least, either a board diagram for the board or a circuit diagram for the circuit;

means for displaying the index page in the index page display area;

means for displaying the parts table page in the parts table page display area;

means for establishing in advance, for each of the names published on the index page, index page information, which is drawing identification information for the drawing corresponding to the names, and for, when one of the names displayed in the index page display area is selected, obtaining from the index page information the drawing identification information that is designated for the selected name;

means for, when the thus obtained drawing identification information is information for a designation of the board diagram or the circuit diagram, searching for and displaying, in the drawing display area, the board diagram or the circuit diagram that corresponds to the drawing identification information;

means for, when the drawing identification information thus obtained is information for a designation of both the board diagram and the circuit diagram, dividing the drawing display area into first and second display areas and searching for and displaying, in the first and second display areas, the board diagram and the circuit diagram that correspond to the drawing identification information;

means for establishing in advance, for graphics primitives that are constituents of the drawing, graphics primitive information that is parts identification information corresponding to the parts, and for, when a predetermined operation is performed for one of the graphics primitives that constitute the board diagram or the circuit diagram displayed in the drawing display area, generating and displaying menu information that includes a choice for issuing an order for parts using email;

means for generating a parts order page when the choice for issuing an order for parts using email is selected in the menu information, and for, based on the parts identification information included in the graphics primitive information for the selected graphics primitive, extracting for the part, from parts table database information wherein detailed information related to each of the parts is stored together with parts identification information for parts, detailed information that includes parts identification information provided in the graphics primitive information for the selected graphics primitive;

means for reading email setup information wherein are entered email address information for a predetermined parts order receiving server that receives an order for the parts, information showing an information type to be transmitted to the parts order receiving server, and a method for writing information in an email to be transmitted to the parts order receiving server;

means for employing the email setup information to selectively embed, in the thus generated parts order page, the extracted, detailed information related to the parts and the information indicating the information type to be transmitted to the parts order receiving server;

means for displaying the parts order page;

means for accepting, at a predetermined location on the parts order page, the quantity to be ordered for each of the parts; and means for employing the method, included in the email setup information, for writing information for an email to be transmitted to the parts order receiving server, and for generating an email in order to transmit, to an email address, information for the parts order receiving server, the type of information, which is embedded in the parts order page to be transmitted to the parts order receiving server and that is related to the parts, and the quantity of each of the parts to be ordered.

An electronic service manual display control apparatus comprising:

means for presenting an order display in order to enable the submission of an order for each part entered in the parts list on the parts table page; and means for establishing in advance, for each part on the parts table page, parts identification information corresponding to the part, and for, when the order display is selected, obtaining the parts identification information that is designated for a part for which the order display has been selected on the parts table page, employing the obtained results to read, from the parts table database information, an information type that is related to the part and is to be transmitted to the parts order receiving server, and embedding the information type in the order page.

A program transmission method, for transmitting an electronic service manual display program that permits a computer to provide a function for displaying, on a display device, information that is related to parts and that is used for a predetermined product constituted by an electric circuit or an electronic circuit employing the parts as components, and at the least either a board diagram that represents not only a board used for the predetermined product but also the parts mounted on the board, or a circuit diagram that represents a circuit provided on the board, comprising the steps of:

converting the electronic service manual display program into a digital signal sequence, for a communication line or a network, with an added header; and initiating employment of a communication protocol with a partner station across the communication line or the network and transmitting the digital signal sequence, whereby the electronic service manual display program includes the steps of displaying an index page display area for displaying an index page on which a list of names for, at the least, either the board or the circuit is published, displaying a parts table page display area for displaying a parts table page on which a list of the parts is published, displaying a drawing display area to display a drawing, at the least, either a board diagram for the board or a circuit diagram for the circuit, displaying the index page in the index page display area, displaying the parts table page in the parts table page display area, establishing in advance, for each of the names published on the index page, index page information, which is drawing identification information for the drawing corresponding to the names, and when one of the names displayed in the index page display area is selected, obtaining from the index page information the drawing identification information that is designated for the selected name, when the thus obtained drawing identification information is information for a designation of the board diagram or the circuit diagram, searching for and displaying, in the drawing display area, the board diagram or the circuit diagram that corresponds to the drawing identification information, when the drawing identification information thus obtained is information for a designation of both the board diagram and the circuit diagram, dividing the drawing display area into first and second display areas and searching for and displaying, in the first and second display areas, the board diagram and the circuit diagram that correspond to the drawing identification information, reading network connection destination information, including parts ordering setup information wherein are entered URL information for a predetermined order receiving server that receives orders for the parts, information indicating an information type to be transmitted to the parts order receiving server, and a method for the transmission of orders to the parts order receiving server, establishing in advance, for graphics primitives that are constituents of the drawing, graphics primitive information, which is parts identification information corresponding to the parts, and when a predetermined operation is performed for one of the graphics primitives that constitute the board diagram or the circuit diagram displayed in the drawing display area, examining the network connection destination information to generate and display menu information that includes choices for the issue of an order for parts to the parts order receiving server, generating a parts order page when in the menu information a choice is selected for issuing an order for parts to the parts order receiving order, and based on the parts identification information included in the graphics primitive information for the selected graphics primitive, obtaining for the part, from parts table database information wherein detailed information for each of the parts is stored together with the parts identification information, an information type to be transmitted to the parts order receiving server, and embedding, in the parts order page, the information type that is to be transmitted to the parts order receiving server and that is related to each of the parts, displaying the parts order page, accepting, at a predetermined location in the parts order page, an entry for the quantity of each of the parts to be ordered, employing the method for the transmission to the parts order receiving server to transmit, to the parts order receiving server designated by the URL information, the information type that is to be transmitted to the parts order receiving server and is related to each of the parts, and the quantity of each of the parts to be ordered, receiving from the parts order receiving server order acceptance results related to the parts, and displaying the order acceptance results that have been received.

A program transmission method, for transmitting an electronic service manual display program that permits a computer to provide a function for displaying, on a display device, information that is related to parts and that is used for a predetermined product constituted by an electric circuit or an electronic circuit employing the parts as components, and at the least either a board diagram that represents not only a board used for the predetermined product but also the parts mounted on the board, or a circuit diagram that represents a circuit provided on the board, comprising the steps of:

converting the electronic service manual display program into a digital signal sequence, for a communication line or a network, with an added header; and initiating employment of a communication protocol with a partner station across the communication line or the network and transmitting the digital signal sequence, whereby the electronic service manual display program includes the steps of displaying an index page display area for displaying an index page on which a list of names for, at the least, either the board or the circuit is published, displaying a parts table page display area for displaying a parts table page on which a list of the parts is published, displaying a drawing display area to display a drawing, at the least, either a board diagram for the board or a circuit diagram for the circuit, displaying the index page in the index page display area, displaying the parts table page in the parts table page display area, establishing in advance, for each of the names published on the index page, index page information, which is drawing identification information for the drawing corresponding to the names, and when one of the names displayed in the index page display area is selected, obtaining from the index page information the drawing identification information that is designated for the selected name, when the thus obtained drawing identification information is information for a designation of the board diagram or the circuit diagram, searching for and displaying, in the drawing display area, the board diagram or the circuit diagram that corresponds to the drawing identification information, when the drawing identification information thus obtained is information for a designation of both the board diagram and the circuit diagram, dividing the drawing display area into first and second display areas and searching for and displaying, in the first and second display areas, the board diagram and the circuit diagram that correspond to the drawing identification information, establishing in advance, for graphics primitives that are constituents of the drawing, graphics primitive information that is parts identification information corresponding to the parts, and when a predetermined operation is performed for one of the graphics primitives that constitute the board diagram or the circuit diagram displayed in the drawing display area, generating and displaying menu information that includes a choice for issuing an order for parts using email, generating a parts order page when the choice for issuing an order for parts using email is selected in the menu information, and based on the parts identification information included in the graphics primitive information for the selected graphics primitive, extracting for the part, from parts table database information wherein detailed information related to each of the parts is stored together with parts identification information for parts, detailed information that includes parts identification information provided in the graphics primitive information for the selected graphics primitive, reading email setup information wherein are entered email address information for a predetermined parts order receiving server that receives an order for the parts, information showing an information type to be transmitted to the parts order receiving server, and a method for writing information in an email to be transmitted to the parts order receiving server, employing the email setup information to selectively embed, in the thus generated parts order page, the extracted, detailed information related to the parts and the information indicating the information type to be transmitted to the parts order receiving server, displaying the parts order page, accepting, at a predetermined location on the parts order page, the quantity to be ordered for each of the parts, and employing the method, included in the email setup information, for writing information for an email to be transmitted to the parts order receiving server, and for generating an email in order to transmit, to an email address, information for the parts order receiving server, the type of information, which is embedded in the parts order page to be transmitted to the parts order receiving server and that is related to the parts, and the quantity of each of the parts to be ordered.

A program transmission method, for transmitting an electronic service manual display control program that comprises the steps of:

presenting an order display in order to enable the submission of an order for each part entered in the parts list on the parts table page; and establishing in advance, for each part on the parts table page, parts identification information corresponding to the part, and when the order display is selected, obtaining the parts identification information that is designated for a part for which the order display has been selected on the parts table page, employing the obtained results to read, from the parts table database information, an information type that is related to the part and is to be transmitted to the parts order receiving server, and embedding the information type in the order page.

A program transmission apparatus, for transmitting an electronic service manual display program that permits a computer to provide a function for displaying, on a display device, information that is related to parts and that is used for a predetermined product constituted by an electric circuit or an electronic circuit employing the parts as components, and at the least either a board diagram that represents not only a board used for the predetermined product but also the parts mounted on the board, or a circuit diagram that represents a circuit provided on the board, comprising:

conversion means for converting the electronic service manual display program into a digital signal sequence, for a communication line or a network, with an added header; and transmission means for initiating employment of a communication protocol with a partner station across the communication line or the network and transmitting the digital signal sequence, wherein the electronic service manual display program includes the steps of displaying an index page display area for displaying an index page on which a list of names for, at the least, either the board or the circuit is published, displaying a parts table page display area for displaying a parts table page on which a list of the parts is published, displaying a drawing display area to display a drawing, at the least, either a board diagram for the board or a circuit diagram for the circuit, displaying the index page in the index page display area, displaying the parts table page in the parts table page display area, establishing in advance, for each of the names published on the index page, index page information, which is drawing identification information for the drawing corresponding to the names, and when one of the names displayed in the index page display area is selected, obtaining from the index page information the drawing identification information that is designated for the selected name, when the thus obtained drawing identification information is information for a designation of the board diagram or the circuit diagram, searching for and displaying, in the drawing display area, the board diagram or the circuit diagram that corresponds to the drawing identification information, when the drawing identification information thus obtained is information for a designation of both the board diagram and the circuit diagram, dividing the drawing display area into first and second display areas and searching for and displaying, in the first and second display areas, the board diagram and the circuit diagram that correspond to the drawing identification information, reading network connection destination information, including parts ordering setup information wherein are entered URL information for a predetermined order receiving server that receives orders for the parts, information indicating an information type to be transmitted to the parts order receiving server, and a method for the transmission of orders to the parts order receiving server, establishing in advance, for graphics primitives that are constituents of the drawing, graphics primitive information, which is parts identification information corresponding to the parts, and when a predetermined operation is performed for one of the graphics primitives that constitute the board diagram or the circuit diagram displayed in the drawing display area, examining the network connection destination information to generate and display menu information that includes choices for the issue of an order for parts to the parts order receiving server, generating a parts order page when in the menu information a choice is selected for issuing an order for parts to the parts order receiving order, and based on the parts identification information included in the graphics primitive information for the selected graphics primitive, obtaining for the part, from parts table database information wherein detailed information for each of the parts is stored together with the parts identification information, an information type to be transmitted to the parts order receiving server, and embedding, in the parts order page, the information type that is to be transmitted to the parts order receiving server and that is related to each of the parts, displaying the parts order page, accepting, at a predetermined location in the parts order page, an entry for the quantity of each of the parts to be ordered, employing the method for the transmission to the parts order receiving server to transmit, to the parts order receiving server designated by the URL information, the information type that is to be transmitted to the parts order receiving server and is related to each of the parts, and the quantity of each of the parts to be ordered, receiving from the parts order receiving server order acceptance results related to the parts, and displaying the order acceptance results that have been received.

A program transmission apparatus, for transmitting an electronic service manual display program that permits a computer to provide a function for displaying, on a display device, information that is related to parts and that is used for a predetermined product constituted by an electric circuit or an electronic circuit employing the parts as components, and at the least either a board diagram that represents not only a board used for the predetermined product but also the parts mounted on the board, or a circuit diagram that represents a circuit provided on the board, comprising:

conversion means for converting the electronic service manual display program into a digital signal sequence, for a communication line or a network, with an added header; and transmission means for initiating employment of a communication protocol with a partner station across the communication line or the network and transmitting the digital signal sequence, wherein the electronic service manual display program includes the steps of displaying an index page display area for displaying an index page on which a list of names for, at the least, either the board or the circuit is published, displaying a parts table page display area for displaying a parts table page on which a list of the parts is published, displaying a drawing display area to display a drawing, at the least, either a board diagram for the board or a circuit diagram for the circuit, displaying the index page in the index page display area, displaying the parts table page in the parts table page display area, establishing in advance, for each of the names published on the index page, index page information, which is drawing identification information for the drawing corresponding to the names, and when one of the names displayed in the index page display area is selected, obtaining from the index page information the drawing identification information that is designated for the selected name, when the thus obtained drawing identification information is information for a designation of the board diagram or the circuit diagram, searching for and displaying, in the drawing display area, the board diagram or the circuit diagram that corresponds to the drawing identification information, when the drawing identification information thus obtained is information for a designation of both the board diagram and the circuit diagram, dividing the drawing display area into first and second display areas and searching for and displaying, in the first and second display areas, the board diagram and the circuit diagram that correspond to the drawing identification information, establishing in advance, for graphics primitives that are constituents of the drawing, graphics primitive information that is parts identification information corresponding to the parts, and when a predetermined operation is performed for one of the graphics primitives that constitute the board diagram or the circuit diagram displayed in the drawing display area, generating and displaying menu information that includes a choice for issuing an order for parts using email, generating a parts order page when the choice for issuing an order for parts using email is selected in the menu information, and based on the parts identification information included in the graphics primitive information for the selected graphics primitive, extracting for the part, from parts table database information wherein detailed information related to each of the parts is stored together with parts identification information for parts, detailed information that includes parts identification information provided in the graphics primitive information for the selected graphics primitive, reading email setup information wherein are entered email address information for a predetermined parts order receiving server that receives an order for the parts, information showing an information type to be transmitted to the parts order receiving server, and a method for writing information in an email to be transmitted to the parts order receiving server, employing the email setup information to selectively embed, in the thus generated parts order page, the extracted, detailed information related to the parts and the information indicating the information type to be transmitted to the parts order receiving server, displaying the parts order page, accepting, at a predetermined location on the parts order page, the quantity to be ordered for each of the parts, and employing the method, included in the email setup information, for writing information for an email to be transmitted to the parts order receiving server, and for generating an email in order to transmit, to an email address, information for the parts order receiving server, the type of information, which is embedded in the parts order page to be transmitted to the parts order receiving server and that is related to the parts, and the quantity of each of the parts to be ordered.

A program transmission apparatus, for transmitting an electronic service manual display control program that comprises the steps of:

presenting an order display in order to enable the submission of an order for each part entered in the parts list on the parts table page; and establishing in advance, for each part on the parts table page, parts identification information corresponding to the part, and when the order display is selected, obtaining the parts identification information that is designated for a part for which the order display has been selected on the parts table page, employing the obtained results to read, from the parts table database information, an information type that is related to the part and is to be transmitted to the parts order receiving server, and embedding the information type in the order page.

A program reception method, for receiving an electronic service manual display program that permits a computer to provide a function for displaying, on a display device, information that is related to parts and that is used for a predetermined product constituted by an electric circuit or an electronic circuit employing the parts as components, and at the least either a board diagram that represents not only a board used for the predetermined product but also the parts mounted on the board, or a circuit diagram that represents a circuit provided on the board, comprising the steps of:

initiating employment of a communication protocol with a partner station across a communication line or a network and receiving a digital signal sequence; and removing headers from the digital signal sequence and converting the digital signal sequence used for a communication line or a network into the original electronic service manual display program, whereby the electronic service manual display program includes the steps of displaying an index page display area for displaying an index page on which a list of names for, at the least, either the board or the circuit is published, displaying a parts table page display area for displaying a parts table page on which a list of the parts is published, displaying a drawing display area to display a drawing, at the least, either a board diagram for the board or a circuit diagram for the circuit, displaying the index page in the index page display area, displaying the parts table page in the parts table page display area, establishing in advance, for each of the names published on the index page, index page information, which is drawing identification information for the drawing corresponding to the names, and when one of the names displayed in the index page display area is selected, obtaining from the index page information the drawing identification information that is designated for the selected name, when the thus obtained drawing identification information is information for a designation of the board diagram or the circuit diagram, searching for and displaying, in the drawing display area, the board diagram or the circuit diagram that corresponds to the drawing identification information, when the drawing identification information thus obtained is information for a designation of both the board diagram and the circuit diagram, dividing the drawing display area into first and second display areas and searching for and displaying, in the first and second display areas, the board diagram and the circuit diagram that correspond to the drawing identification information, reading network connection destination information, including parts ordering setup information wherein are entered URL information for a predetermined order receiving server that receives orders for the parts, information indicating an information type to be transmitted to the parts order receiving server, and a method for the transmission of orders to the parts order receiving server, establishing in advance, for graphics primitives that are constituents of the drawing, graphics primitive information, which is parts identification information corresponding to the parts, and when a predetermined operation is performed for one of the graphics primitives that constitute the board diagram or the circuit diagram displayed in the drawing display area, examining the network connection destination information to generate and display menu information that includes choices for the issue of an order for parts to the parts order receiving server, generating a parts order page when in the menu information a choice is selected for issuing an order for parts to the parts order receiving order, and based on the parts identification information included in the graphics primitive information for the selected graphics primitive, obtaining for the part, from parts table database information wherein detailed information for each of the parts is stored together with the parts identification information, an information type to be transmitted to the parts order receiving server, and embedding, in the parts order page, the information type that is to be transmitted to the parts order receiving server and that is related to each of the parts, displaying the parts order page, accepting, at a predetermined location in the parts order page, an entry for the quantity of each of the parts to be ordered, employing the method for the transmission to the parts order receiving server to transmit, to the parts order receiving server designated by the URL information, the information type that is to be transmitted to the parts order receiving server and is related to each of the parts, and the quantity of each of the parts to be ordered, receiving from the parts order receiving server order acceptance results related to the parts, and displaying the order acceptance results that have been received.

A program reception method, for receiving an electronic service manual display program that permits a computer to provide a function for displaying, on a display device, information that is related to parts and that is used for a predetermined product constituted by an electric circuit or an electronic circuit employing the parts as components, and at the least either a board diagram that represents not only a board used for the predetermined product but also the parts mounted on the board, or a circuit diagram that represents a circuit provided on the board, comprising the steps of:

initiating employment of a communication protocol with a partner station across a communication line or a network and receiving a digital signal sequence; and removing headers from the digital-signal sequence and converting the digital signal sequence used for a communication line or a network into the original electronic service manual display program, whereby the electronic service manual display program includes the steps of displaying an index page display area for displaying an index page on which a list of names for, at the least, either the board or the circuit is published, displaying a parts table page display area for displaying a parts table page on which a list of the parts is published, displaying a drawing display area to display a drawing, at the least, either a board diagram for the board or a circuit diagram for the circuit, displaying the index page in the index page display area, displaying the parts table page in the parts table page display area, establishing in advance, for each of the names published on the index page, index page information, which is drawing identification information for the drawing corresponding to the names, and when one of the names displayed in the index page display area is selected, obtaining from the index page information the drawing identification information that is designated for the selected name, when the thus obtained drawing identification information is information for a designation of the board diagram or the circuit diagram, searching for and displaying, in the drawing display area, the board diagram or the circuit diagram that corresponds to the drawing identification information, when the drawing identification information thus obtained is information for a designation of both the board diagram and the circuit diagram, dividing the drawing display area into first and second display areas and searching for and displaying, in the first and second display areas, the board diagram and the circuit diagram that correspond to the drawing identification information, establishing in advance, for graphics primitives that are constituents of the drawing, graphics primitive information that is parts identification information corresponding to the parts, and when a predetermined operation is performed for one of the graphics primitives that constitute the board diagram or the circuit diagram displayed in the drawing display area, generating and displaying menu information that includes a choice for issuing an order for parts using email, generating a parts order page when the choice for issuing an order for parts using email is selected in the menu information, and based on the parts identification information included in the graphics primitive information for the selected graphics primitive, extracting for the part, from parts table database information wherein detailed information related to each of the parts is stored together with parts identification information for parts, detailed information that includes parts identification information provided in the graphics primitive information for the selected graphics primitive, reading email setup information wherein are entered email address information for a predetermined parts order receiving server that receives an order for the parts, information showing an information type to be transmitted to the parts order receiving server, and a method for writing information in an email to be transmitted to the parts order receiving server, employing the email setup information to selectively embed, in the thus generated parts order page, the extracted, detailed information related to the parts and the information indicating the information type to be transmitted to the parts order receiving server, displaying the parts order page, accepting, at a predetermined location on the parts order page, the quantity to be ordered for each of the parts, and employing the method, included in the email setup information, for writing information for an email to be transmitted to the parts order receiving server, and for generating an email in order to transmit, to an email address, information for the parts order receiving server, the type of information, which is embedded in the parts order page to be transmitted to the parts order receiving server and that is related to the parts, and the quantity of each of the parts to be ordered.

A program reception method, for receiving an electronic service manual display control program that comprises the steps of:

presenting an order display in order to enable the submission of an order for each part entered in the parts list on the parts table page; and establishing in advance, for each part on the parts table page, parts identification information corresponding to the part, and when the order display is selected, obtaining the parts identification information that is designated for a part for which the order display has been selected on the parts table page, employing the obtained results to read, from the parts table database information, an information type that is related to the part and is to be transmitted to the parts order receiving server, and embedding the information type in the order page.

A program reception apparatus, for receiving an electronic service manual display program that permits a computer to provide a function for displaying, on a display device, information that is related to parts and that is used for a predetermined product constituted by an electric circuit or an electronic circuit employing the parts as components, and at the least either a board diagram that represents not only a board used for the predetermined product but also the parts mounted on the board, or a circuit diagram that represents a circuit provided on the board, comprising:

reception means for initiating employment of a communication protocol with a partner station across a communication line or a network and receiving a digital signal sequence; and conversion means for removing headers from the digital signal sequence and converting the digital signal sequence used for a communication line or a network into the original electronic service manual display program, wherein the electronic service manual display program includes the steps of displaying an index page display area for displaying an index page on which a list of names for, at the least, either the board or the circuit is published, displaying a parts table page display area for displaying a parts table page on which a list of the parts is published, displaying a drawing display area to display a drawing, at the least, either a board diagram for the board or a circuit diagram for the circuit, displaying the index page in the index page display area, displaying the parts table page in the parts table page display area, establishing in advance, for each of the names published on the index page, index page information, which is drawing identification information for the drawing corresponding to the names, and when one of the names displayed in the index page display area is selected, obtaining from the index page information the drawing identification information that is designated for the selected name, when the thus obtained drawing identification information is information for a designation of the board diagram or the circuit diagram, searching for and displaying, in the drawing display area, the board diagram or the circuit diagram that corresponds to the drawing identification information, when the drawing identification information thus obtained is information for a designation of both the board diagram and the circuit diagram, dividing the drawing display area into first and second display areas and searching for and displaying, in the first and second display areas, the board diagram and the circuit diagram that correspond to the drawing identification information, reading network connection destination information, including parts ordering setup information wherein are entered URL information for a predetermined order receiving server that receives orders for the parts, information indicating an information type to be transmitted to the parts order receiving server, and a method for the transmission of orders to the parts order receiving server, establishing in advance, for graphics primitives that are constituents of the drawing, graphics primitive information, which is parts identification information corresponding to the parts, and when a predetermined operation is performed for one of the graphics primitives that constitute the board diagram or the circuit diagram displayed in the drawing display area, examining the network connection destination information to generate and display menu information that includes choices for the issue of an order for parts to the parts order receiving server, generating a parts order page when in the menu information a choice is selected for issuing an order for parts to the parts order receiving order, and based on the parts identification information included in the graphics primitive information for the selected graphics primitive, obtaining for the part, from parts table database information wherein detailed information for each of the parts is stored together with the parts identification information, an information type to be transmitted to the parts order receiving server, and embedding, in the parts order page, the information type that is to be transmitted to the parts order receiving server and that is related to each of the parts, displaying the parts order page, accepting, at a predetermined location in the parts order page, an entry for the quantity of each of the parts to be ordered, employing the method for the transmission to the parts order receiving server to transmit, to the parts order receiving server designated by the URL information, the information type that is to be transmitted to the parts order receiving server and is related to each of the parts, and the quantity of each of the parts to be ordered, receiving from the parts order receiving server order acceptance results related to the parts, and displaying the order acceptance results that have been received.

A program reception apparatus, for receiving an electronic service manual display program that permits a computer to provide a function for displaying, on a display device, information that is related to parts and that is used for a predetermined product constituted by an electric circuit or an electronic circuit employing the parts as components, and at the least either a board diagram that represents not only a board used for the predetermined product but also the parts mounted on the board, or a circuit diagram that represents a circuit provided on the board, comprising:

reception means for initiating employment of a communication protocol with a partner station across a communication line or a network and receiving a digital signal sequence; and conversion means for removing headers from the digital signal sequence and converting the digital signal sequence used for a communication line or a network into the original electronic service manual display program, wherein the electronic service manual display program includes the steps of displaying an index page display area for displaying an index page on which a list of names for, at the least, either the board or the circuit is published, displaying a parts table page display area for displaying a parts table page on which a list of the parts is published, displaying a drawing display area to display a drawing, at the least, either a board diagram for the board or a circuit diagram for the circuit, displaying the index page in the index page display area, displaying the parts table page in the parts table page display area, establishing in advance, for each of the names published on the index page, index page information, which is drawing identification information for the drawing corresponding to the names, and when one of the names displayed in the index page display area is selected, obtaining from the index page information the drawing identification information that is designated for the selected name, when the thus obtained drawing identification information is information for a designation of the board diagram or the circuit diagram, searching for and displaying, in the drawing display area, the board diagram or the circuit diagram that corresponds to the drawing identification information, when the drawing identification information thus obtained is information for a designation of both the board diagram and the circuit diagram, dividing the drawing display area into first and second display areas and searching for and displaying, in the first and second display areas, the board diagram and the circuit diagram that correspond to the drawing identification information, establishing in advance, for graphics primitives that are constituents of the drawing, graphics primitive information that is parts identification information corresponding to the parts, and when a predetermined operation is performed for one of the graphics primitives that constitute the board diagram or the circuit diagram displayed in the drawing display area, generating and displaying menu information that includes a choice for issuing an order for parts using email, generating a parts order page when the choice for issuing an order for parts using email is selected in the menu information, and based on the parts identification information included in the graphics primitive information for the selected graphics primitive, extracting for the part, from parts table database information wherein detailed information related to each of the parts is stored together with parts identification information for parts, detailed information that includes parts identification information provided in the graphics primitive information for the selected graphics primitive, reading email setup information wherein are entered email address information for a predetermined parts order receiving server that receives an order for the parts, information showing an information type to be transmitted to the parts order receiving server, and a method for writing information in an email to be transmitted to the parts order receiving server, employing the email setup information to selectively embed, in the thus generated parts order page, the extracted, detailed information related to the parts and the information indicating the information type to be transmitted to the parts-order receiving server, displaying the parts order page, accepting, at a predetermined location on the parts order page, the quantity to be ordered for each of the parts, and employing the method, included in the email setup information, for writing information for an email to be transmitted to the parts order receiving server, and for generating an email in order to transmit, to an email address, information for the parts order receiving server, the type of information, which is embedded in the parts order page to be transmitted to the parts order receiving server and that is related to the parts, and the quantity of each of the parts to be ordered.

A program reception apparatus, for receiving an electronic service manual display control program that comprises the steps of:

presenting an order display in order to enable the submission of an order for each part entered in the parts list on the parts table page; and establishing in advance, for each part on the parts table page, parts identification information corresponding to the part, and when the order display is selected, obtaining the parts identification information that is designated for a part for which the order display has been selected on the parts table page, employing the obtained results to read, from the parts table database information, an information type that is related to the part and is to be transmitted to the parts order receiving server, and embedding the information type in the order page.

INDUSTRIAL APPLICABILITY

As is described above, the present invention relates to the browsing of the contents of an electronic service manual, and since parts information in the contents arbitrarily selected by a user is transmitted as transmission information to a server connected through the Internet or an intranet, an order for a product can be easily and correctly issued, across the Internet, to a predetermined parts order receiving server by employing the data transmission function of the browser or by using an email. Thus, the present invention is effective for a technical field associated with the use of an electronic service manual. Further, since an email used to order a part can be prepared while off-line, not connected to the network, and since this email for the order can be transmitted when connected to the network, the invention is especially effective for a technical field associated with the use of an electronic service manual.

The invention claimed is:

1. A computer having an electronic service manual display program, which permits the computer to provide a function for displaying, on a display device, information that is related to parts and that is used for a predetermined product constituted by an electric circuit or an electronic circuit employing said parts as components, and at the least either a board diagram that represents not only a board used for said predetermined product but also said parts mounted on said board, or a circuit diagram that represents a circuit provided on said board, the electronic service manual display program enabling said computer to perform the steps of:

displaying, in a designated index page display area, an index page showing a list of names for, at the least, either said board or said circuit;

displaying, in a designated parts table page display area, a parts table page showing a list of said parts;

establishing in advance, for each of said names published on said index page, index page information, which is drawing identification information for a drawing, at the least either a board diagram for said board or a circuit diagram for said circuit, that corresponds to said name, and when one of said names displayed on said index page display area is selected, obtaining from said index page information said drawing identification information that is designated in correlation with said selected name;

searching for said drawing designated by said thus obtained drawing identification information, and displaying said drawing in a designated drawing display area;

reading network connection destination information, including parts ordering setup information wherein are entered URL information for a predetermined order receiving server that accepts orders for said parts, information indicating an information type to be transmitted to said parts order receiving server, and a method for the transmission of orders to said parts order receiving server;

establishing in advance, for graphics primitives that are constituents of said drawing, graphics primitive information, which is parts identification information corresponding to said parts, and when a predetermined operation is performed for one of said graphics primitives that constitute said board diagram or said circuit diagram displayed in said drawing display area, examining said network connection destination information to generate and display menu information that includes choices for the issue of an order for parts to said parts order receiving server;

generating a parts order page when in said menu information a choice is selected for issuing an order for parts to said parts order receiving order, and based on said parts identification information included in said graphics primitive information for said selected graphics primitive, obtaining for said part, from parts table database information wherein detailed information for each of said parts is stared together with said parts identification information, an information type to be transmitted to said parts order receiving server, and embedding, in said parts order page, said information type that is to be transmitted to said parts order receiving server and that is related to each of said parts;

displaying said parts order page;

accepting, at a predetermined location in said parts order page, an entry for the quantity of each of said parts to be ordered;

employing said method for the transmission to said parts order receiving server to transmit, to said parts order receiving server designated by said URL information, said information type that is to be transmitted to said parts order receiving server and is related to each of said parts, and the quantity of each of said parts to be ordered;

receiving from said parts order receiving server order acceptance results related to said parts; and displaying said order acceptance results that have been received.

2. A computer having an electronic service manual display program, which permits the computer to provide a function for displaying, on a display device, Information that is related to parts and that is used for a predetermined product constituted by an electric circuit or an electronic circuit employing said parts as components, and at the least either a board diagram that represents not only a board used for said predetermined product but also said parts mounted on said board, or a circuit diagram that represents a circuit provided on said board, the electronic service manual display program enabling said computer to perform the steps of:

displaying an index page display area for displaying an index page on which a list of names for, at the least, either said board or said circuit is published;

displaying a parts table page display area for displaying a parts table page on which a list of said parts is published;

displaying a drawing display area to display a drawing, at the least, either a board diagram for said board or a circuit diagram for said circuit;

displaying said index page in said index page display area;

displaying said parts table page in said parts table page display area:

establishing in advance, for each of said names published on said index page, index page information, which is drawing identification information for said drawing corresponding to said names, and when one of said names displayed in said index page display area is selected, obtaining from said index page information said drawing identification information that is designated for said selected name;

when said thus obtained drawing identification Information is information for a designation of said board diagram or said circuit diagram, searching for and displaying, in said drawing display area, said board diagram or said circuit diagram that corresponds to said drawing identification information;

when said drawing identification information thus obtained is information for a designation of both said board diagram and said circuit diagram, dividing said drawing display area into first and second display areas and searching for and displaying, in said first and second display areas, said board diagram and said circuit diagram that correspond to said drawing identification information;

reading network connection destination information, including parts ordering setup information wherein are entered URL information for a predetermined order receiving server that receives orders for said parts, information indicating an information type to be transmitted to said parts order receiving server, and a method for the transmission of orders to said parts order receiving server;

establishing in advance, for graphics primitives that are constituents of said drawing, graphics primitive information, which is parts identification information corresponding to said parts, and when a predetermined operation is performed for one of said graphics primitives that constitute said board diagram or said circuit diagram displayed in said drawing display area, examining said network connection destination information to generate and display menu information that includes choices for the issue of an order for parts to said parts order receiving server;

generating a parts order page when in said menu information a choice is selected for issuing an order for parts to said parts order receiving order, and based on said parts identification information included in said graphics primitive Information for said selected graphics primitive, obtaining for said part, from parts table database information wherein detailed information for each of said parts is stored together with said parts identification information, an information type to be transmitted to said parts order receiving server, and embedding, in said parts order page, said information type that is to be transmitted to said parts order receiving server and that is related to each of said parts;

displaying said parts order page;

accepting, at a predetermined location in said parts order page, an entry for the quantity of each of said parts to be ordered;

employing said method for the transmission to said parts order receiving server to transmit, to said parts order receiving server designated by said URL information, said information type that is to be transmitted to said parts order receiving server and is related to each of said parts, and the quantity of each of said parts to be ordered;

receiving from said parts order receiving server order acceptance results related to said parts; and displaying said order acceptance results that have been received.

3. A recording medium, on which is recorded an electronic service manual display program, used with a computer to provide a function for the computer to enable the computer to display, on a display device, information that is related to parts and that is used for a predetermined product constituted by an electric circuit or an electronic circuit employing said parts as components, and at the least either a board diagram that represents not only a board used for said predetermined product but also said parts mounted on said board, or a circuit diagram that represents a circuit provided on said board, and that enables said computer to perform the steps of:

displaying, in a designated index page display area of the display device, an index page showing a list of names for, at the least, either said board or said circuit;

displaying, in a designated parts table page display area of the display device, a parts table page showing a list of said parts;

establishing in advance, for each of said names published on said index page, index page information, which is drawing identification information for a drawing, at the least either a board diagram for said board or a circuit diagram for said circuit, that corresponds to said name, and when one of said names displayed on said index page display area is selected, obtaining from said index page information said drawing identification information that is designated in correlation with said selected name;

searching for said drawing designated by said thus obtained drawing identification information, and displaying said drawing in a designated drawing display area;

reading network connection destination information, including parts ordering setup information wherein are entered URL information for a predetermined order receiving server that receives orders for said parts, information indicating an information type to be transmitted to said parts order receiving server, and a method for the transmission of orders to said parts order receiving server;

establishing in advance, for graphics primitives that are constituents of said drawing, graphics primitive information, which is parts identification information corresponding to said parts, and when a predetermined operation is performed for one of said graphics primitives that constitute said board diagram or said circuit diagram displayed in said drawing display area, examining said network connection destination information to generate and display menu information that includes choices for the issue of an order for parts to said parts order receiving server;

generating a parts order page when in said menu information a choice is selected for issuing an order for parts to said parts order receiving order, and based on said parts identification information included in said graphics primitive information for said selected graphics primitive, obtaining for said part, from parts table database information wherein detailed information for each of said parts is stored together with said parts identification information, an information type to be transmitted to said parts order receiving server, and embedding, in said parts order page, said information type that is to be transmitted to said parts order receiving server and that is related to each of said parts;

displaying said parts order page on the display device;

accepting, at a predetermined location in said parts order page, an entry for the quantity of each of said parts to be ordered;

employing said method for the transmission to said parts order receiving server to transmit, to said parts order receiving server designated by said URL information, said information type that is to be transmitted to said parts order receiving server and is related to each of said parts, and the quantity of each of said parts to be ordered;

receiving from said parts order receiving server order acceptance results related to said parts; and displaying said order acceptance results that have been received on the display device.

4. A recording medium, on which recorded is an electronic service manual display program used with a computer to provide a function for the computer to enable the computer to display, on a display device, information that is related to parts and that is used for a predetermined product constituted by an electric circuit or an electronic circuit employing said parts as components, and at the least either a board diagram that represents not only a board used far said predetermined product but also said parts mounted on said board, or a circuit diagram that represents a circuit provided on said board, and that enables said computer to perform the steps of:

displaying on the display device an index page display area for displaying an index page on which a list of names for, at the least, either said board or said circuit is published;

displaying on the display device a parts table page display area for displaying a parts table page on which a list of said parts is published;

displaying on the display device a drawing display area to display a drawing, at the least, either a board diagram for said board or a circuit diagram for said circuit;

displaying said index page in said index page display area;

displaying said parts table page in said parts table page display area;

establishing in advance, for each of said names published on said index page, index page information, which is drawing identification information for said drawing corresponding to said names, and when one of said names displayed in said index page display area is selected, obtaining from said index page information said drawing identification information That is designated for said selected name;

when said thus obtained drawing identification information is information for a designation of said board diagram or said circuit diagram, searching for and displaying, in said drawing display area, said board diagram or said circuit diagram that corresponds to said drawing identification information;

when said drawing identification information thus obtained is information for a designation of both said board diagram and said circuit diagram, dividing said drawing display area into first and second display areas and searching for and displaying, in said first and second display areas, said board diagram and said circuit diagram that correspond to said drawing identification information;

reading network connection destination information, including parts ordering setup information wherein are entered URL information for a predetermined order receiving server that receives orders for said parts, information indicating an information type to be transmitted to said parts order receiving server, and a method for the transmission of orders to said parts order receiving server;

establishing in advance, for graphics primitives that are constituents of said drawing, graphics primitive information, which is parts identification information corresponding to said parts, and when a predetermined operation is performed for one of said graphics primitives that constitute said board diagram or said circuit diagram displayed in said drawing display area, examining said network connection destination information to generate and display menu information that includes choices for the issue of an order for parts to said parts order receiving server;

generating a parts order page when in said menu information a choice is selected for issuing an order for parts to said parts order receiving order, and based on said parts identification information included in said graphics primitive information for said selected graphics primitive, obtaining for said part, from parts table database information wherein detailed information for each of said parts is stored together with said parts identification information, an information type to be transmitted to said parts order receiving server, and embedding, in said parts order page, said information type that is to be transmitted to said parts order receiving server and that is related to each of said parts;

displaying said parts order page on the display device;

accepting, at a predetermined location in said parts order page, an entry for the quantity of each of said parts to be ordered;

employing said method for the transmission to said parts order receiving server to transmit, to said parts order receiving server designated by said URL information, said information type that is to be transmitted to said parts order receiving server and is related to each of said parts, and the quantity of each of said parts to be ordered;

receiving from said parts order receiving server order acceptance results related to said parts; and displaying said order acceptance results that have been received on the display device.

5. An electronic service manual display control method, for displaying, on a display device, information that is related to parts and that is used for a predetermined product constituted by an electric circuit or an electronic circuit employing said parts as components, and at the least either a board diagram that represents not only a board used for said predetermined product but also said parts mounted on said board, or a circuit diagram that represents a circuit provided on said board, comprising the steps of:

displaying, in a designated index page display area, an index page showing a list of names for, at the least, either said board or said circuit;

displaying, in a designated parts table page display area, a parts table page showing a list of said parts;

establishing in advance, for each of said names published on said index page, index page information) which is drawing identification information for a drawing, at the least either a board diagram for said board or a circuit diagram for said circuit, that corresponds to said name, and when one of said names displayed on said index page display area is selected, obtaining from said index page information said drawing identification information that is designated in correlation with said selected name;

searching for said drawing designated by said thus obtained drawing identification information, and displaying said drawing in a designated drawing display area;

reading network connection destination information, including parts ordering setup information wherein are entered URL information for a predetermined order receiving server that receives orders for said parts, information indicating an information type to be transmitted to said parts order receiving server, and a method for the transmission of orders to said parts order receiving server;

establishing in advance, for graphics primitives that are constituents of said drawing, graphics primitive information, which is parts identification information corresponding to said parts, and when a predetermined operation is performed for one of said graphics primitives that constitute said board diagram or said circuit diagram displayed in said drawing display area, examining said network connection destination information to generate and display menu information that includes choices for the issue of an order for parts to said parts order receiving server;

generating a parts order page when in said menu information a choice is selected for issuing an order for parts to said parts order receiving order, and based on said parts identification information included in said graphics primitive information for said selected graphics primitive, obtaining for said part, from parts table database information wherein detailed information for each of said parts is stored together with said parts identification information, an information type to be transmitted to said parts order receiving server, and embedding, in said parts order page, said information type that is to be transmitted to said parts order receiving server and that is related to each of said parts;

displaying said parts order page;

accepting, at a predetermined location in said parts order page, an entry for the quantity of each of said parts to be ordered;

employing said method for the transmission to said parts order receiving server to transmit, to said parts order receiving server designated by said URL information, said information type that is to be transmitted to said parts order receiving server and is related to each of said parts, and the quantity of each of said parts to be ordered;

receiving from said parts order receiving server order acceptance results related to said parts; and displaying said order acceptance results that have been received.

6. An electronic service manual display control apparatus, for displaying, on a display device, information that is related to parts and that is used for a predetermined product constituted by an electric circuit or an electronic circuit employing said parts as components, and at the least either a board diagram that represents not only a board used for said predetermined product but also said parts mounted on said board, or a circuit diagram that represents a circuit provided on said board, comprising:

means for displaying, in a designated index page display area, an index page showing a list of names for, at the least, either said board or said circuit;

means for displaying, in a designated parts table page display area, a parts table page showing a list of said parts;

means for establishing in advance, for each of said names published on said index page, index page information, which is drawing identification information for a drawing, at the least either a board diagram for said board or a circuit diagram for said circuit, that corresponds to said name, and for, when one of said names displayed on said index page display area is selected, obtaining from said index page information said drawing identification information that is designated in correlation with said selected name;

means for searching for said drawing designated by said thus obtained drawing identification information, and for displaying said drawing in a designated drawing display area;

means for reading network connection destination information, including parts ordering setup information wherein are entered URL information for a predetermined order receiving server that receives orders for said parts, information indicating an information type to be transmitted to said parts order receiving server, and a method for the transmission of orders to said parts order receiving server;

means for establishing in advance, for graphics primitives that are constituents of said drawing, graphics primitive information, which is parts identification information corresponding to said parts, and for, when a predetermined operation is performed for one of said graphics primitives that constitute said board diagram or said circuit diagram displayed in said drawing display area, examining said network connection destination information to generate and display menu information that includes choices for the issue of an order for parts to said parts order receiving server;

means for generating a parts order page when in said menu information a choice is selected for issuing an order for parts to said parts order receiving order, and for, based on said parts identification information included in said graphics primitive information for said selected graphics primitive, obtaining for said part, from parts table database information wherein detailed information for each of said parts is stored together with said parts identification information, an information type to be transmitted to said parts order receiving server, end embedding, in said parts order page, said information type that is to be transmitted to said parts order receiving server and that is related to each of said parts;

means for displaying said parts order page;

means for accepting, at a predetermined location in said parts order page, an entry for the quantity of each of said parts to be ordered;

means for employing said method for the transmission to said parts order receiving server to transmit to said parts order receiving server designated by said URL information, said information type that is to be transmitted to said parts order receiving server and is related to each of said parts, and the quantity of each of said parts to be ordered;

means for receiving from said parts order receiving server order acceptance results related to said parts; and means for displaying said order acceptance results that have been received.

* * * * *